United States Patent
Takimoto et al.

[11] Patent Number: 5,914,820
[45] Date of Patent: Jun. 22, 1999

[54] ZOOM LENS SYSTEM

[75] Inventors: Shunta Takimoto; Katsuhiro Takamoto, both of Sakai, Japan

[73] Assignee: Minolta Co., Ltd., Osaka, Japan

[21] Appl. No.: 08/961,106

[22] Filed: Oct. 30, 1997

[30] Foreign Application Priority Data

Oct. 30, 1996 [JP] Japan ................... 8-288721
Oct. 30, 1996 [JP] Japan ................... 8-288727

[51] Int. Cl.$^6$ ................... G02B 15/14
[52] U.S. Cl. ................... 359/686; 359/689
[58] Field of Search ................... 359/683, 686, 359/689

[56] References Cited

U.S. PATENT DOCUMENTS

| | | | |
|---|---|---|---|
| 4,687,302 | 8/1987 | Ikemori et al. | 350/427 |
| 4,824,223 | 4/1989 | Docter et al. | 350/427 |
| 5,009,491 | 4/1991 | Hata | 350/427 |
| 5,132,848 | 7/1992 | Nishio et al. | 359/686 |

FOREIGN PATENT DOCUMENTS 64-046717 2/1989 Japan .

Primary Examiner—Scott J. Sugarman
Attorney, Agent, or Firm—Sidley & Austin

[57] ABSTRACT

A Zoom lens system, from the enlargement side, has the first to fourth lens units having the negative, positive, negative, positive optical power, respectively. The third lens unit has a meniscus lens having a convex surface on the enlargement side. The fourth lens unit has two positive lenses. During zooming from the shortest focal length condition to the longest focal length condition, the second and third lens units move along the optical axis so that a distance between the second and third lens units increases and a distance between the third and fourth lens units decreases. The zoom lens system fulfills the following conditions:

$$0.30 < |\Phi 3| \cdot fs < 0.90$$

$$3 \leq |(r_{MB} + r_{MA})/(r_{MB} - r_{MA})|$$

Here, $\Phi 3$ represents an optical power of the third lens unit; fs reprents a focal length of the entire zoom lens system in the shortest focal length condition; $r_{MB}$ and $r_{MA}$ represent radiuses of curvature of the enlargement side and reduction side surfaces of the menicus lens.

27 Claims, 42 Drawing Sheets

FNO=2.97
[L]
— d
—·— g
----- SC
-0.5  0.5
SPHERICAL SINE
ABERRATION CONDITION

Y'=24.0
---- DM
— DS
-0.5  0.5
ASTIGMATISM

Y'=24.0
-5.0  5.0
DISTORTION %

FNO=2.67
[M]
— d
—·— g
----- SC
-0.5  0.5
SPHERICAL SINE
ABERRATION CONDITION

Y'=24.0
---- DM
— DS
-0.5  0.5
ASTIGMATISM

Y'=24.0
-5.0  5.0
DISTORTION %

FNO=2.50
[S]
— d
—·— g
----- SC
-0.5  0.5
SPHERICAL SINE
ABERRATION CONDITION

Y'=24.0
---- DM
— DS
-0.5  0.5
ASTIGMATISM

Y'=24.0
-5.0  5.0
DISTORTION %

FNO=2.97

[L]

— d
—·— g
----- SC

-0.5　0.5
SPHERICAL　SINE
ABERRATION　CONDITION

Y'=24.0

----- DM
——— DS

-0.5　0.5
ASTIGMATISM

Y'=24.0

-5.0　5.0
DISTORTION %

FNO=2.67

[M]

— d
—·— g
----- SC

-0.5　0.5
SPHERICAL　SINE
ABERRATION　CONDITION

Y'=24.0

----- DM
——— DS

-0.5　0.5
ASTIGMATISM

Y'=24.0

-5.0　5.0
DISTORTION %

FNO=2.50

[S]

— d
—·— g
----- SC

-0.5　0.5
SPHERICAL　SINE
ABERRATION　CONDITION

Y'=24.0

----- DM
——— DS

-0.5　0.5
ASTIGMATISM

Y'=24.0

-5.0　5.0
DISTORTION %

FNO=2.97

[L]

—— d
—·— g
----- SC

-0.5  0.5
SPHERICAL SINE
ABERRATION CONDITION

Y'=24.0

----- DM
—— DS

-0.5  0.5
ASTIGMATISM

Y'=24.0

-5.0  5.0
DISTORTION %

FNO=2.67

[M]

—— d
—·— g
----- SC

-0.5  0.5
SPHERICAL SINE
ABERRATION CONDITION

Y'=24.0

----- DM
—— DS

-0.5  0.5
ASTIGMATISM

Y'=24.0

-5.0  5.0
DISTORTION %

FNO=2.50

[S]

—— d
—·— g
----- SC

-0.5  0.5
SPHERICAL SINE
ABERRATION CONDITION

Y'=24.0

----- DM
—— DS

-0.5  0.5
ASTIGMATISM

Y'=24.0

-5.0  5.0
DISTORTION %

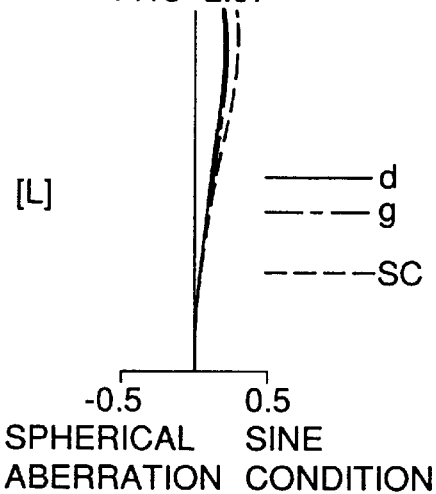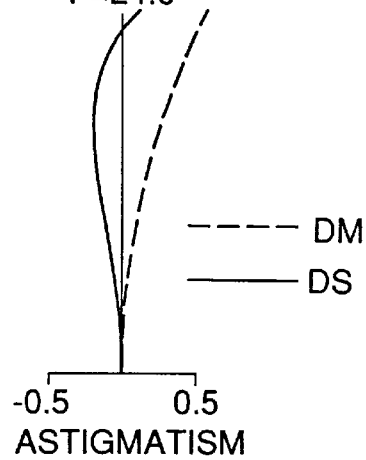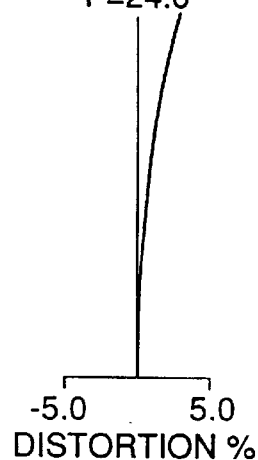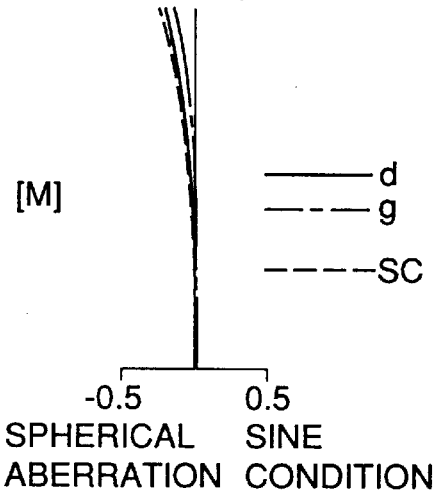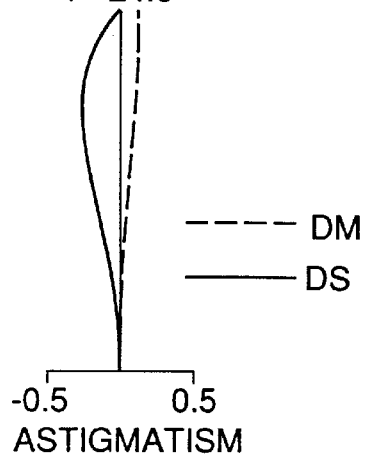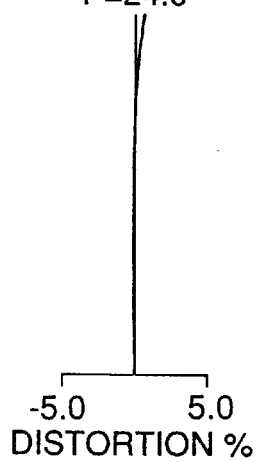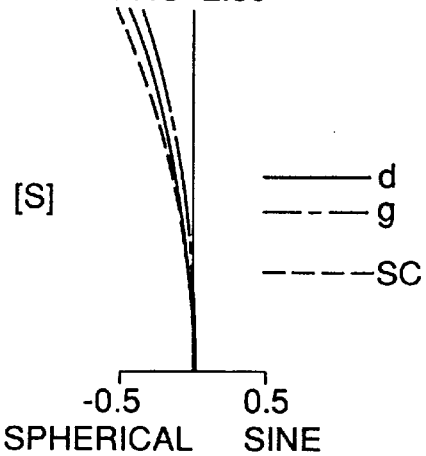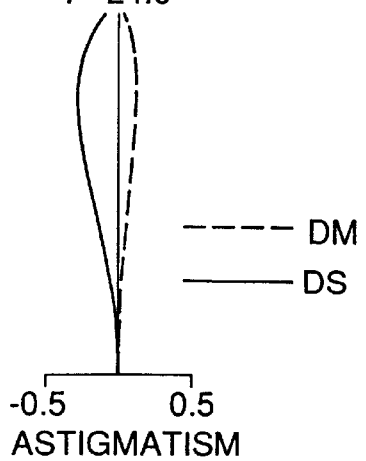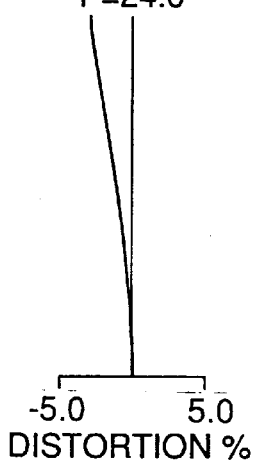

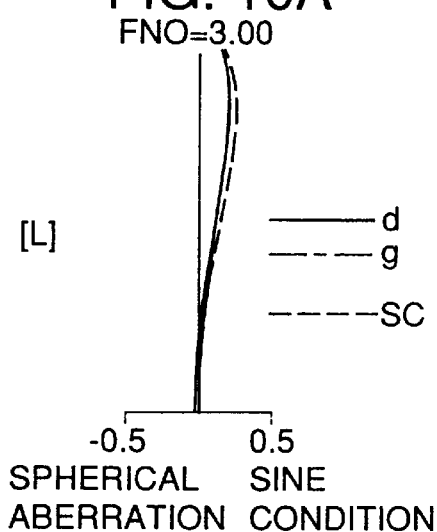
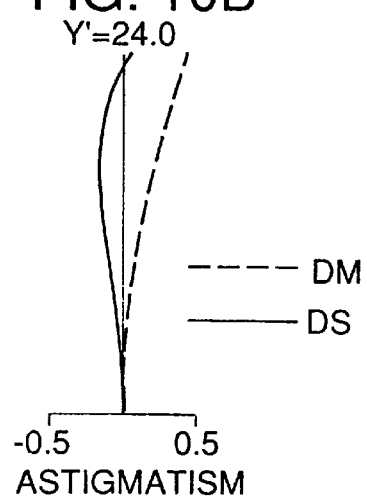
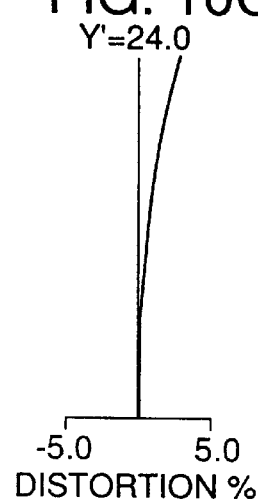
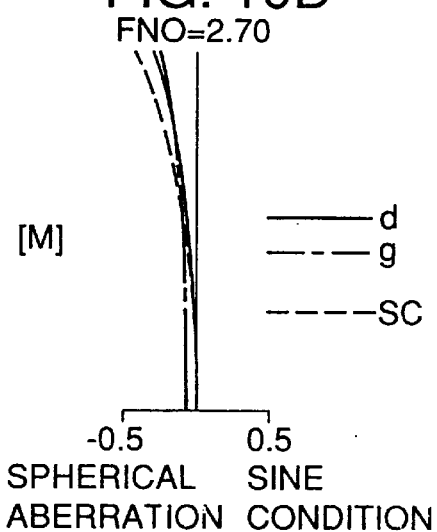
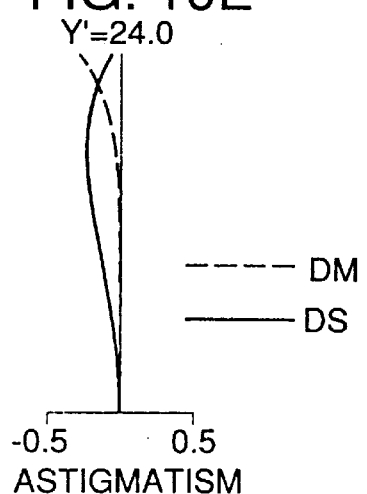
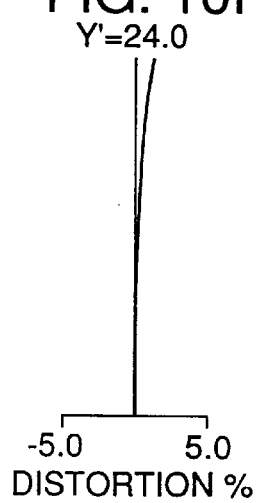
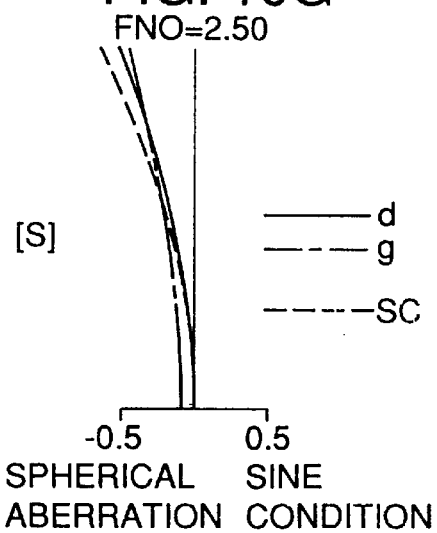
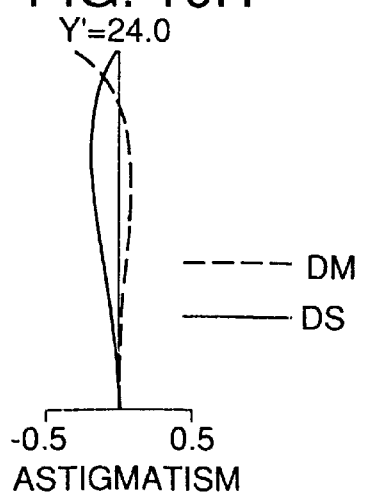
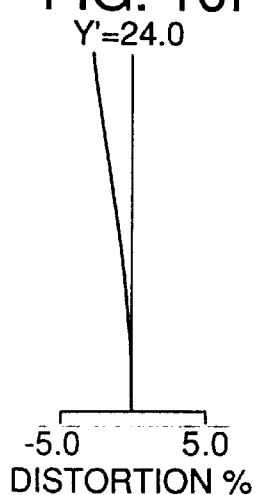

FNO=3.00
[L]
- d
- — · — g
- — — — SC

-0.5　0.5
SPHERICAL SINE
ABERRATION CONDITION

Y'=24.0
- — — — DM
- ——— DS

-0.5　0.5
ASTIGMATISM

Y'=24.0

-5.0　5.0
DISTORTION %

FNO=2.70
[M]
- d
- — · — g
- — — — SC

-0.5　0.5
SPHERICAL SINE
ABERRATION CONDITION

Y'=24.0
- — — — DM
- ——— DS

-0.5　0.5
ASTIGMATISM

Y'=24.0

-5.0　5.0
DISTORTION %

FNO=2.50
[S]
- d
- — · — g
- — — — SC

-0.5　0.5
SPHERICAL SINE
ABERRATION CONDITION

Y'=24.0
- — — — DM
- ——— DS

-0.5　0.5
ASTIGMATISM

Y'=24.0

-5.0　5.0
DISTORTION %

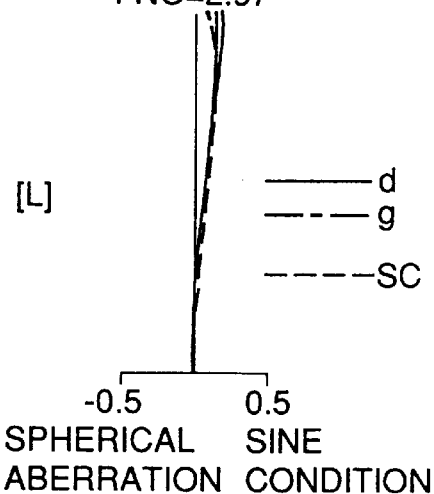
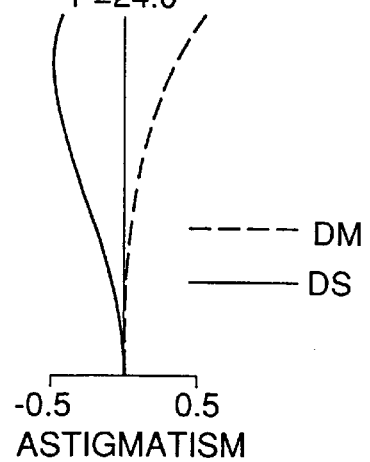
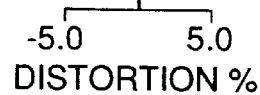
FIG. 14A FNO=2.97 [L] SPHERICAL ABERRATION / SINE CONDITION (d, g, SC)
FIG. 14B Y'=24.0 ASTIGMATISM (DM, DS)
FIG. 14C Y'=24.0 DISTORTION %
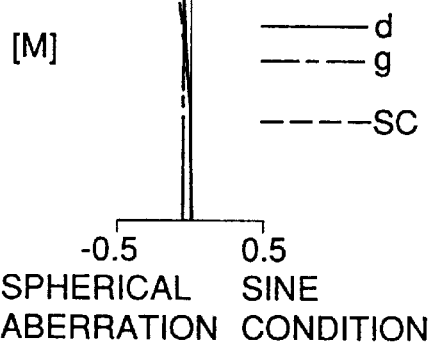
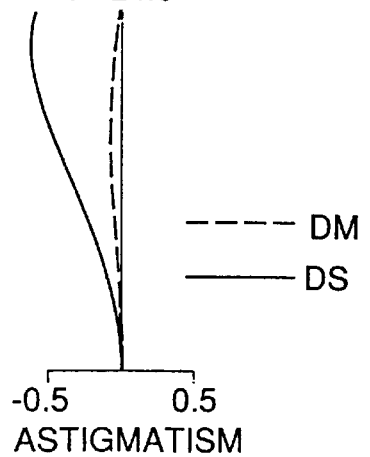
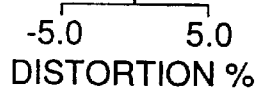
FIG. 14D FNO=2.67 [M] SPHERICAL ABERRATION / SINE CONDITION
FIG. 14E Y'=24.0 ASTIGMATISM
FIG. 14F Y'=24.0 DISTORTION %
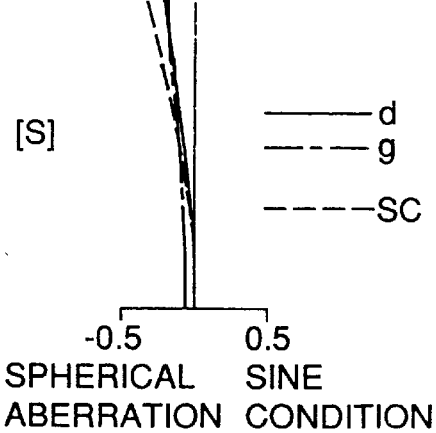
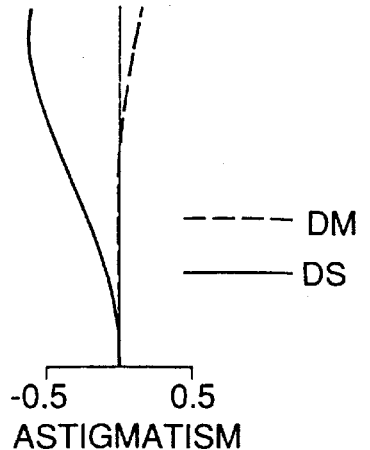
FIG. 14G FNO=2.50 [S] SPHERICAL ABERRATION / SINE CONDITION
FIG. 14H Y'=24.0 ASTIGMATISM
FIG. 14I Y'=24.0 DISTORTION %

FNO=2.97

[L]
— d
— · — g
— — — SC

-0.5   0.5
SPHERICAL    SINE
ABERRATION   CONDITION

Y'=24.0

— — — DM
——— DS

-0.5   0.5
ASTIGMATISM

Y'=24.0

-5.0   5.0
DISTORTION %

FNO=2.67

[M]
— d
— · — g
— — — SC

-0.5   0.5
SPHERICAL    SINE
ABERRATION   CONDITION

Y'=24.0

— — — DM
——— DS

-0.5   0.5
ASTIGMATISM

Y'=24.0

-5.0   5.0
DISTORTION %

FNO=2.50

[S]
— d
— · — g
— — — SC

-0.5   0.5
SPHERICAL    SINE
ABERRATION   CONDITION

Y'=24.0

— — — DM
——— DS

-0.5   0.5
ASTIGMATISM

Y'=24.0

-5.0   5.0
DISTORTION %

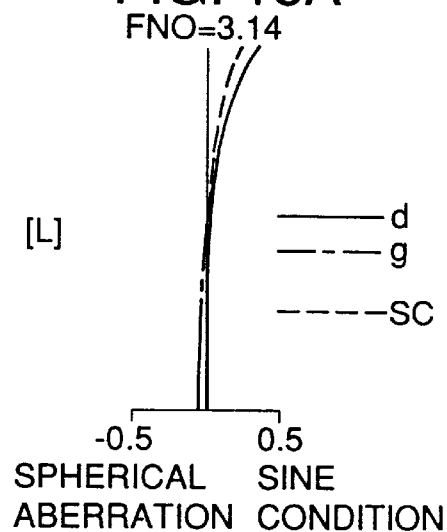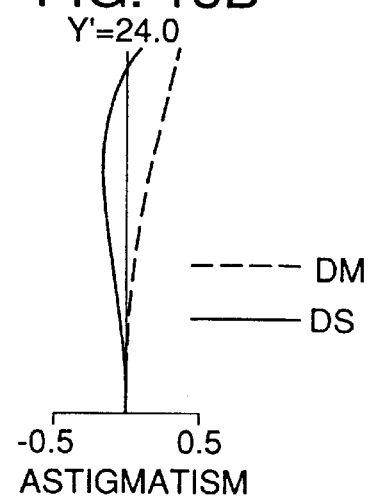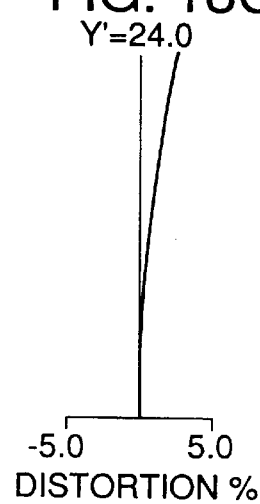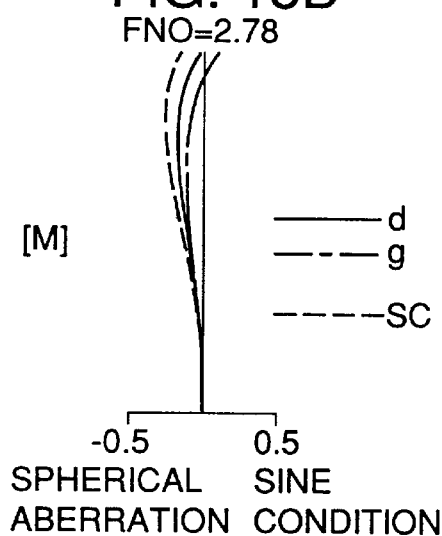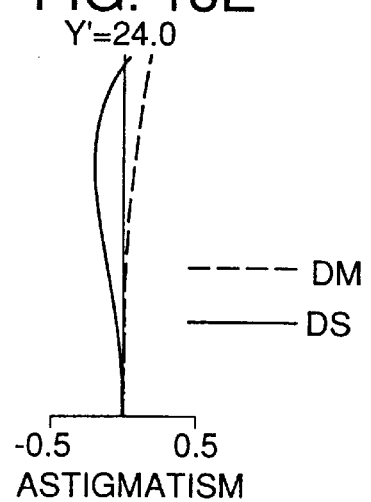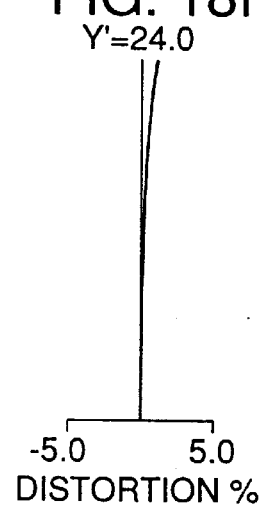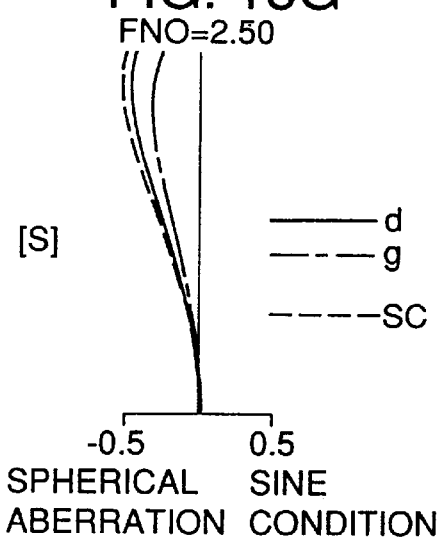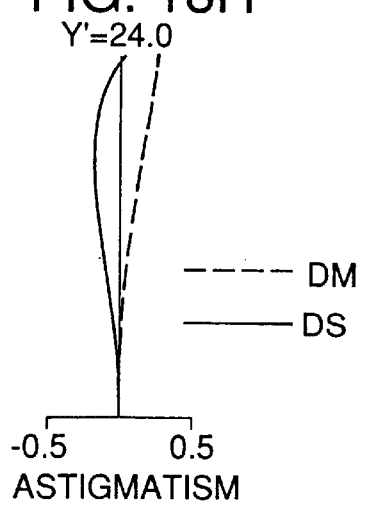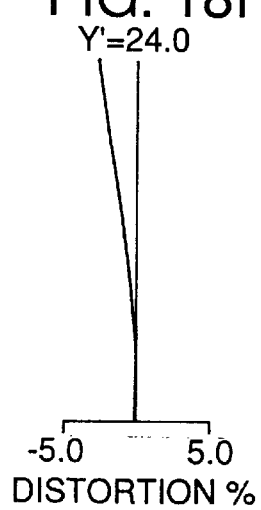

FNO=3.08
[L]
— d
— — g
— — — SC
SPHERICAL ABERRATION SINE CONDITION

Y'=24.0
— — — DM
——— DS
ASTIGMATISM

Y'=24.0
DISTORTION %

FNO=2.76
[M]
— d
— — g
— — — SC
SPHERICAL ABERRATION SINE CONDITION

Y'=24.0
— — — DM
——— DS
ASTIGMATISM

Y'=24.0
DISTORTION %

FNO=2.50
[S]
— d
— — g
— — — SC
SPHERICAL ABERRATION SINE CONDITION

Y'=24.0
— — — DM
——— DS
ASTIGMATISM

Y'=24.0
DISTORTION %

FNO=2.97
[L]
— d
— — g
- - - - SC
-0.5   0.5
SPHERICAL SINE
ABERRATION CONDITION

Y'=24.0
- - - - DM
— DS
-0.5   0.5
ASTIGMATISM

Y'=24.0
-5.0   5.0
DISTORTION %

FNO=2.67
[M]
— d
— — g
- - - - SC
-0.5   0.5
SPHERICAL SINE
ABERRATION CONDITION

Y'=24.0
- - - - DM
— DS
-0.5   0.5
ASTIGMATISM

Y'=24.0
-5.0   5.0
DISTORTION %

FNO=2.50
[S]
— d
— — g
- - - - SC
-0.5   0.5
SPHERICAL SINE
ABERRATION CONDITION

Y'=24.0
- - - - DM
— DS
-0.5   0.5
ASTIGMATISM

Y'=24.0
-5.0   5.0
DISTORTION %

FNO=2.97

[L]

—— d
— — g
- - - - SC

-0.5   0.5
SPHERICAL SINE
ABERRATION CONDITION

Y'=24.0

- - - - DM
—— DS

-0.5   0.5
ASTIGMATISM

Y'=24.0

-5.0   5.0
DISTORTION %

FNO=2.67

[M]

—— d
— — g
- - - - SC

-0.5   0.5
SPHERICAL SINE
ABERRATION CONDITION

Y'=24.0

- - - - DM
—— DS

-0.5   0.5
ASTIGMATISM

Y'=24.0

-5.0   5.0
DISTORTION %

FNO=2.50

[S]

—— d
— — g
- - - - SC

-0.5   0.5
SPHERICAL SINE
ABERRATION CONDITION

Y'=24.0

- - - - DM
—— DS

-0.5   0.5
ASTIGMATISM

Y'=24.0

-5.0   5.0
DISTORTION %

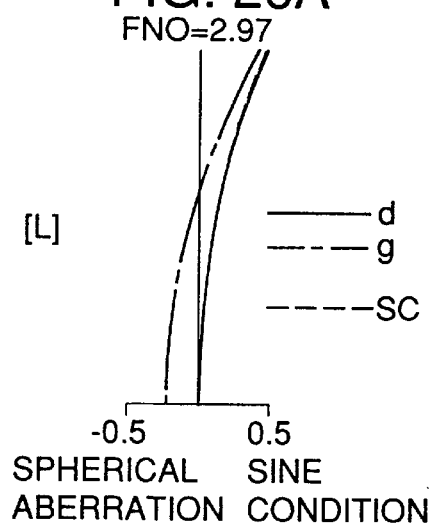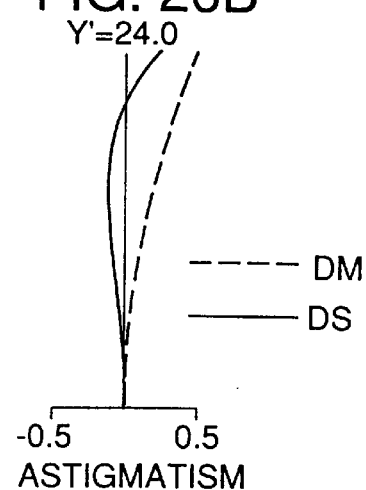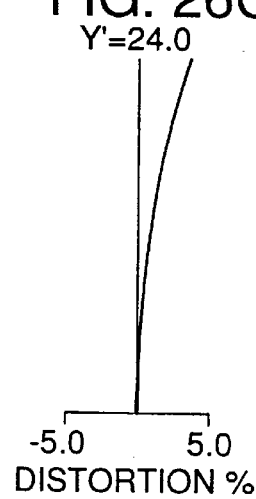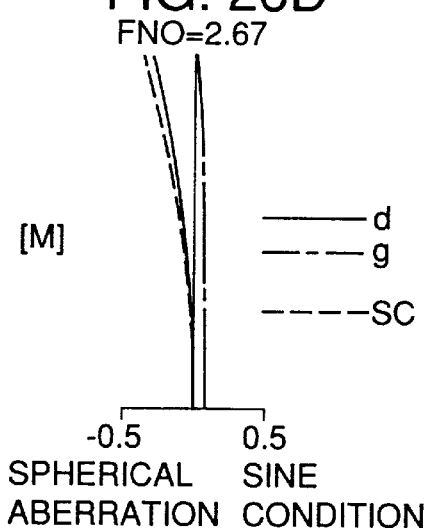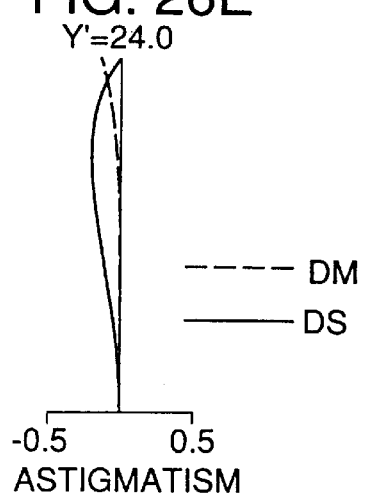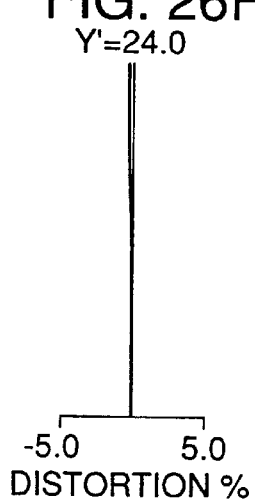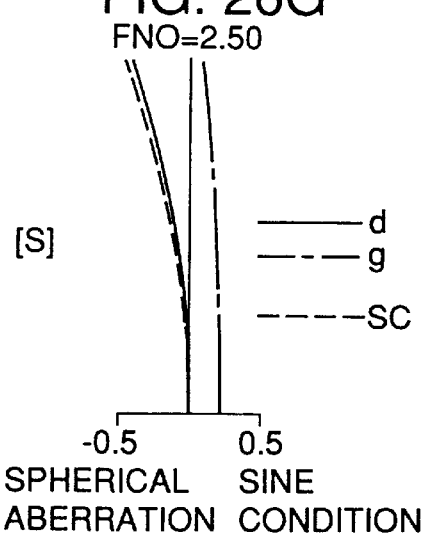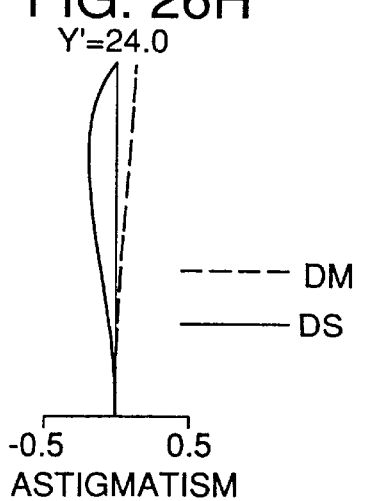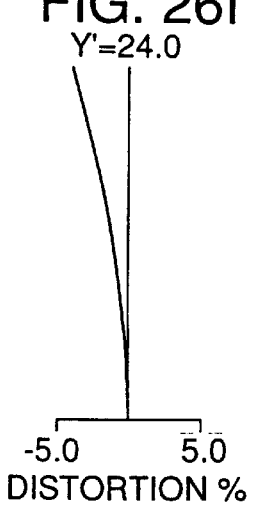

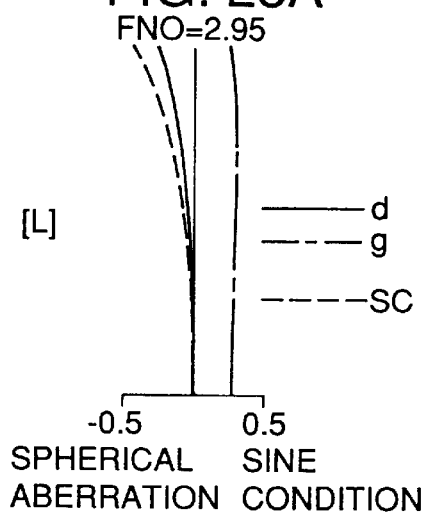
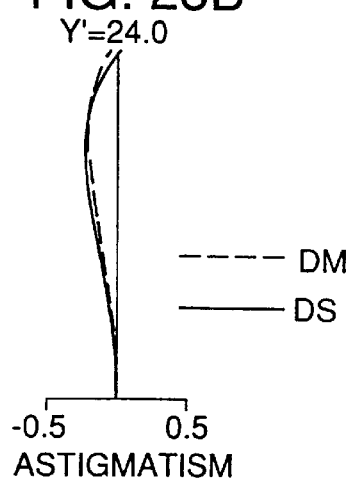
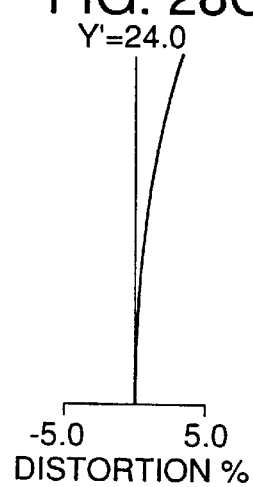
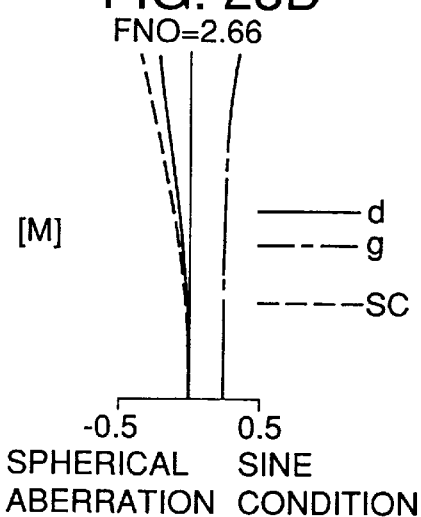
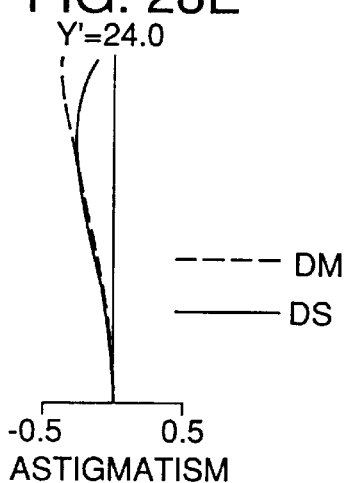
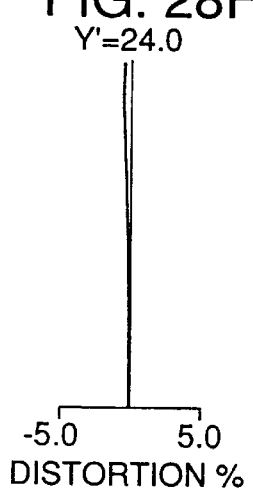
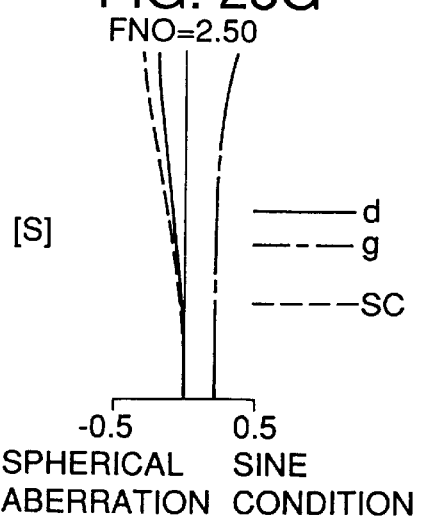
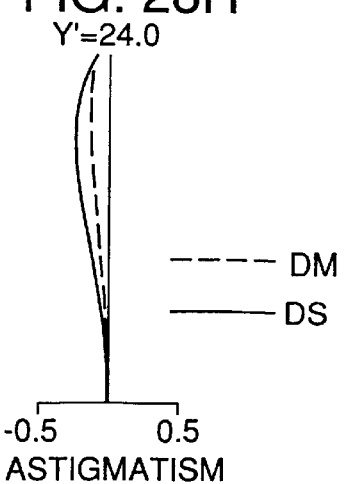
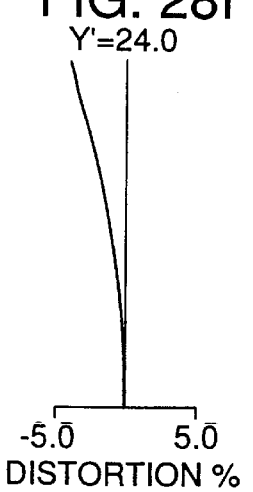

FNO=3.02

[L]

-0.5　0.5
SPHERICAL　SINE
ABERRATION　CONDITION

— d
— · — g
— — — SC

Y'=24.0

-0.5　0.5
ASTIGMATISM

— — — DM
——— DS

Y'=24.0

-5.0　5.0
DISTORTION %

FNO=2.69

[M]

-0.5　0.5
SPHERICAL　SINE
ABERRATION　CONDITION

— d
— · — g
— — — SC

Y'=24.0

-0.5　0.5
ASTIGMATISM

— — — DM
——— DS

Y'=24.0

-5.0　5.0
DISTORTION %

FNO=2.50

[S]

-0.5　0.5
SPHERICAL　SINE
ABERRATION　CONDITION

— d
— · — g
— — — SC

Y'=24.0

-0.5　0.5
ASTIGMATISM

— — — DM
——— DS

Y'=24.0

-5.0　5.0
DISTORTION %

FNO=3.02
[L]
-0.5  0.5
SPHERICAL  SINE
ABERRATION  CONDITION
—— d
—·— g
----- SC

Y'=24.0
-0.5  0.5
ASTIGMATISM
----- DM
—— DS

Y'=24.0
-5.0  5.0
DISTORTION %

FNO=2.69
[M]
-0.5  0.5
SPHERICAL  SINE
ABERRATION  CONDITION
—— d
—·— g
----- SC

Y'=24.0
-0.5  0.5
ASTIGMATISM
----- DM
—— DS

Y'=24.0
-5.0  5.0
DISTORTION %

FNO=2.50
[S]
-0.5  0.5
SPHERICAL  SINE
ABERRATION  CONDITION
—— d
—·— g
----- SC

Y'=24.0
-0.5  0.5
ASTIGMATISM
----- DM
—— DS

Y'=24.0
-5.0  5.0
DISTORTION %

FNO=3.02
[L]
-0.5  0.5
SPHERICAL  SINE
ABERRATION  CONDITION
— d
—·— g
----- SC

Y'=24.0
----- DM
—— DS
-0.5  0.5
ASTIGMATISM

Y'=24.0
-5.0  5.0
DISTORTION %

FNO=2.69
[M]
-0.5  0.5
SPHERICAL  SINE
ABERRATION  CONDITION
— d
—·— g
----- SC

Y'=24.0
----- DM
—— DS
-0.5  0.5
ASTIGMATISM

Y'=24.0
-5.0  5.0
DISTORTION %

FNO=2.50
[S]
-0.5  0.5
SPHERICAL  SINE
ABERRATION  CONDITION
— d
—·— g
----- SC

Y'=24.0
----- DM
—— DS
-0.5  0.5
ASTIGMATISM

Y'=24.0
-5.0  5.0
DISTORTION %

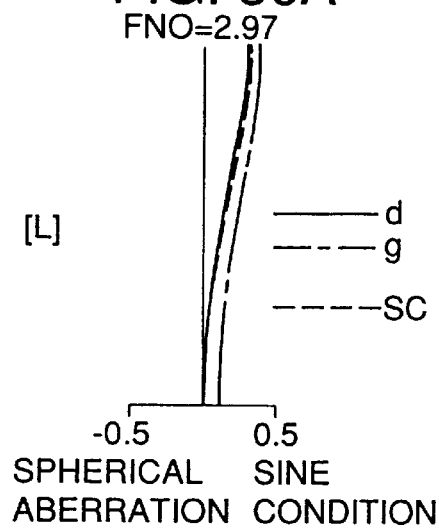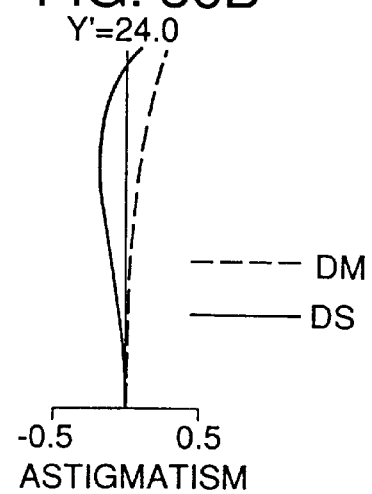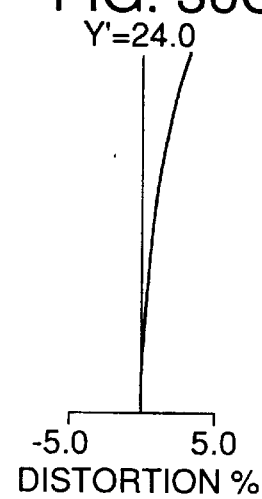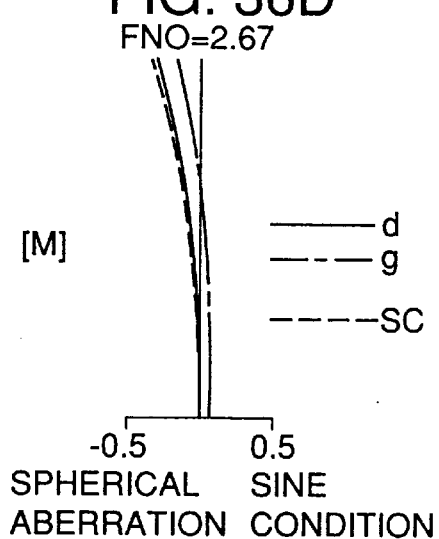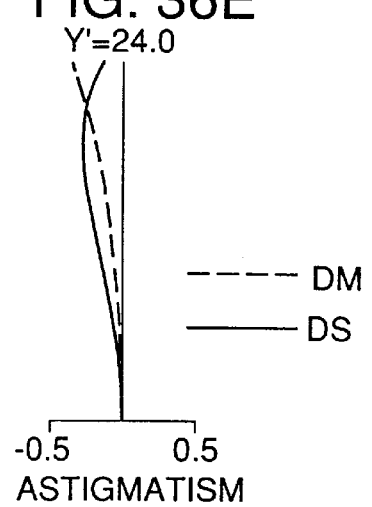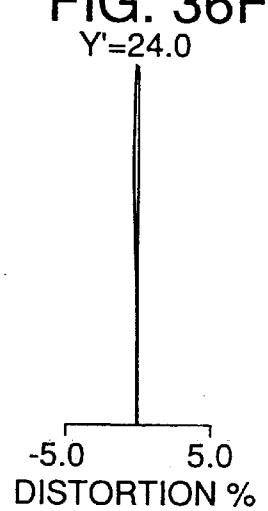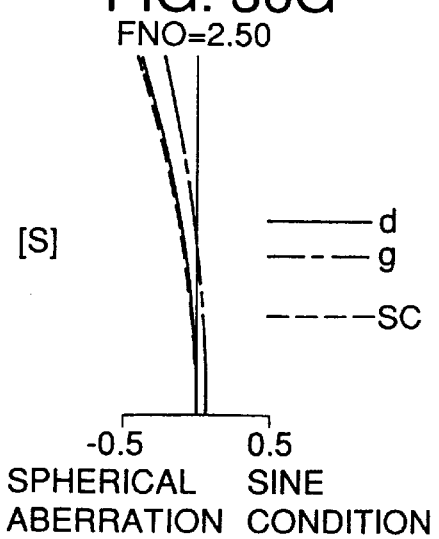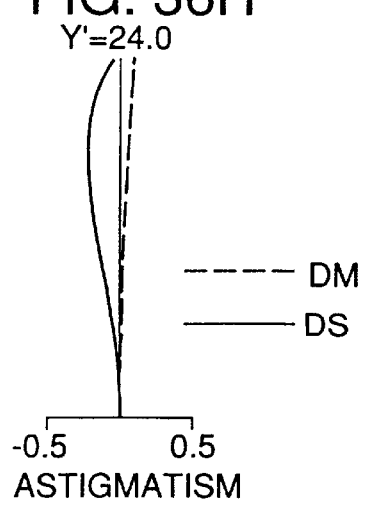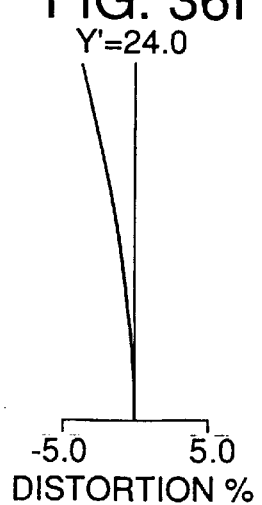

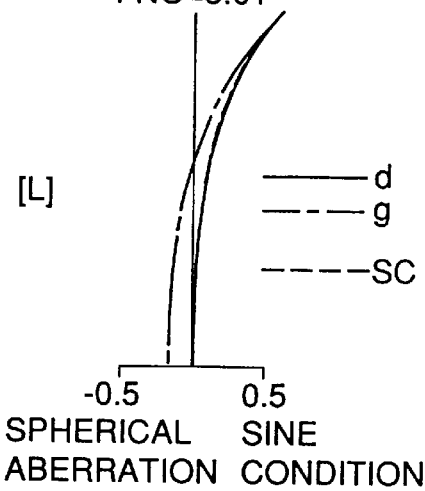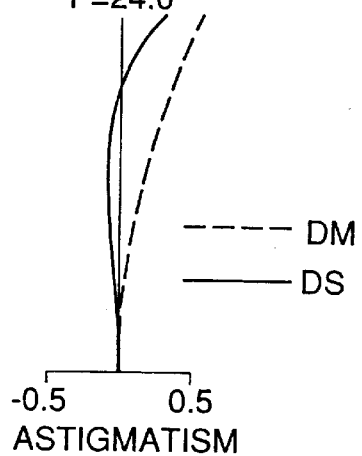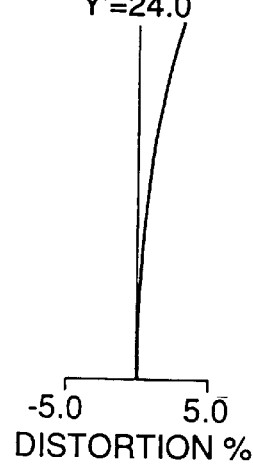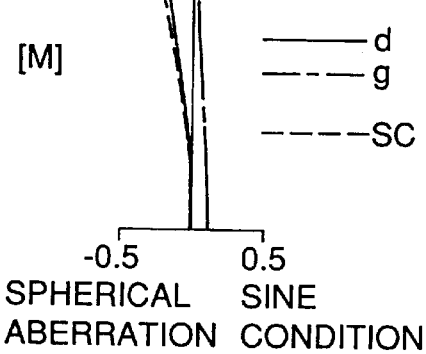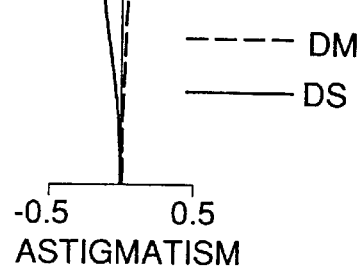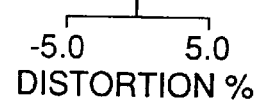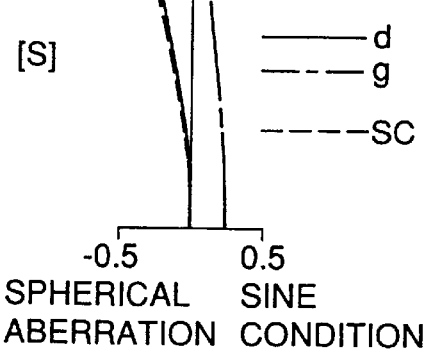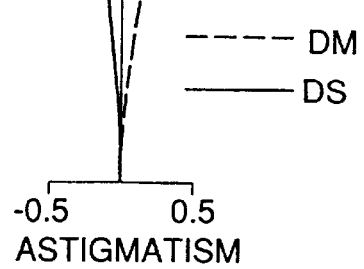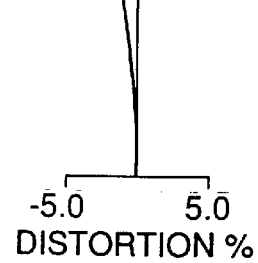

FNO=2.97

[L]

— d
—·— g
----- SC

-0.5  0.5
SPHERICAL SINE
ABERRATION CONDITION

Y'=24.0

----- DM
— DS

-0.5  0.5
ASTIGMATISM

Y'=24.0

-5.0  5.0
DISTORTION %

FNO=2.67

[M]

— d
—·— g
----- SC

-0.5  0.5
SPHERICAL SINE
ABERRATION CONDITION

Y'=24.0

----- DM
— DS

-0.5  0.5
ASTIGMATISM

Y'=24.0

-5.0  5.0
DISTORTION %

FNO=2.50

[S]

— d
—·— g
----- SC

-0.5  0.5
SPHERICAL SINE
ABERRATION CONDITION

Y'=24.0

----- DM
— DS

-0.5  0.5
ASTIGMATISM

Y'=24.0

-5.0  5.0
DISTORTION %

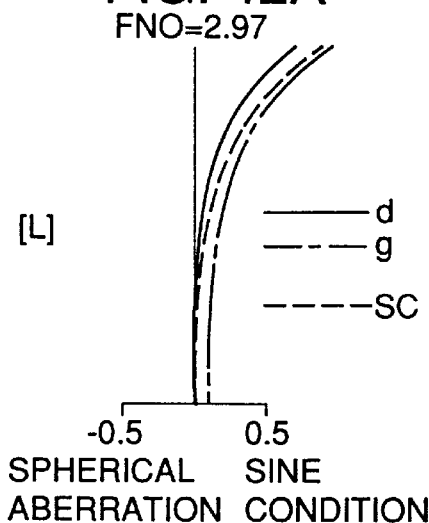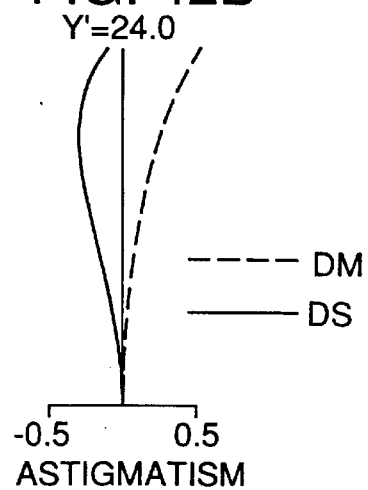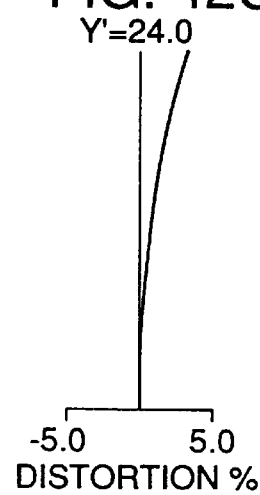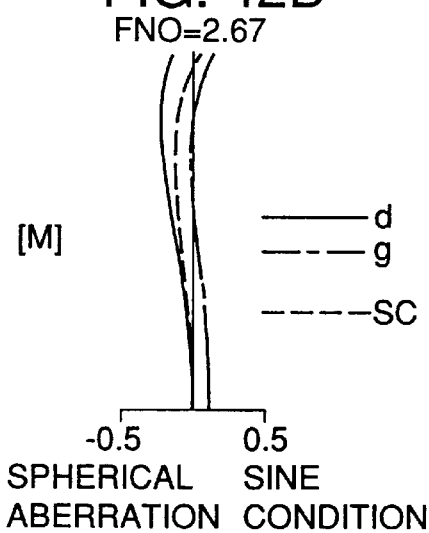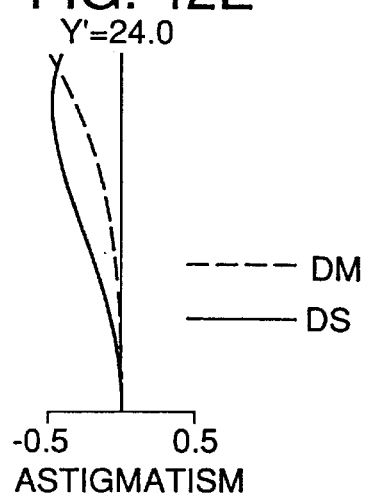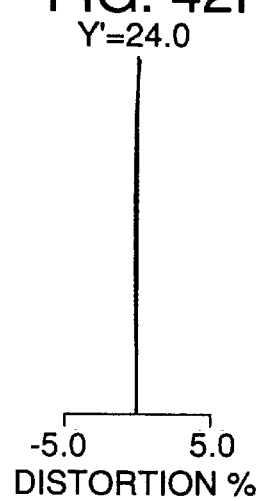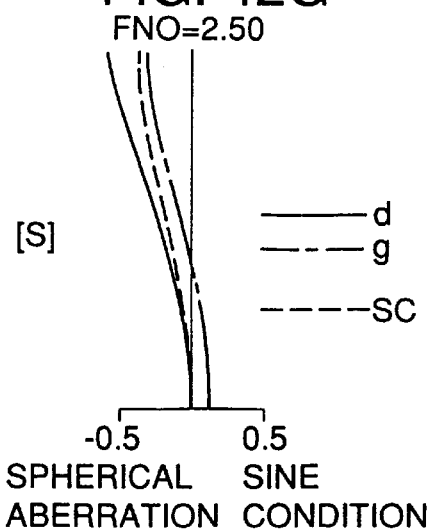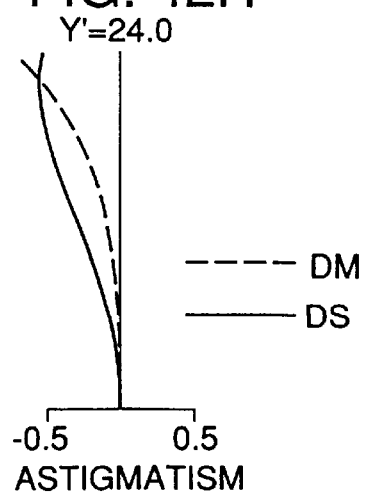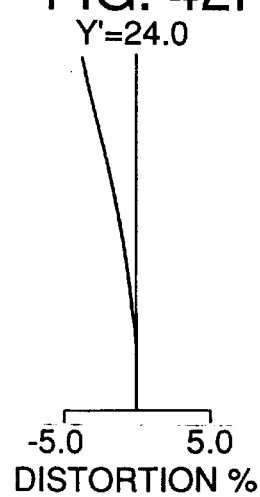

ZOOM LENS SYSTEM

BACKGROUND OF THE INVENTION

1. Field of the Invention

The present invention relates to a zoom lens system, and particularly to a zoom lens system suitable, for example, for use as a projection optical system in an image projection apparatus (such as a liquid crystal projector for projecting an image from a liquid crystal panel onto a screen).

2. Description of the Prior Art

Various types of zoom lens systems are known. For example, Japanese Laid-open Patent Application No. S64-46717 discloses a three-unit zoom lens system that consists of, from the object side a first lens unit having a negative refractive power, a second lens unit having a positive refractive power, and a third lens unit having a positive refractive power and that performs zooming from the wide-angle end to the telephoto end by moving the second lens unit along the optical axis in such a way that the distance between the second and third lens units increases.

Some zoom lens systems are designed for use as an image-sensing optical system in an image sensing apparatus (e.g. a video camera), whereas other zoom lens systems are designed for use as a projection optical system in an image projection apparatus (e.g. a liquid crystal projector). The zoom lens system disclosed in the above-mentioned Japanese Laid-open Patent Application No. S64-46717 is designed as an image-sensing optical system, and therefore, when it is used as a projection optical system, it suffers from its short back focal length and insufficient correction of distortion.

The reason why a zoom lens system to be used as a projection optical system needs to have a relatively long back focal length is that it is necessary to secure a space for a dichroic prism or the like on the reduction side of the zoom lens system. The reason why a zoom lens system to be used as a projection optical system needs to have relatively high distortion correction performance is that, in order to produce as large a projected image as possible at as short a projection distance as possible, it is necessary to use the wide-angle range of the zoom lens system where large distortion is inevitable.

SUMMARY OF THE INVENTION

An object of the present invention is to provide a zoom lens system that has a sufficiently long back focal length and sufficiently high distortion correction performance for use as a projection optical system.

Note that, in the following descriptions, an "optical power" refers to a quantity that is represented as a reciprocal of a focal length, and thus refers not only to a deflection at an interface between media having different refractive indices, but also to a deflection or the like due to diffraction or due to distribution of varying refractive indices within a medium.

To achieve the above object, according to one aspect of the present invention, a zoom lens system is provided with, from the enlargement side, a first lens unit having a negative optical power; a second lens unit having a positive optical power; a third lens unit having a negative optical power, said third lens unit comprising, at its enlargement side end, a meniscus lens element having a convex surface on the enlargement side; and a fourth lens unit having a positive optical power, said fourth lens unit including at least two positive lens elements. In this zoom lens system, said second lens unit moves along the optical axis so that a distance between said second lens unit and third lens unit increases during zooming from a shortest focal length condition to a longest focal length condition. Moreover, in this zoom lens system, said third lens unit moves along the optical axis so that a distance between said third lens unit and fourth lens unit decreases during zooming from a shortest focal length condition to a longest focal length condition. Furthermore, in this zoom lens unit, the following conditions are fulfilled:

$$0.30 < |\phi 3| \cdot fS < 0.90$$

$$3 \leq |(r_{MB} + r_{MA})/(r_{MB} - r_{MA})|$$

where $\phi 3$ represents an optical power of the third lens unit; $fS$ represents a focal length of the entire zoom lens in the shortest focal length condition; $r_{MB}$ represents a radius of curvature of the enlargement side surface of the meniscus lens element; and $r_{MA}$ represents a radius of curvature of the reduction side surface of the meniscus lens element.

According to another aspect of the present invention, a zoom lens system is provided with, from the enlargement side, a first lens unit having a negative optical power; a second lens unit having a positive optical power; and a third lens unit having a positive optical power, said third lens unit consisting of, from the enlargement side, a front lens sub-unit having a negative optical power and a rear lens sub-unit having a positive optical power, said front lens sub-unit comprising, at its enlargement side end, a meniscus lens element having a convex surface on the enlargement side, said rear lens sub-unit including two positive lens elements. In this zoom lens system, said second lens unit moves along the optical axis so that a distance between said second lens unit and third lens unit increases during zooming from a shortest focal length condition to a longest focal length condition. Moreover, in this zoom lens system, the following conditions are fulfilled:

$$0.30 < |\phi F| fS < 0.90$$

$$3 \leq |(r_{MB} + r_{MA})/(r_{MB} - r_{MA})|$$

where $\phi F$ represents an optical power of the front lens sub-unit; $fS$ represents a focal length of the entire zoom lens in the shortest focal length condition; $r_{MB}$ represents a radius of curvature of the enlargement side surface of the meniscus lens element; and $r_{MA}$ represents a radius of curvature of the reduction side surface of the meniscus lens element.

BRIEF DESCRIPTION OF THE DRAWINGS

This and other objects and features of this invention will become clear from the following description, taken in conjunction with the preferred embodiments with reference to the accompanied drawings in which:

FIGS. 8A to 8I are aberration diagrams of the fourth embodiment;

FIGS. 10A to 10I are aberration diagrams of the fifth embodiment;

FIGS. 14A to 14I are aberration diagrams of the seventh embodiment;

FIGS. 18A to 18I are aberration diagrams of the ninth embodiment:

FIGS. 26A to 26I are aberration diagrams of the thirteenth embodiment;

FIGS. 28A to 28I are aberration diagrams of the fourteenth embodiment;

FIGS. 36A to 36I are aberration diagrams of the eighteenth embodiment;

FIGS. 38A to 38I are aberration diagrams of the nineteenth embodiment;

FIGS. 42A to 42I are aberration diagrams of the twenty-first embodiment.

DESCRIPTION OF THE PREFERRED EMBODIMENTS

Hereinafter, zoom lens systems embodying the present invention will be described with reference to the drawings. All the embodiments described hereafter are designed for use as a projection optical system in an image projection apparatus (e.g. a liquid crystal projector). However, it should be understood that all the embodiments are also suitable for use as an imagesensing optical system in an image-sensing apparatus (e.g. a video camera).

Figure 1A:
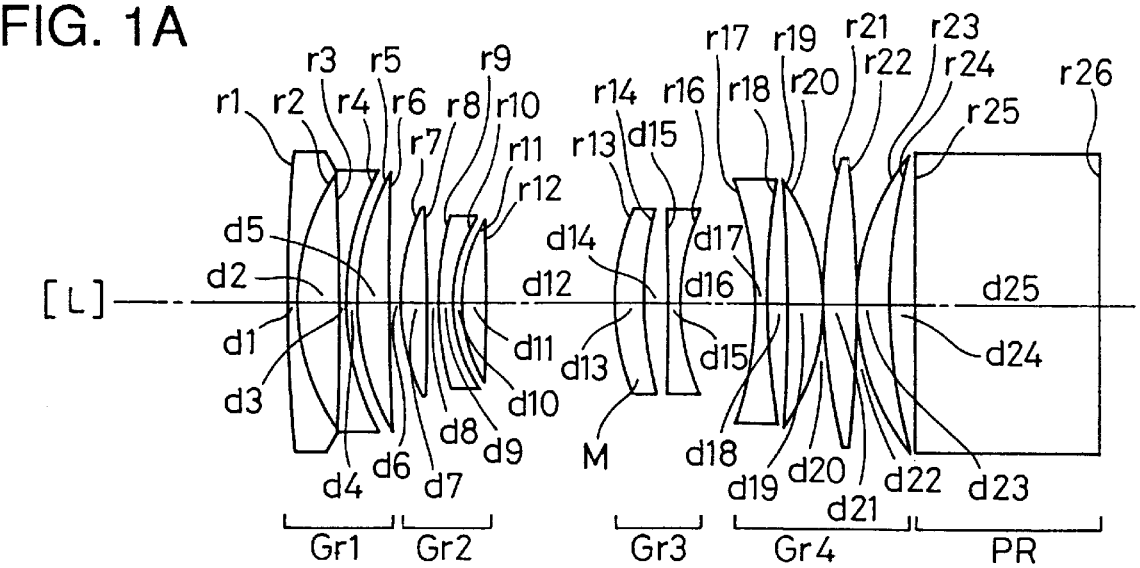
FIGS. 1A to 1C are lens arrangement diagrams of a first embodiment of the invention.
Figure 1B:
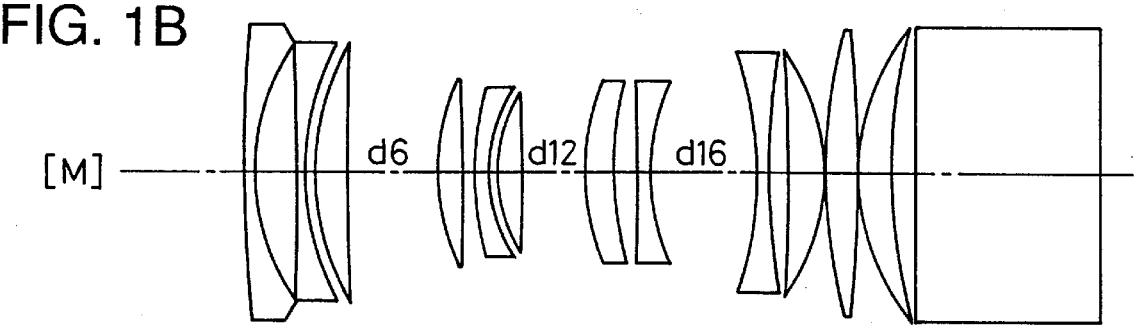
Figure 1C:
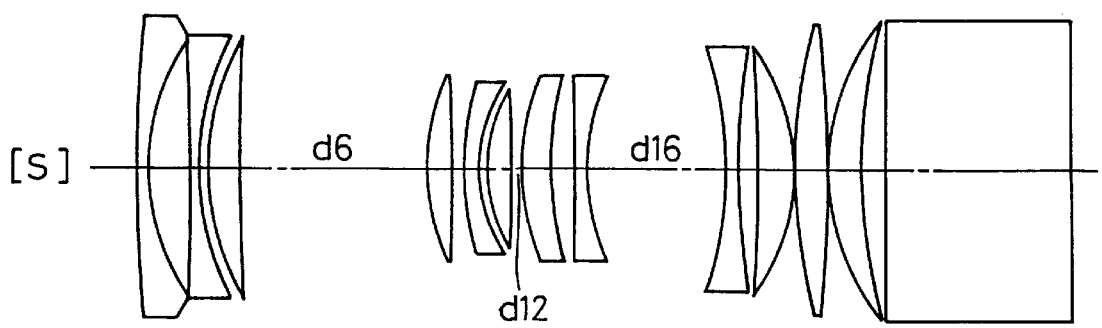
Figure 3A:
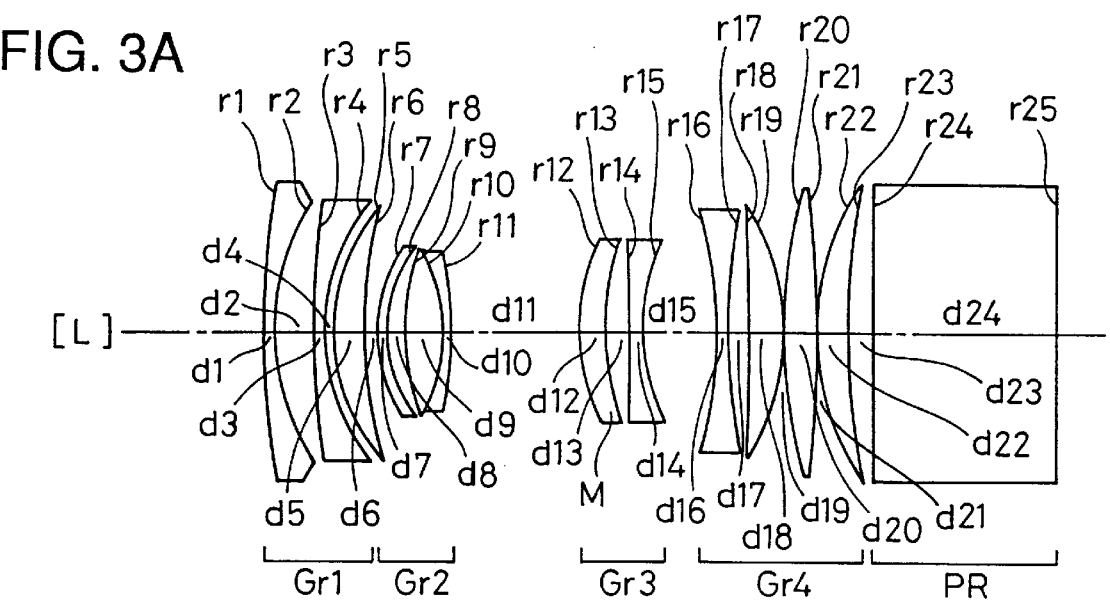
FIGS. 3A to 3C are lens arrangement diagrams of a second embodiment of the invention.
Figure 3B:
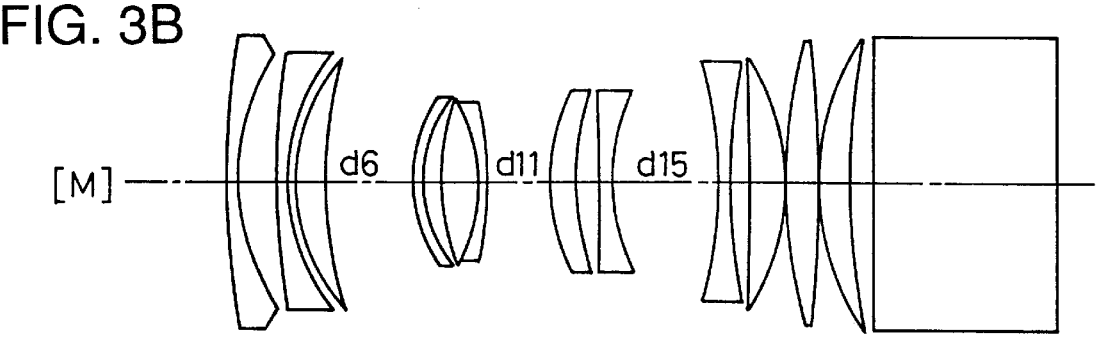
Figure 3C:
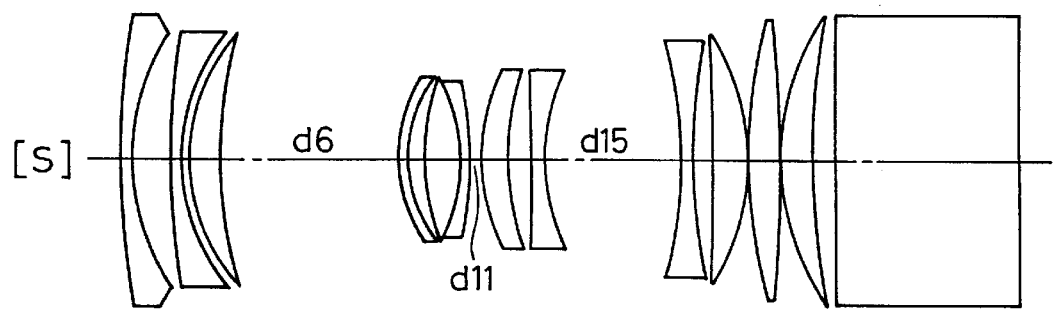
Figure 5A:
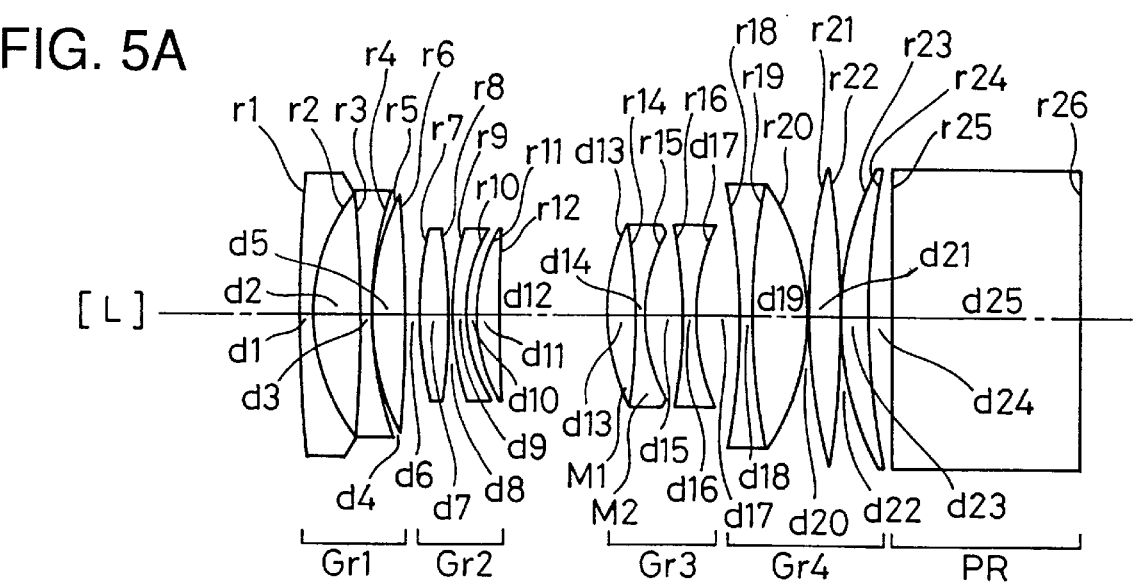
FIGS. 5A to 5C are lens arrangement diagrams of a third embodiment of the invention.
Figure 5B:
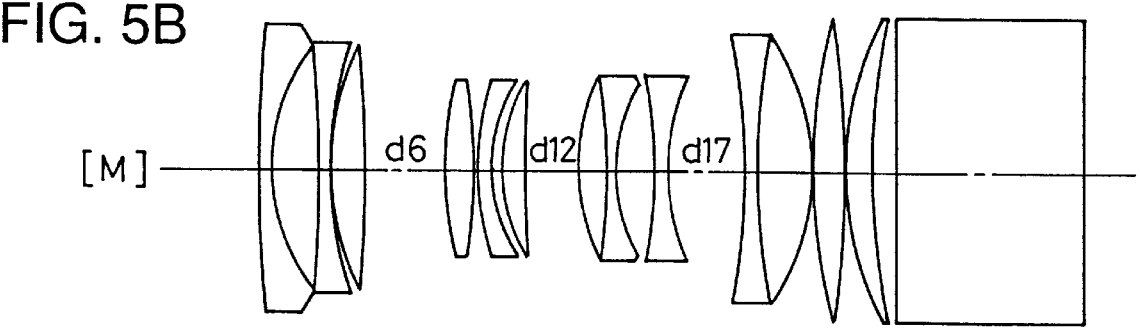
Figure 5C:
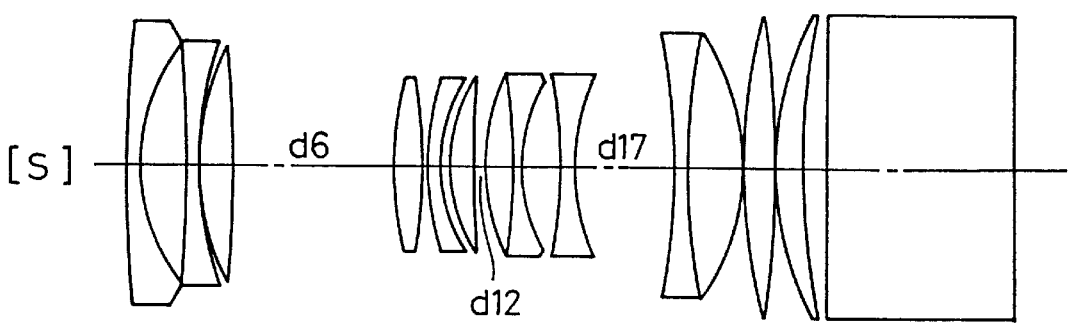
Figure 7A:
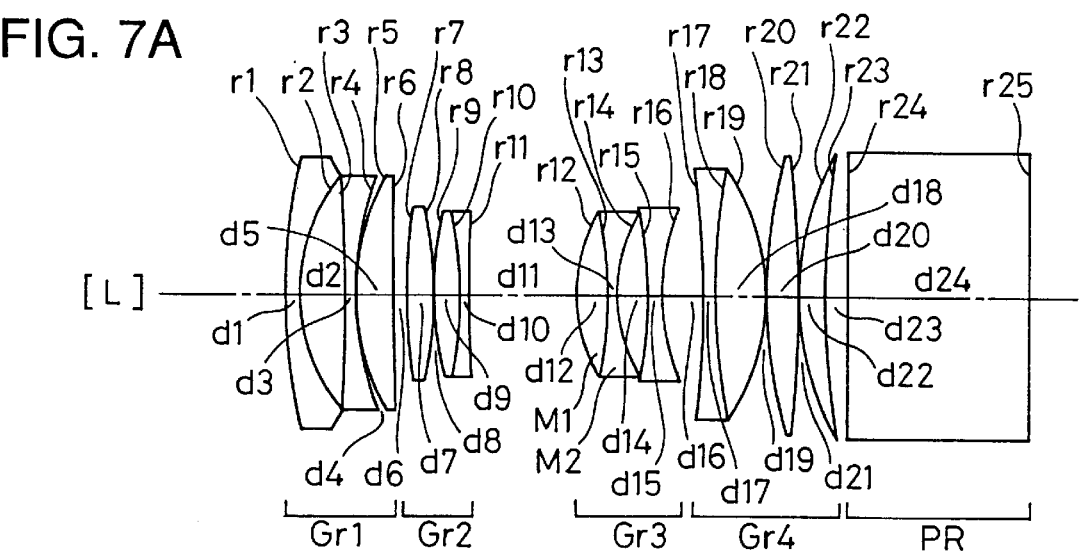
FIGS. 7A to 7C are lens arrangement diagrams of a fourth embodiment of the invention.
Figure 7B:
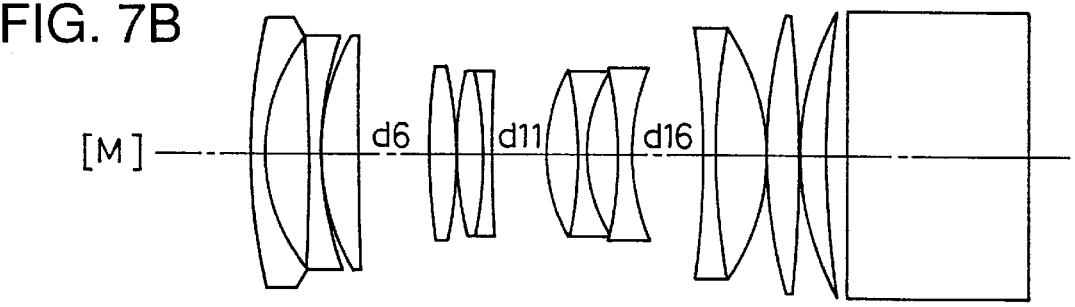
Figure 7C:
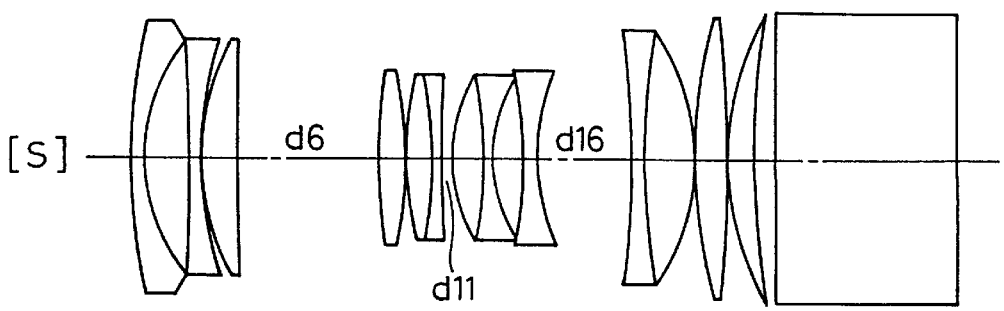
Figure 9A:
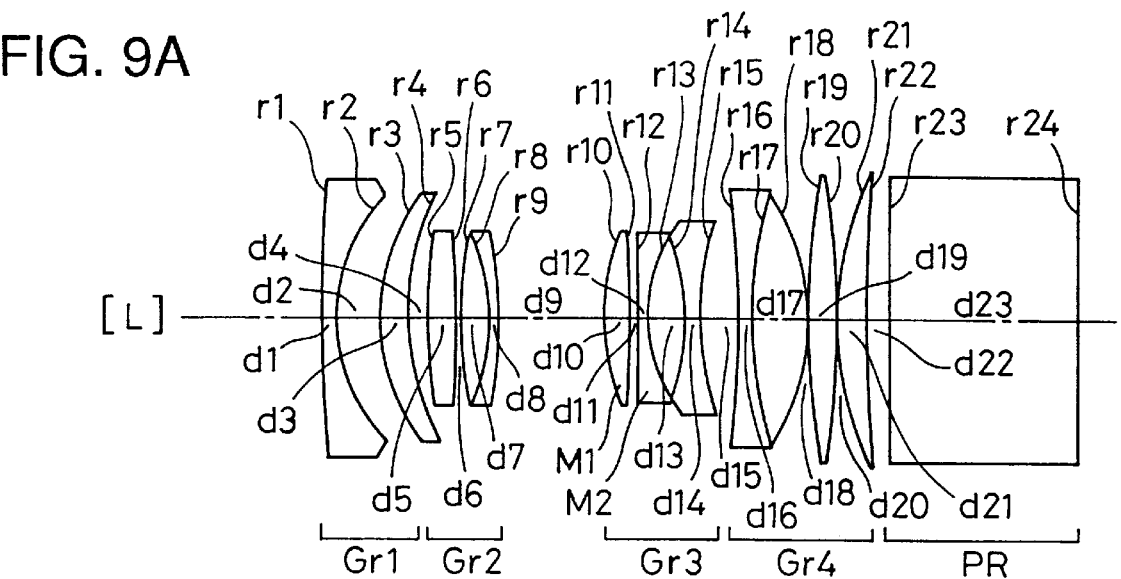
FIGS. 9A to 9C are lens arrangement diagrams of a fifth embodiment of the invention.
Figure 9B:
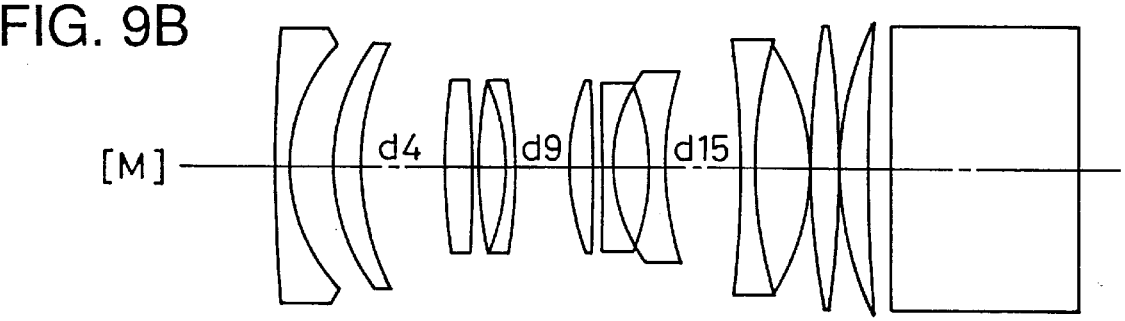
Figure 9C:
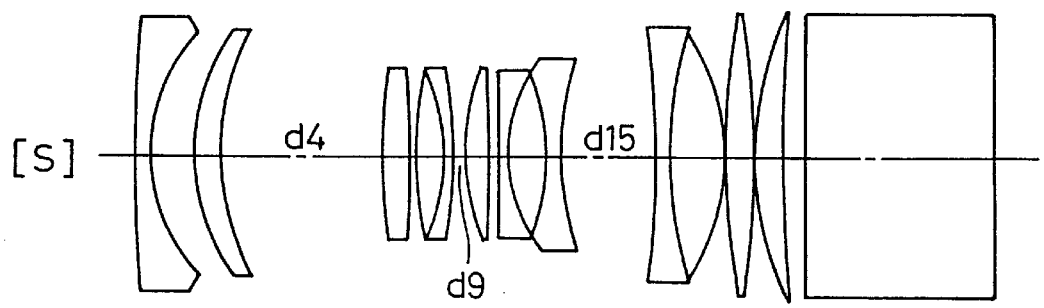
Figure 11A:
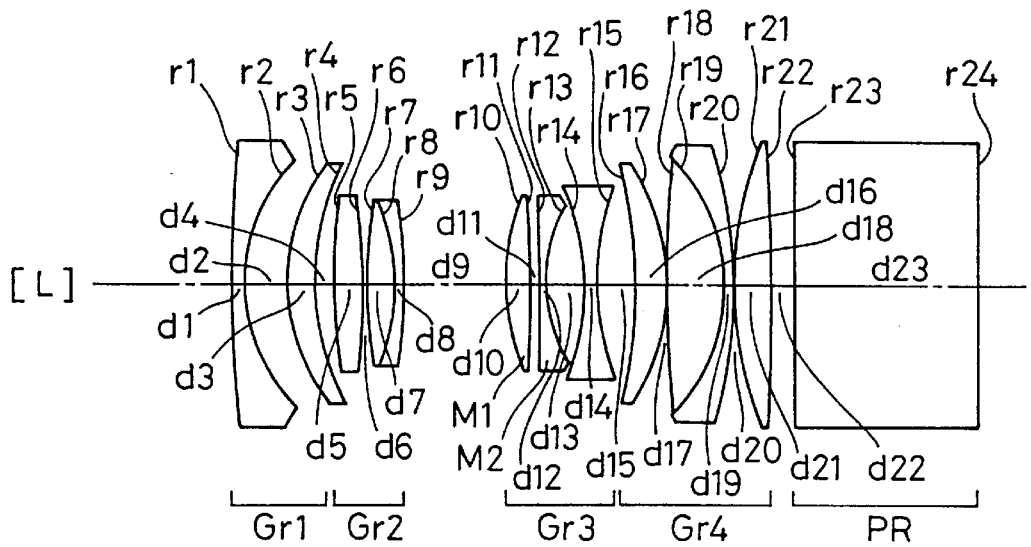
FIGS. 11A to 11C are lens arrangement diagrams of a sixth embodiment of the invention.
Figure 11B:
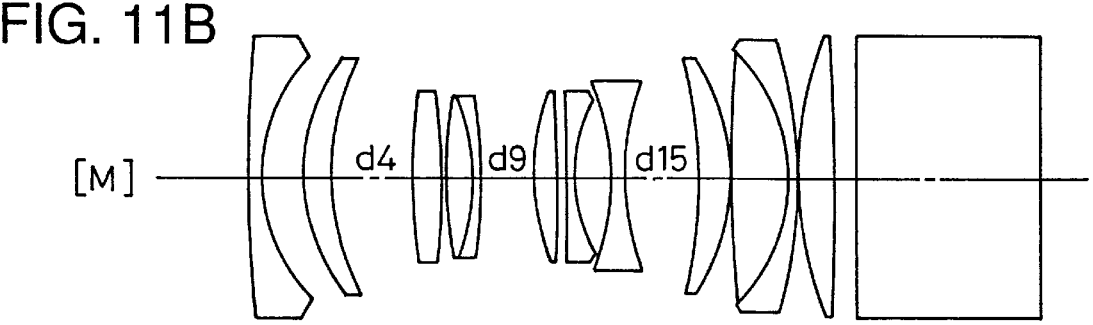
Figure 11C:
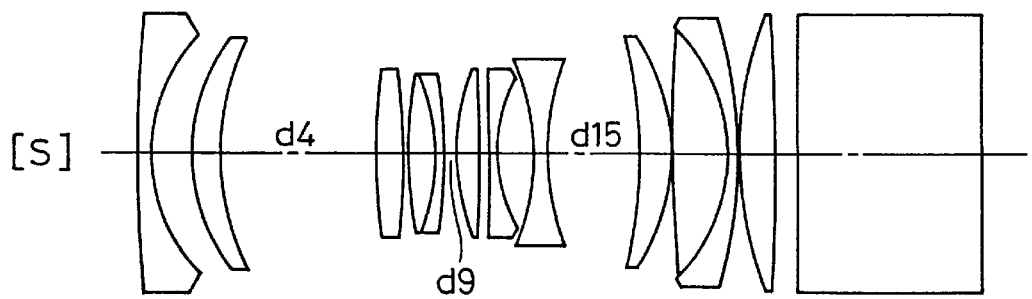
Figure 13A:
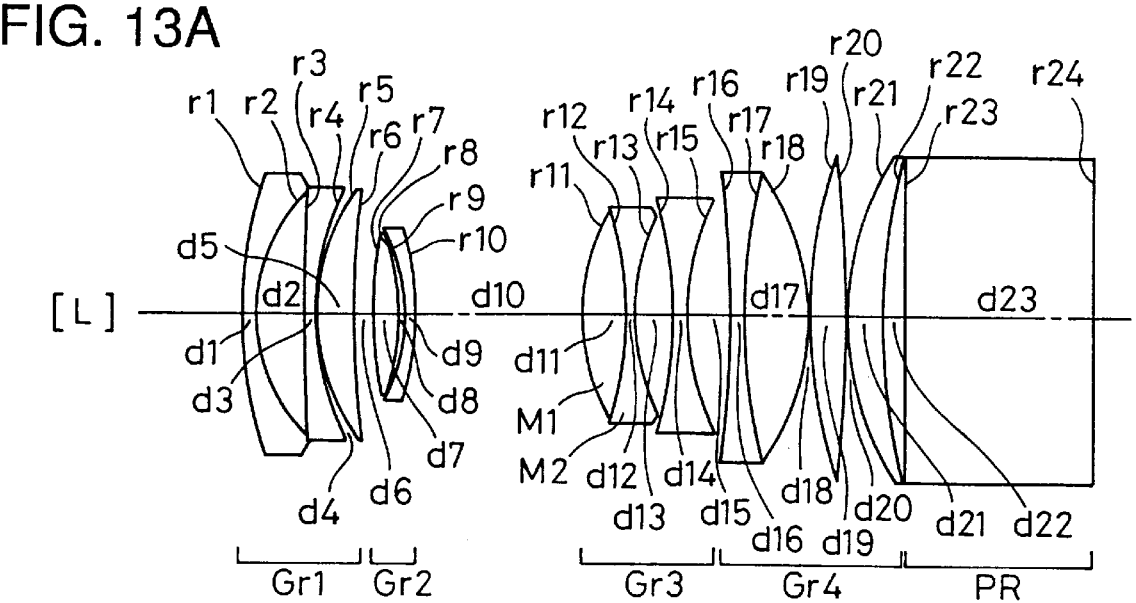
FIGS. 13A to 13C are lens arrangement diagrams of a seventh embodiment of the invention.
Figure 13B:
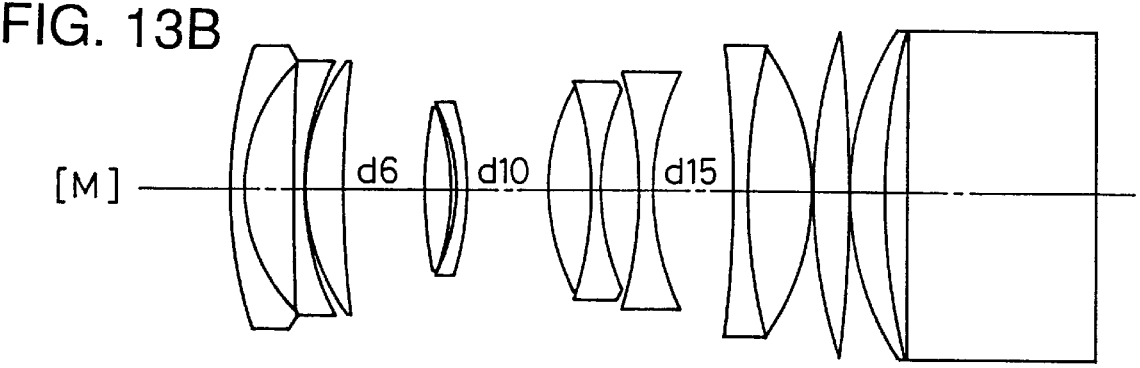
Figure 13C:
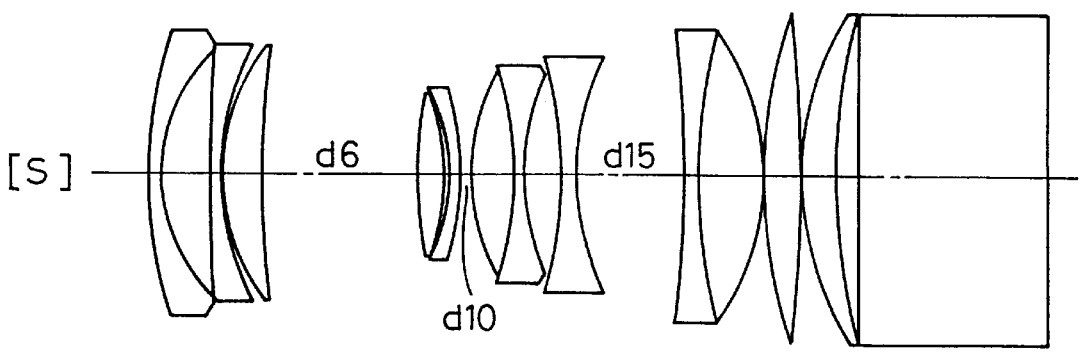
Figure 15A:
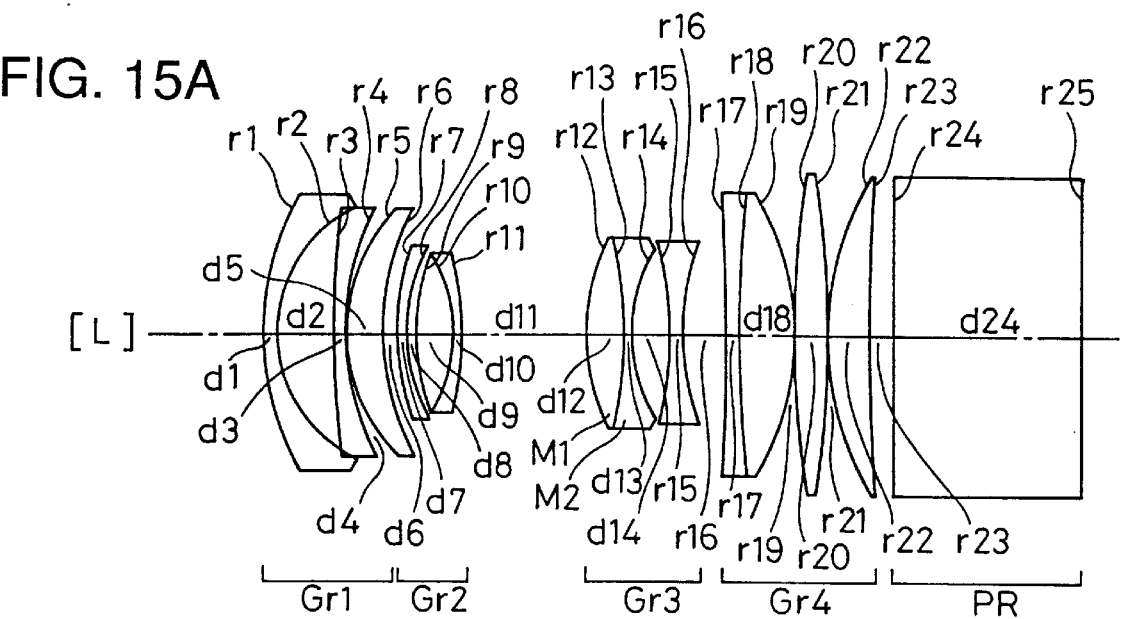
FIGS. 15A to 15C are lens arrangement diagrams of an eighth embodiment of the invention.
Figure 15B:
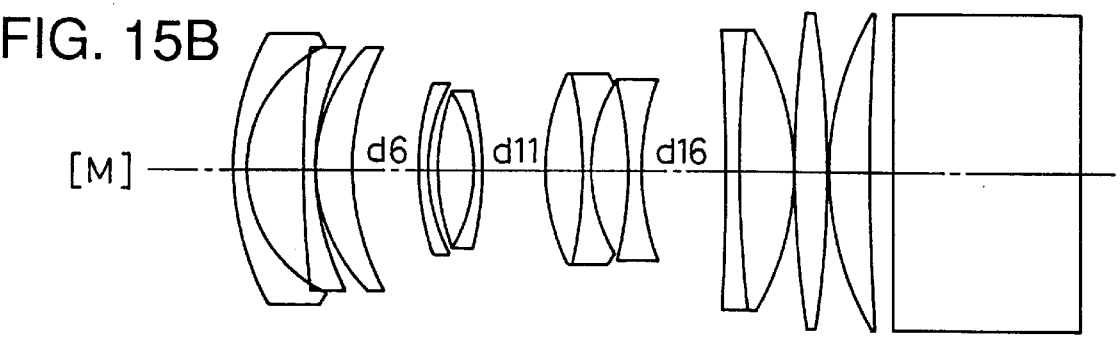
Figure 15C:
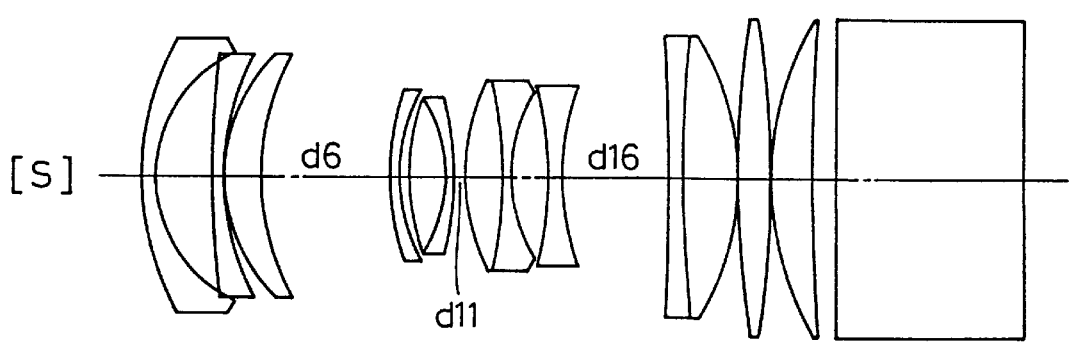
Figure 17A:
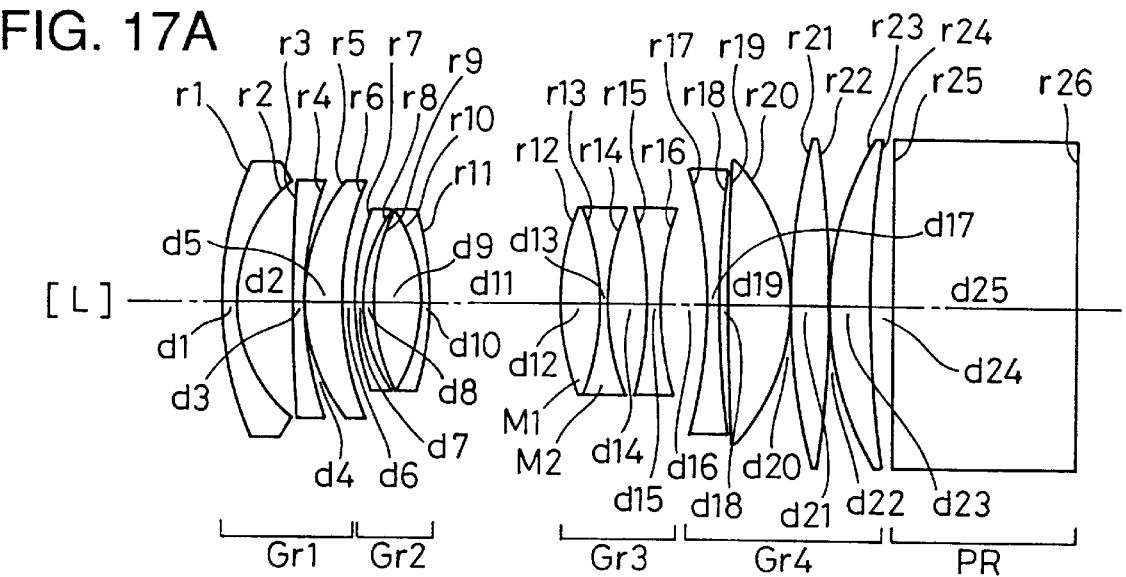
FIGS. 17A to 17C are lens arrangement diagrams of a ninth embodiment of the invention.
Figure 17B:
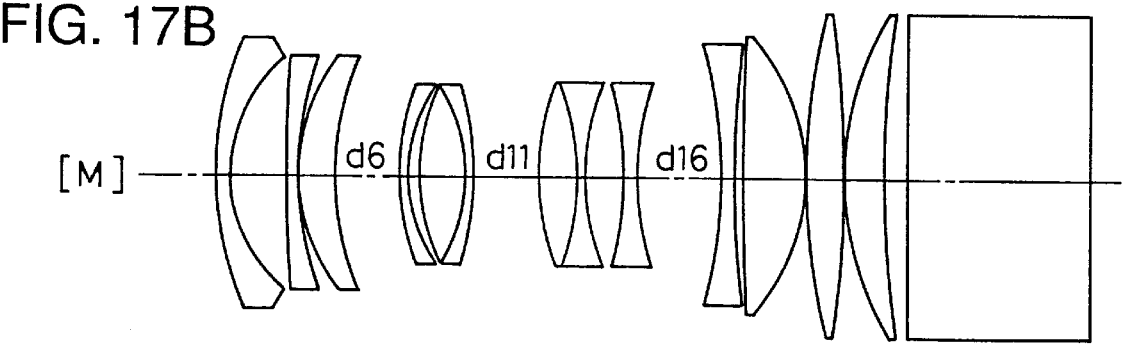
Figure 17C:
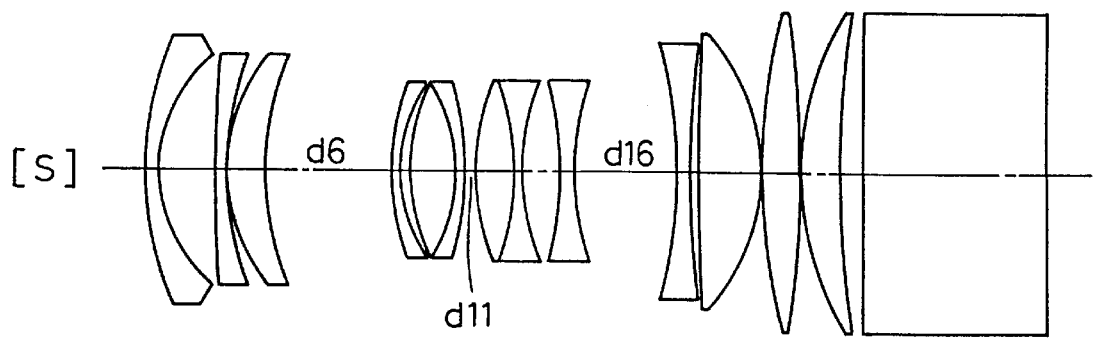
Figure 19A:
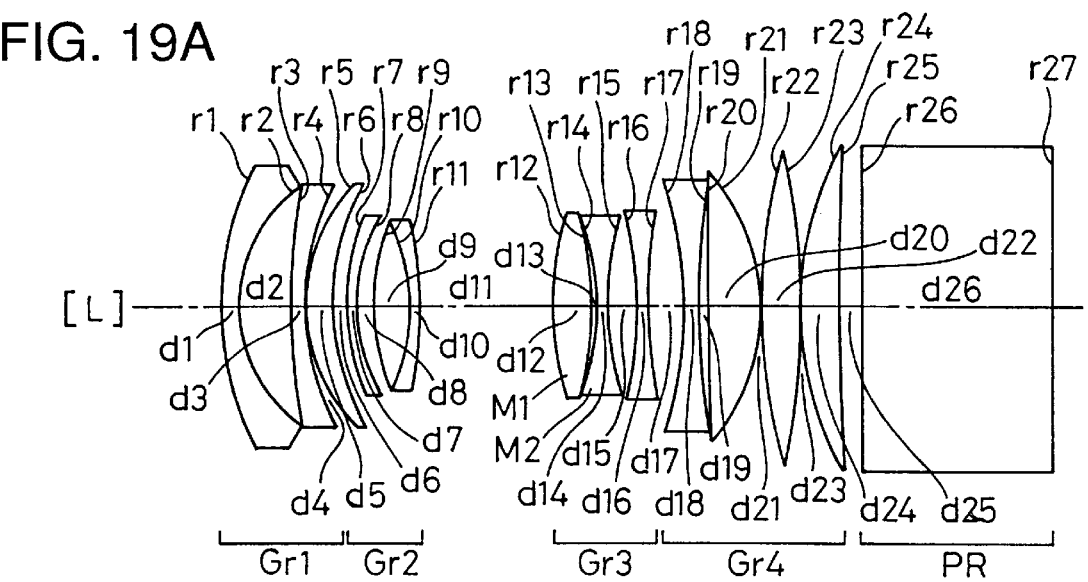
FIGS. 19A to 19C are lens arrangement diagrams of a tenth embodiment of the invention.
Figure 19B:
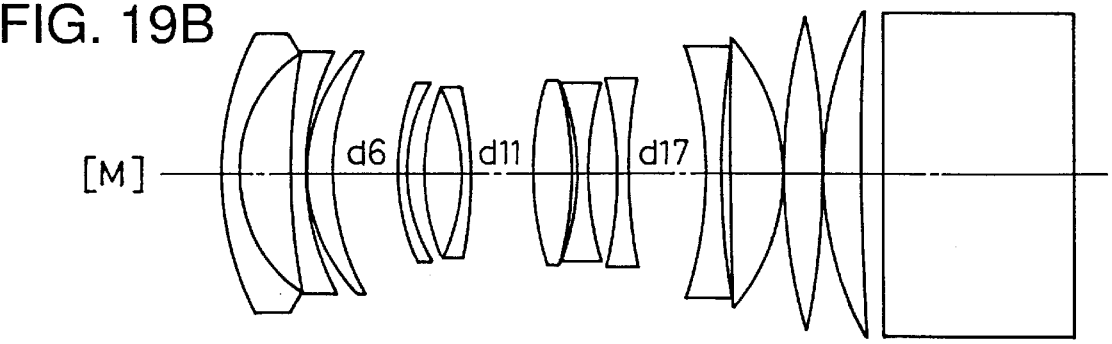
Figure 19C:
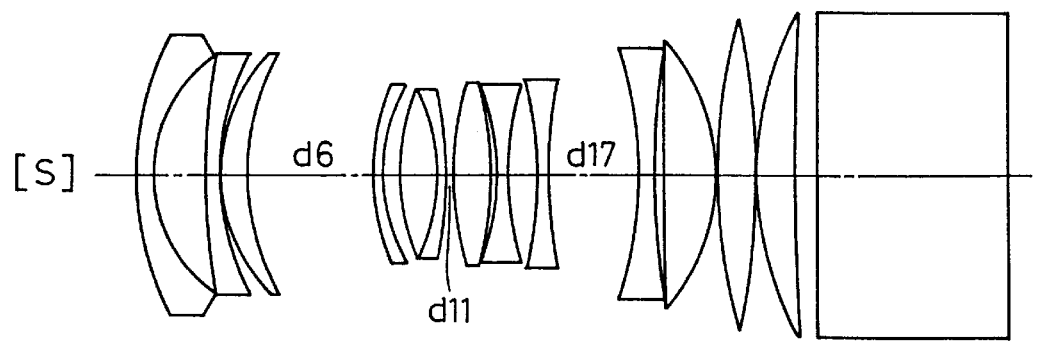
Figure 21A:
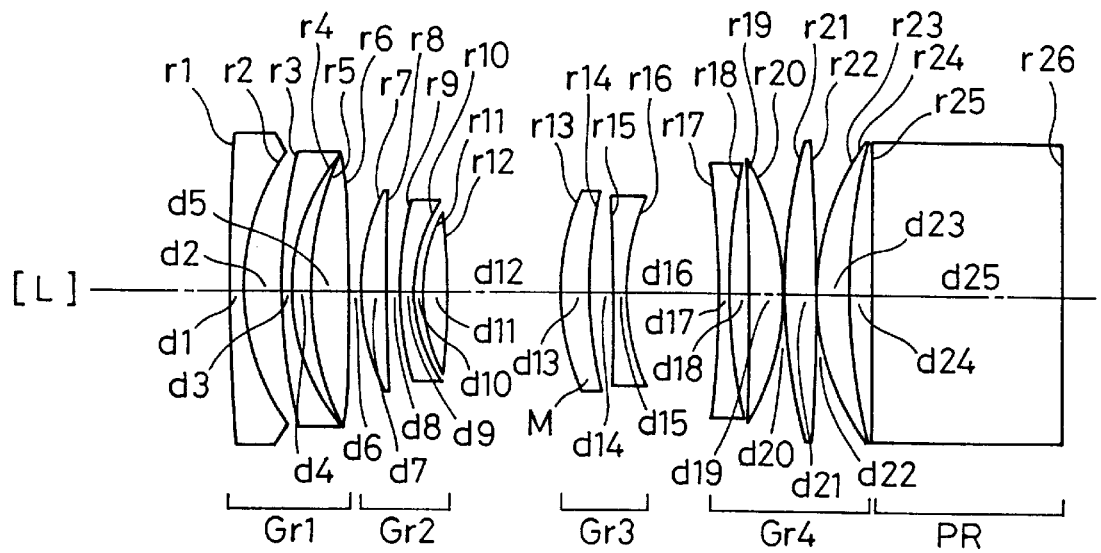
FIGS. 21A to 21C are lens arrangement diagrams of an eleventh embodiment of the invention.
Figure 21B:
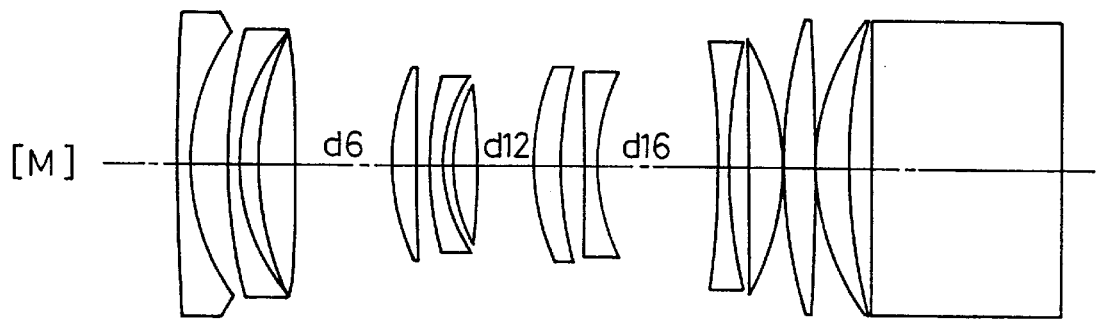
Figure 21C:
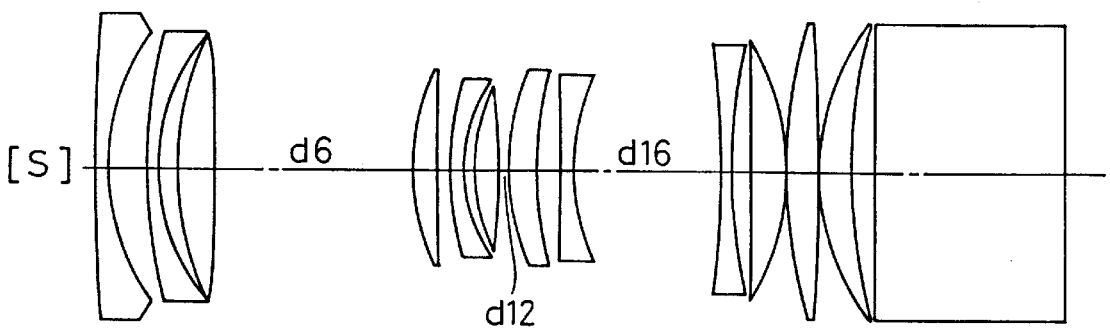
Figure 23A:
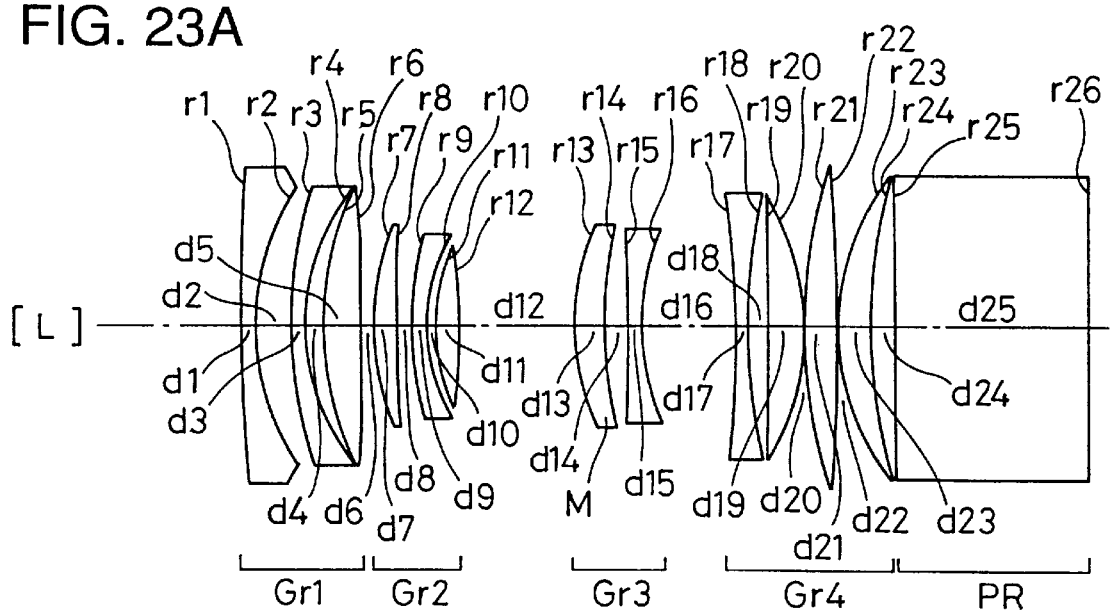
FIGS. 23A to 23C are lens arrangement diagrams of an twelfth embodiment of the invention.
Figure 23B:
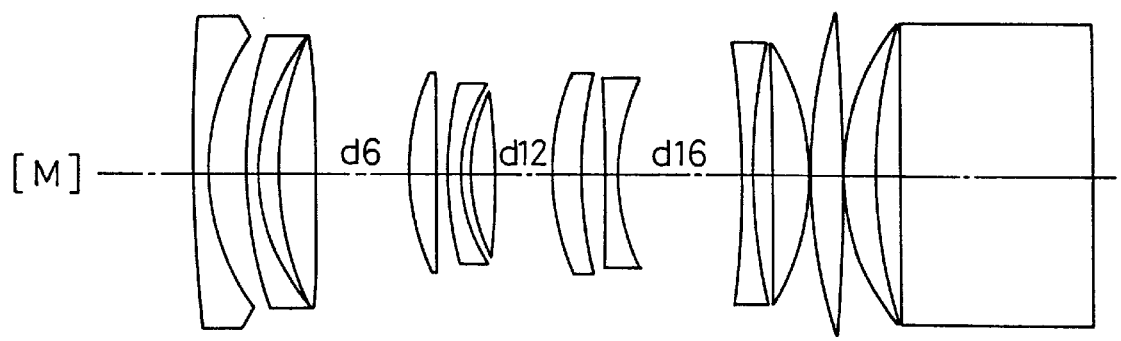
Figure 23C:
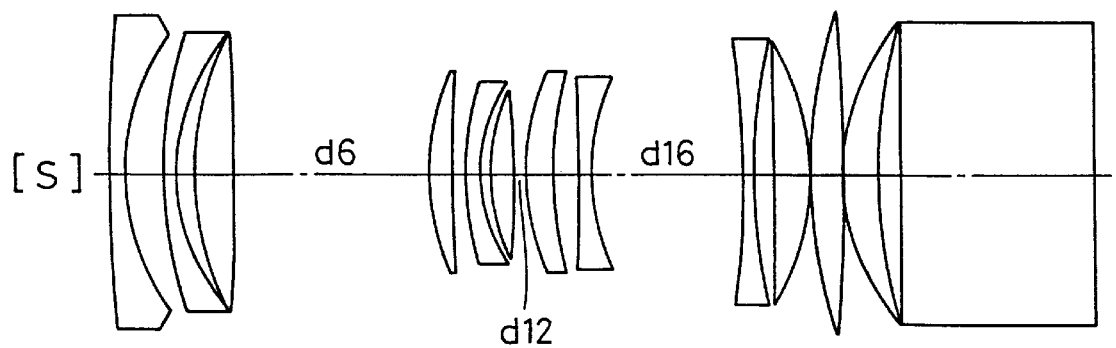
Figure 25A:
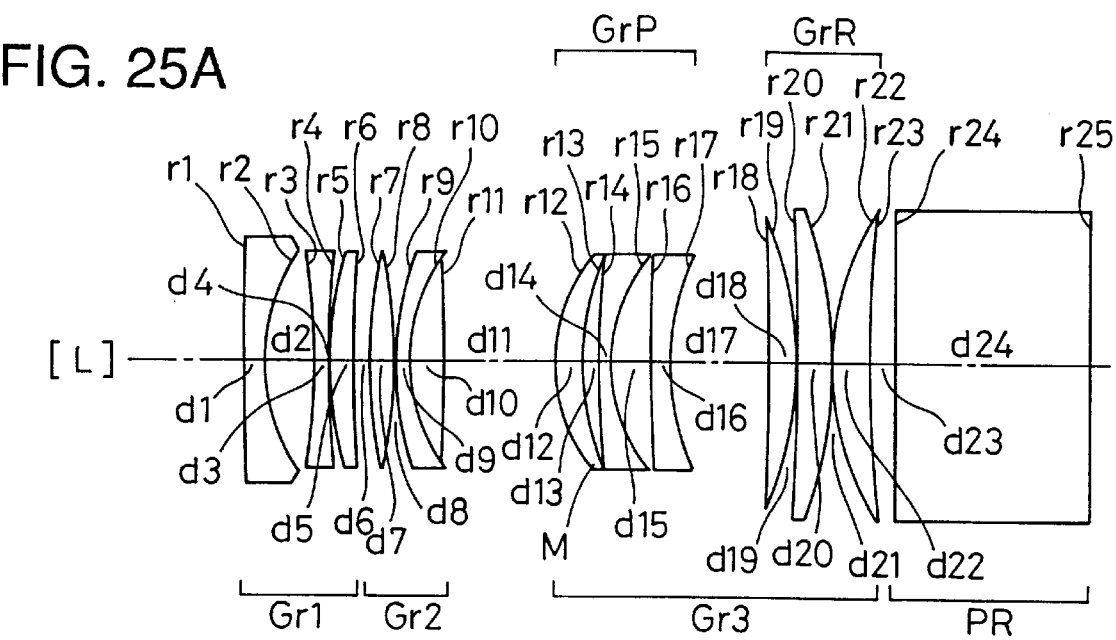
FIGS. 25A to 25C are lens arrangement diagrams of a thirteenth embodiment of the invention.
Figure 25B:
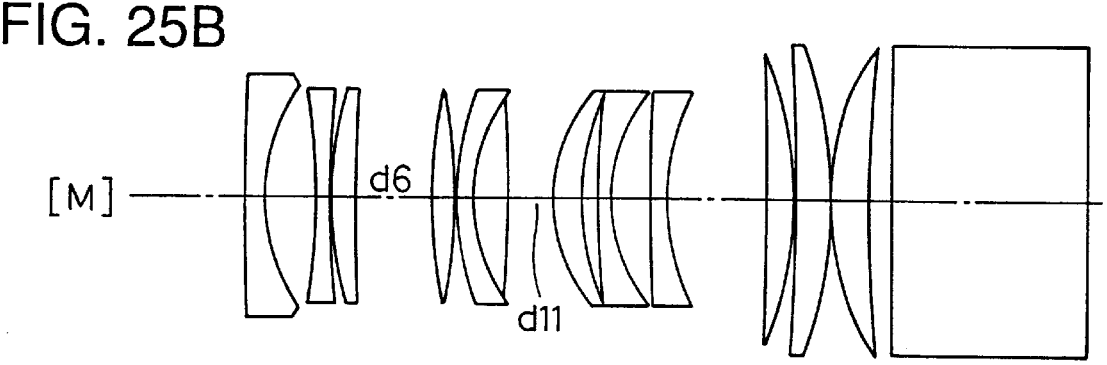
Figure 25C:
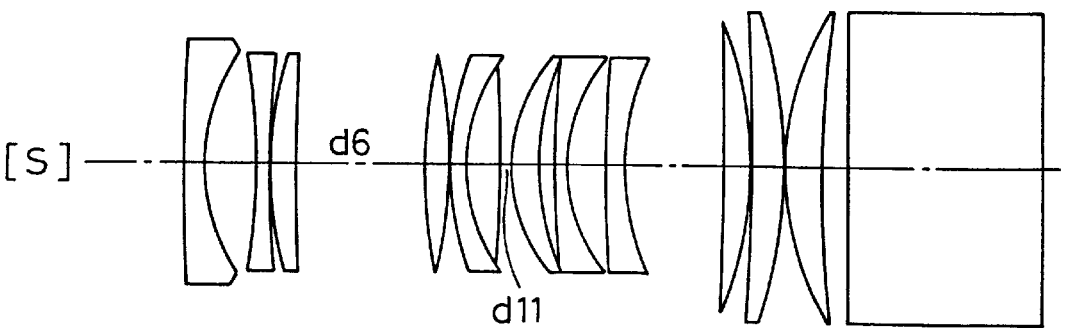
Figure 27A:
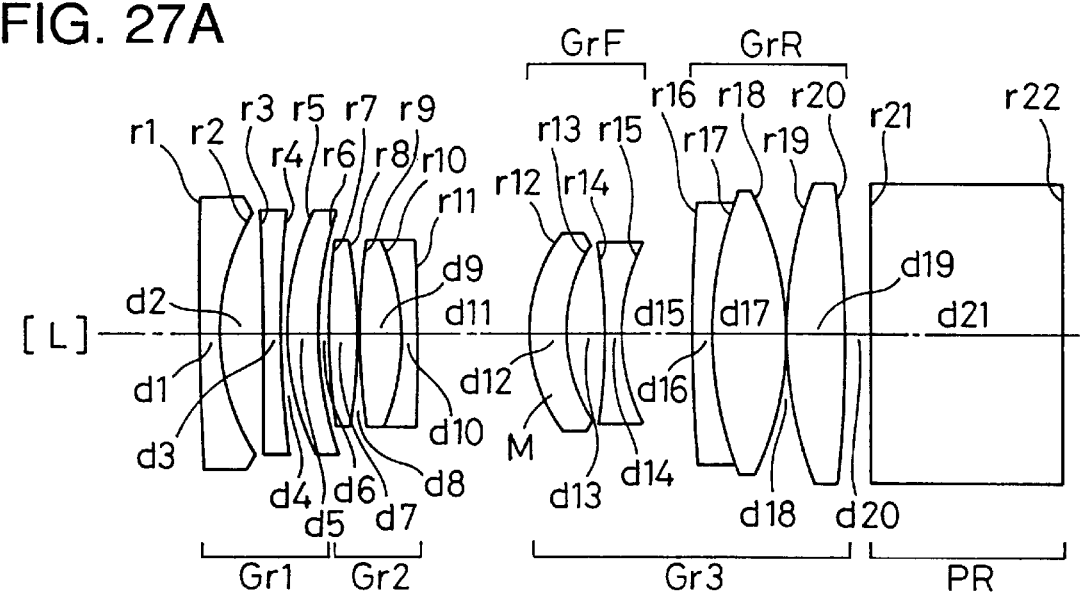
FIGS. 27A to 27C are lens arrangement diagrams of a fourteenth embodiment of the invention.
Figure 27B:
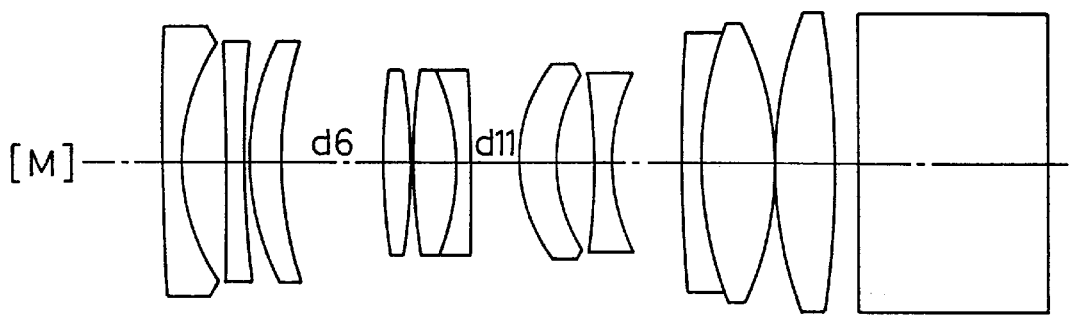
Figure 27C:
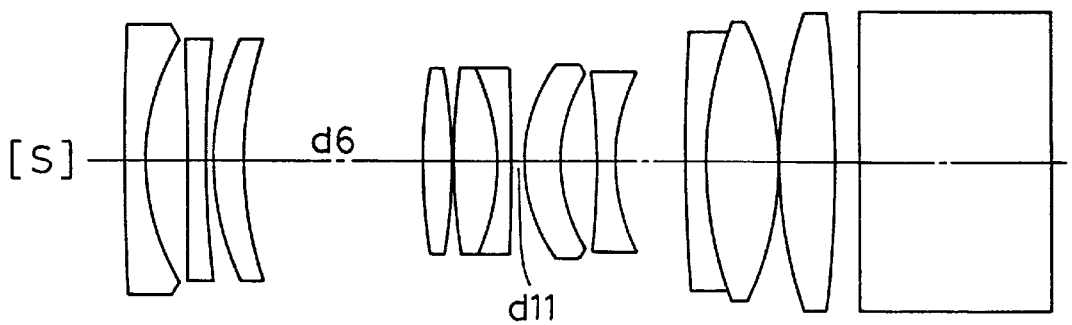
Figure 29A:
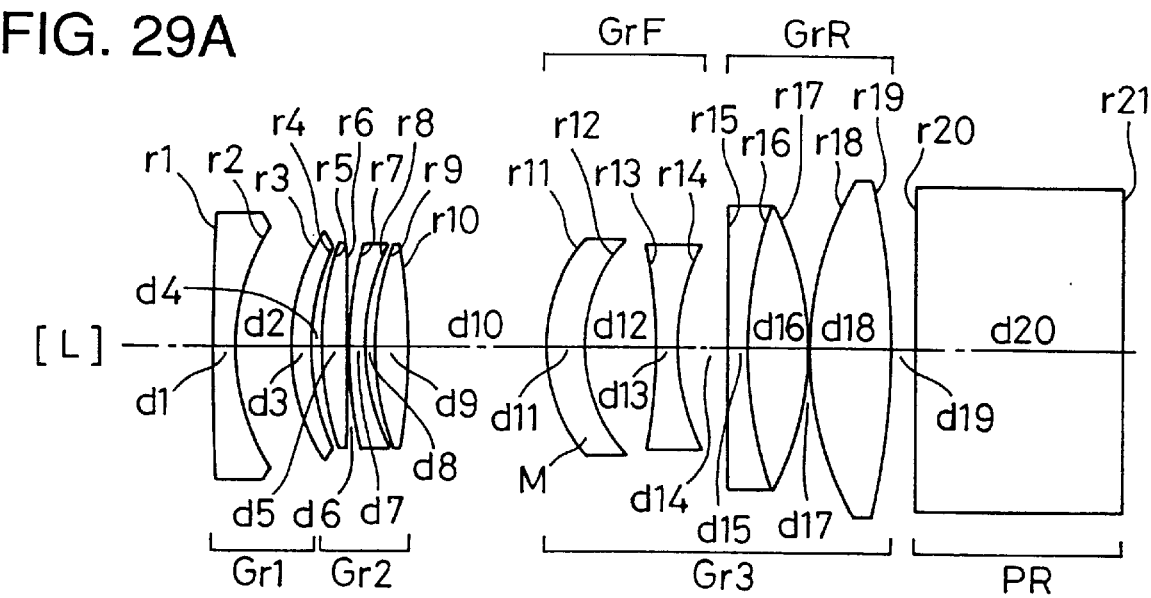
FIGS. 29A to 29C are lens arrangement diagrams of a fifteenth embodiment of the invention.
Figure 29B:
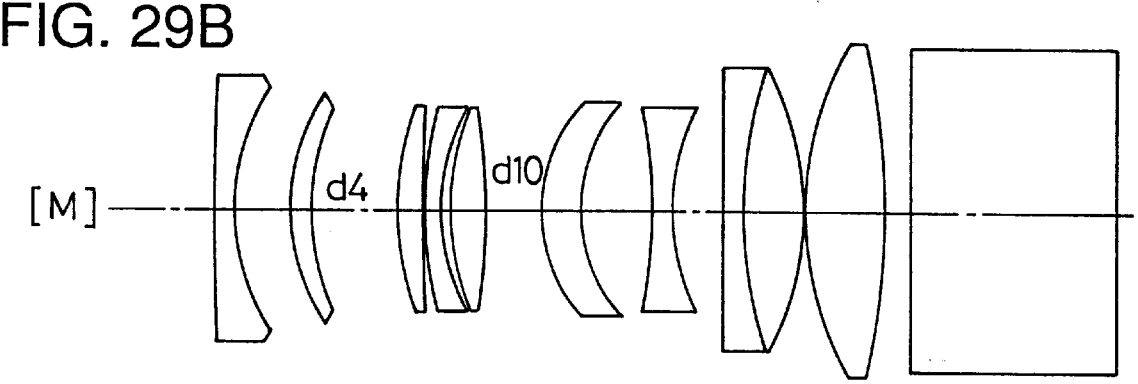
Figure 29C:
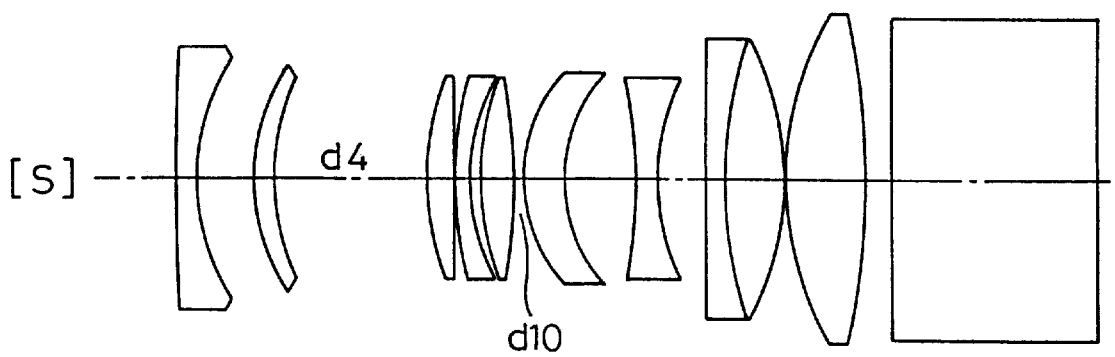
Figure 31A:
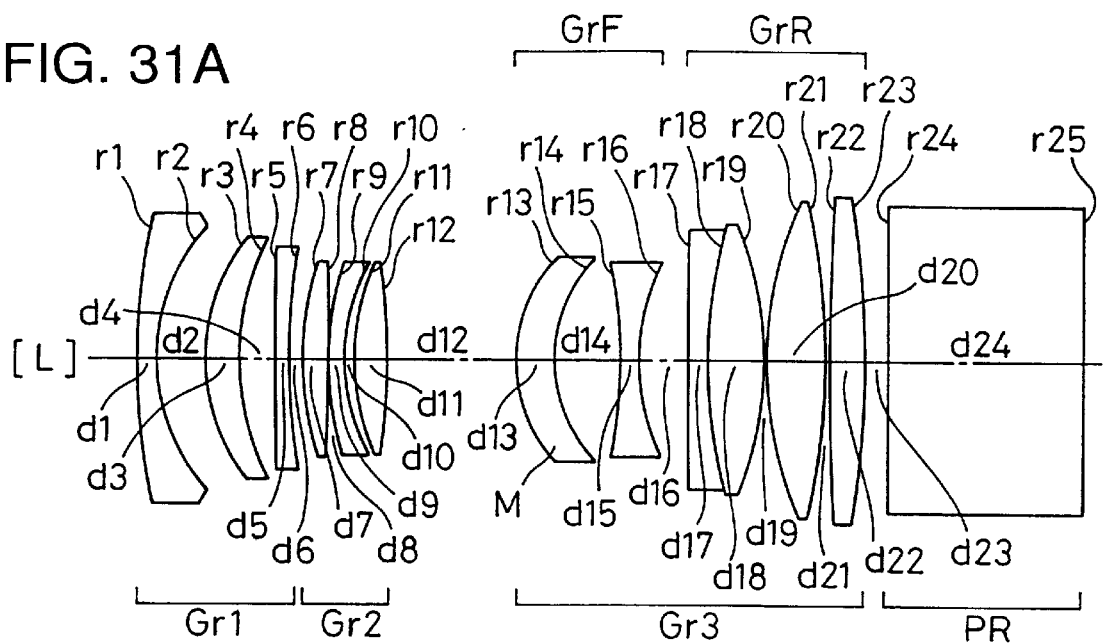
FIGS. 31A to 31C are lens arrangement diagrams of a sixteenth embodiment of the invention.
Figure 31B:
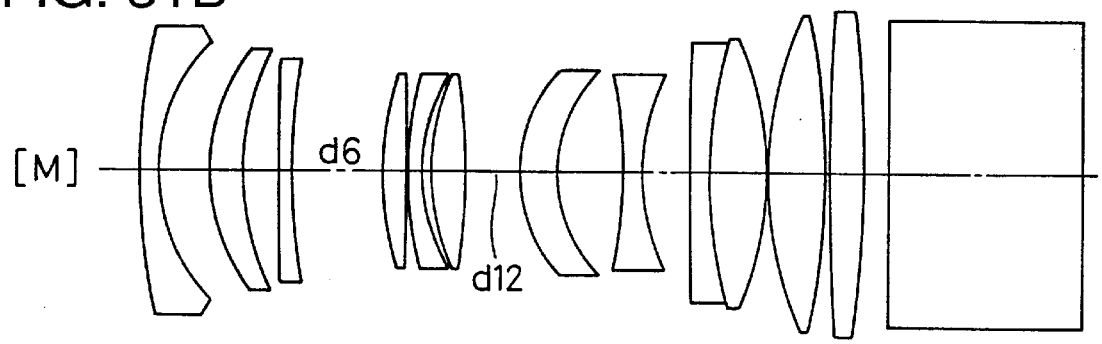
Figure 31C:
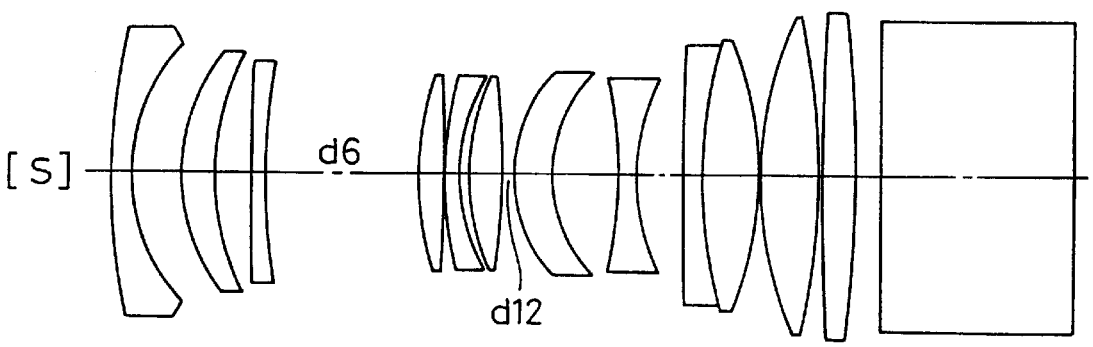
Figure 33A:
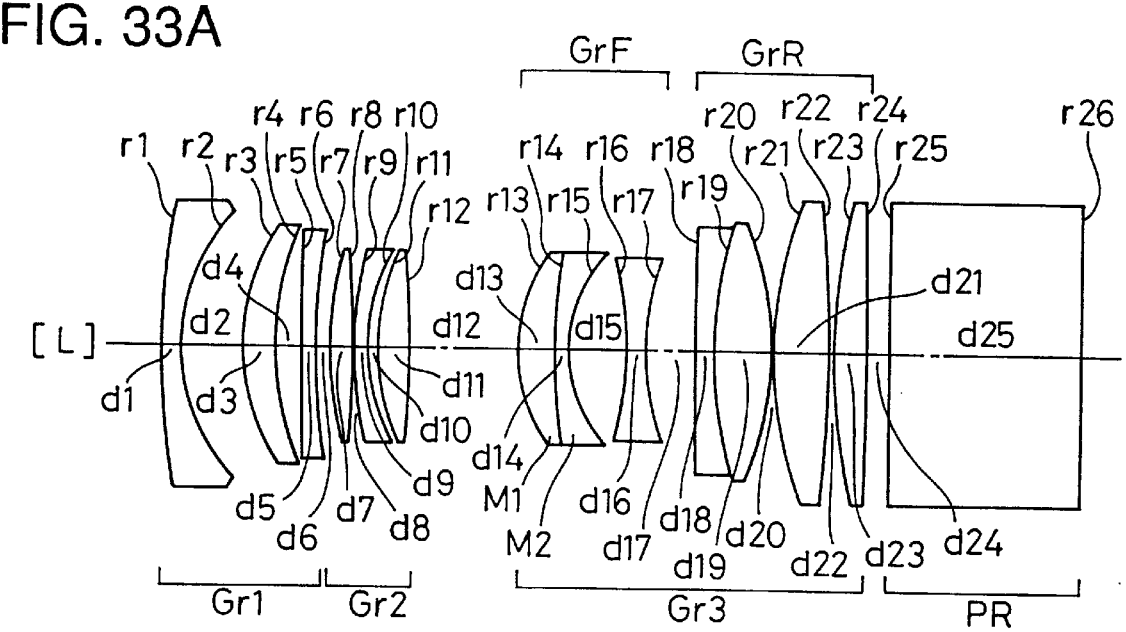
FIGS. 33A to 33C are lens arrangement diagrams of a seventeenth embodiment of the invention.
Figure 33B:
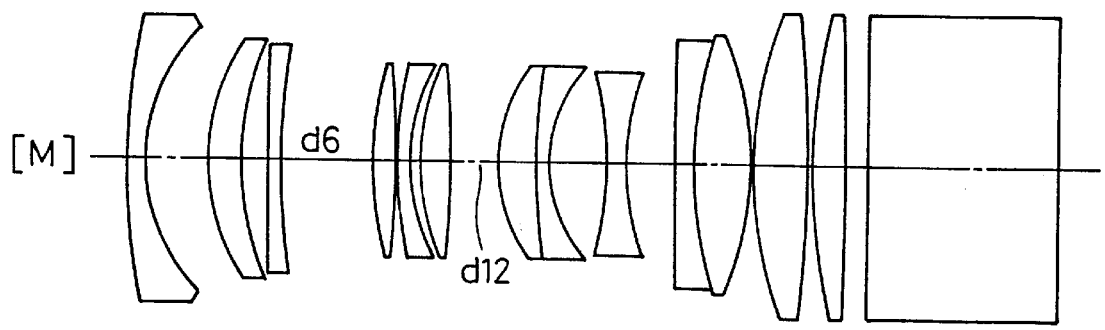
Figure 33C:
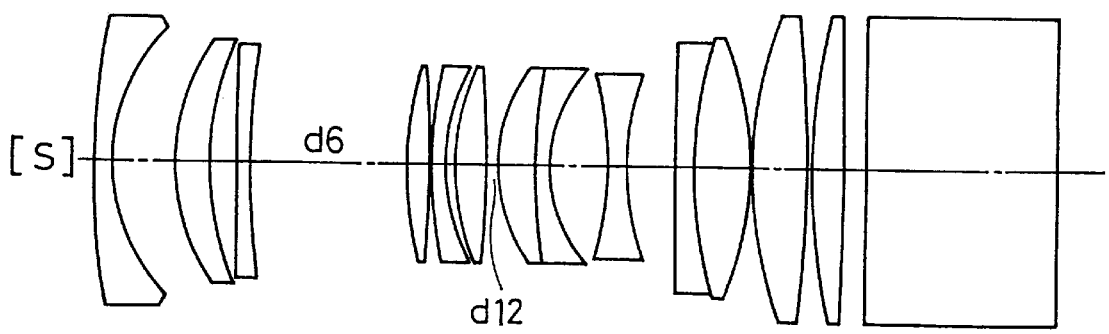
Figure 35A:
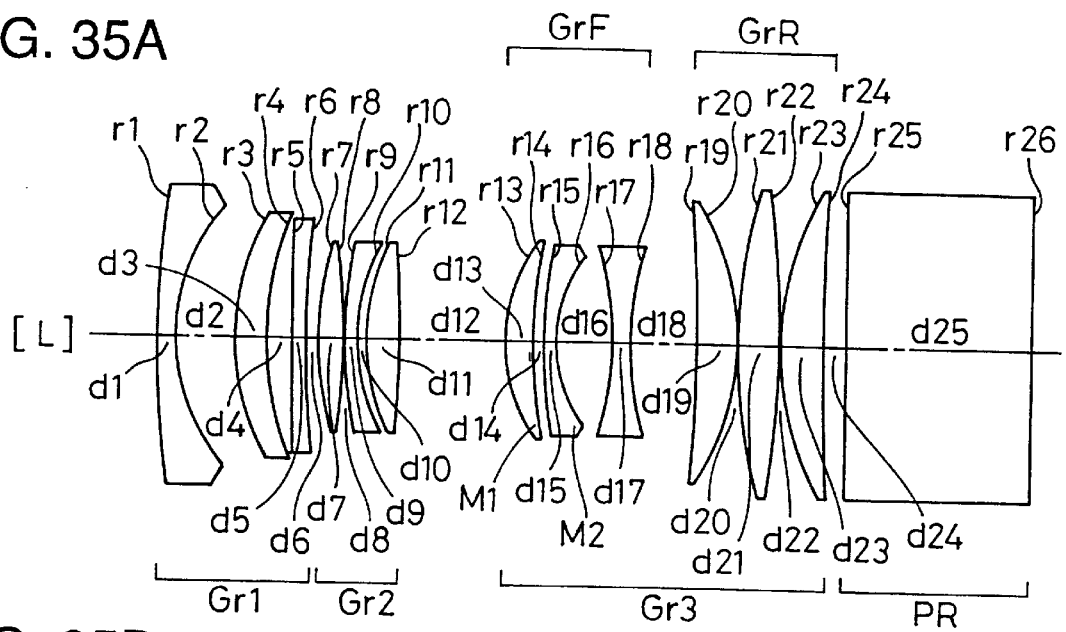
FIGS. 35A to 35C are lens arrangement diagrams of an eighteenth embodiment of the invention.
Figure 35B:
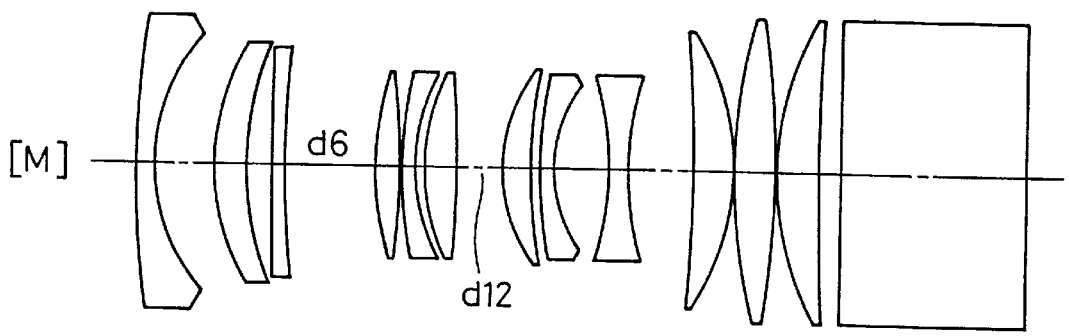
Figure 35C:
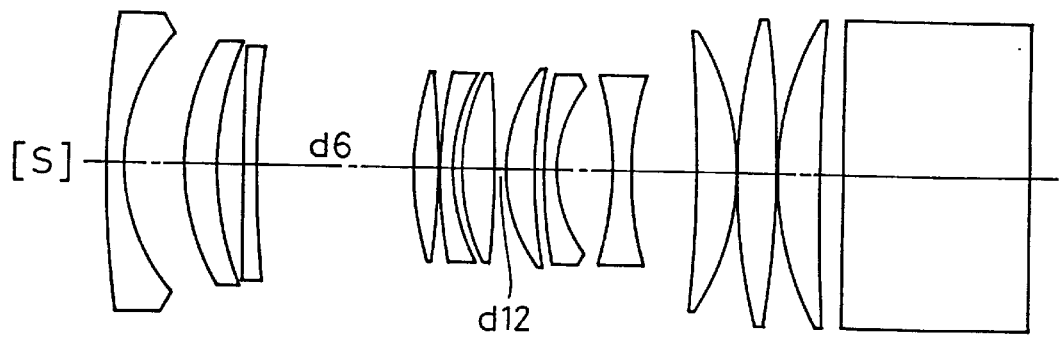
Figure 37A:
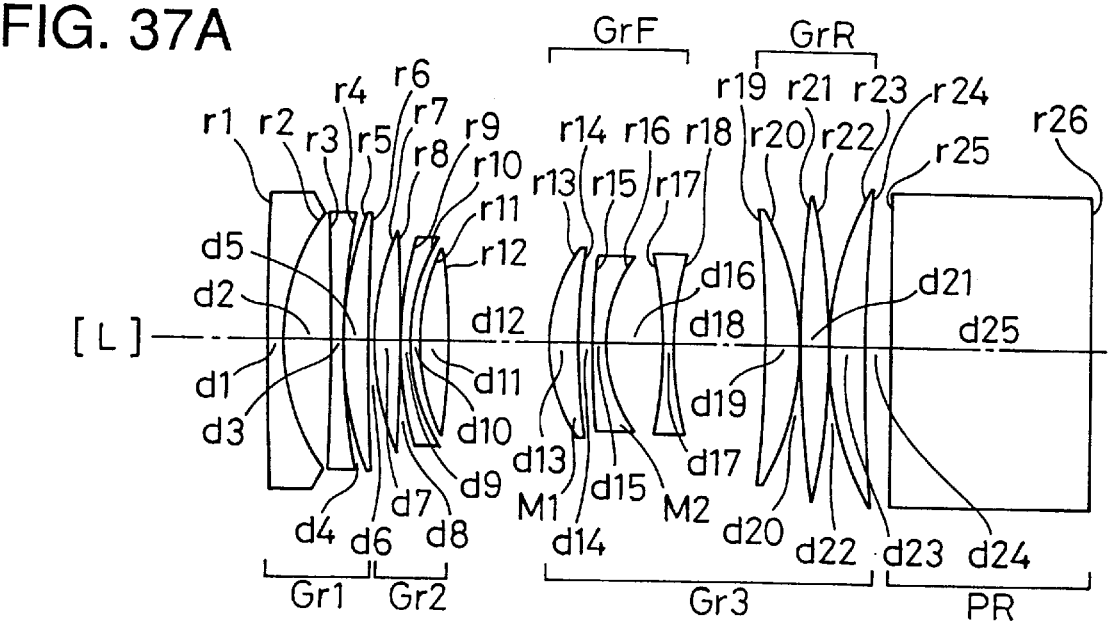
FIGS. 37A to 37C are lens arrangement diagrams of a nineteenth embodiment of the invention.
Figure 37B:
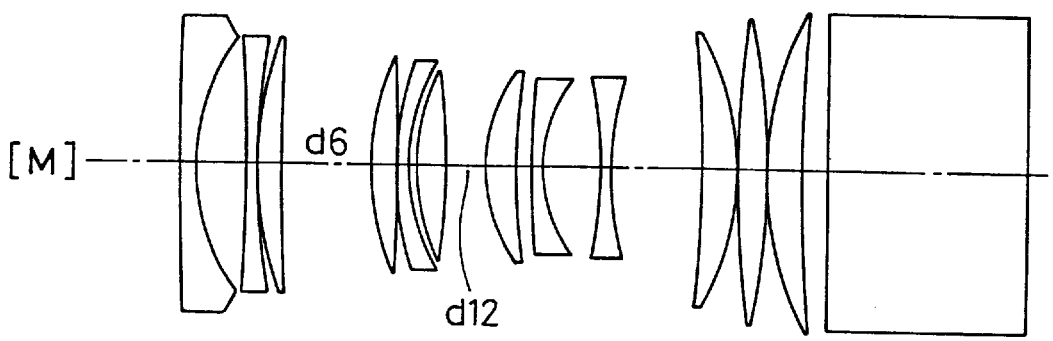
Figure 37C:
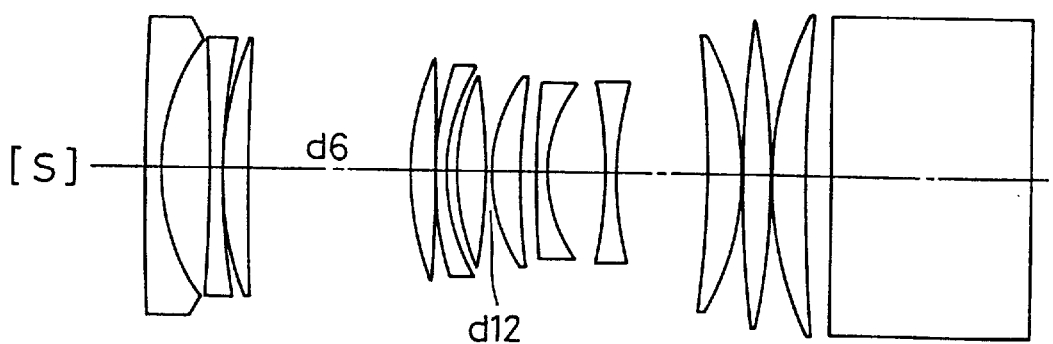
Figure 39A:
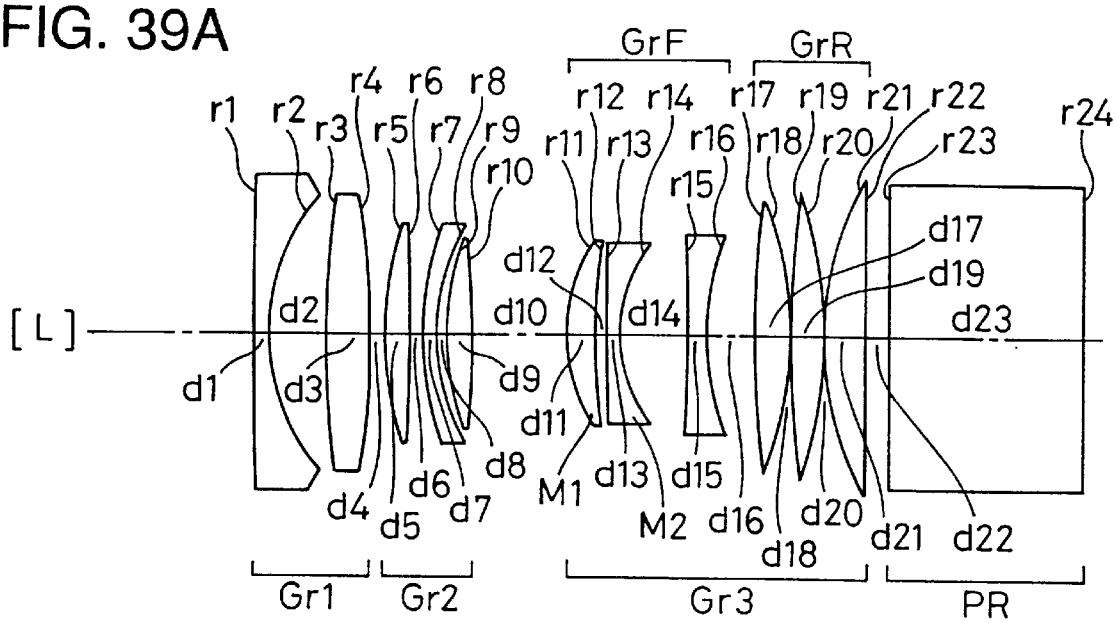
FIGS. 39A to 39C are lens arrangement diagrams of a twentieth embodiment of the invention.
Figure 39B:
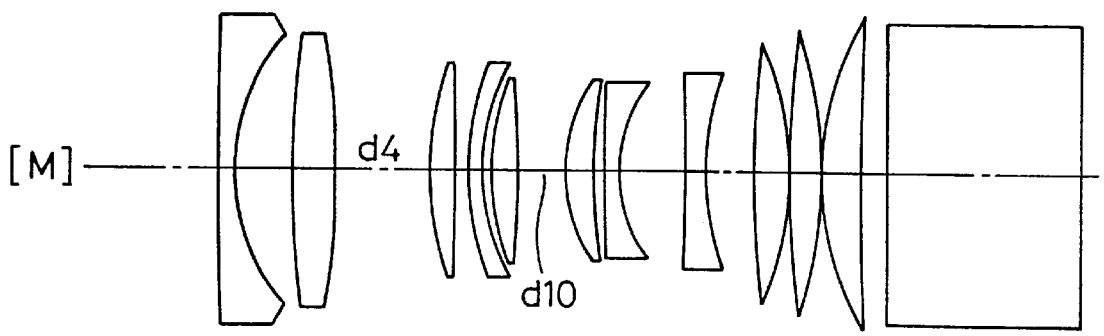
Figure 39C:
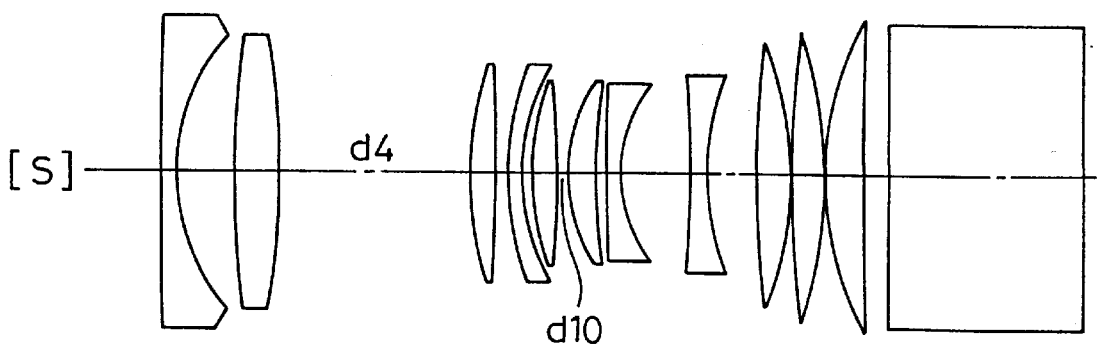
Figure 41A:
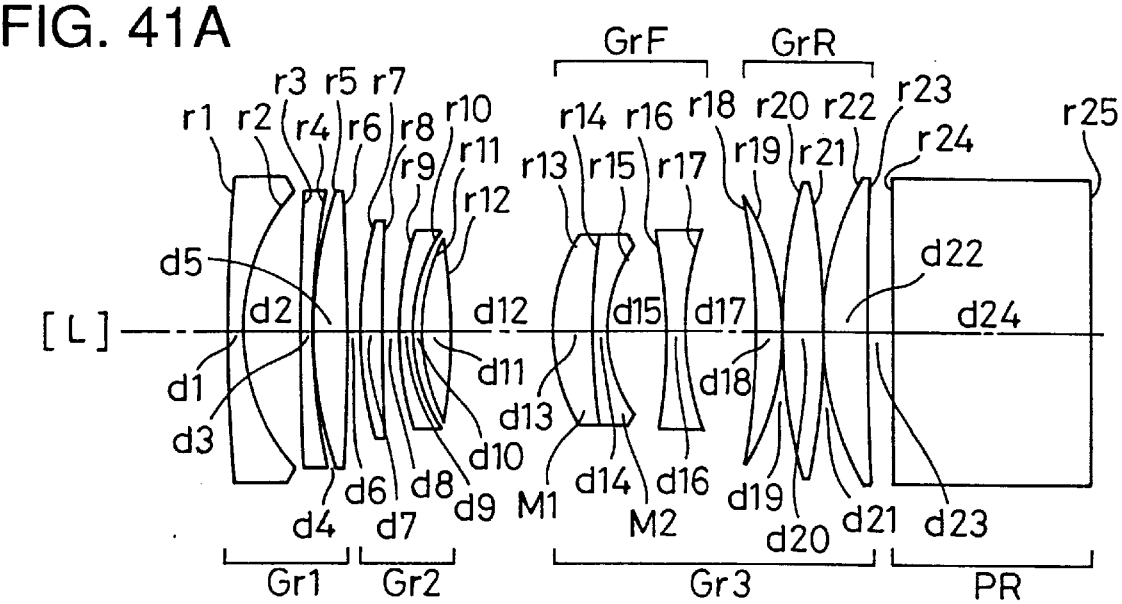
FIGS. 41A to 41C are lens arrangement diagrams of a twenty-first embodiment of the invention.
Figure 41B:
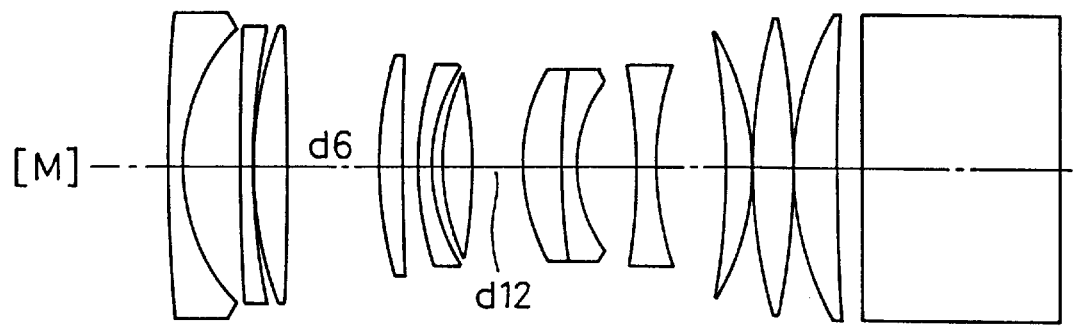
Figure 41C:
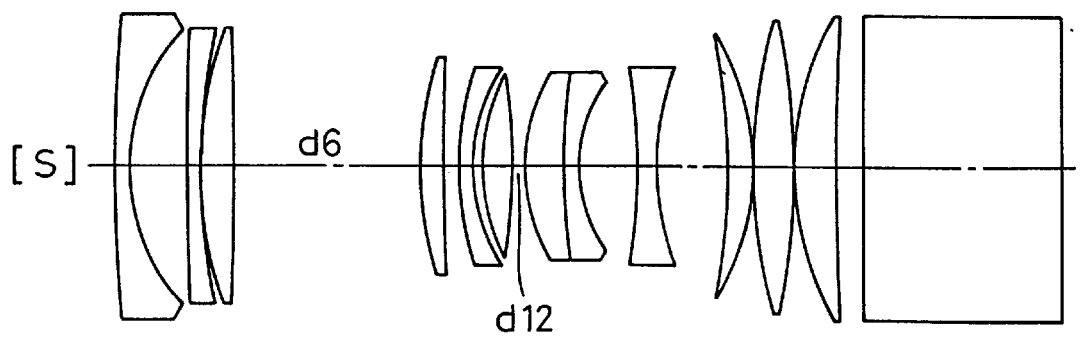

FIGS. 1A–1C, 3A–3C, 5A–5C, 7A–7C, 9A–9C, 11A–11C, 13A–13C, 15A–15C, 17A–17C, 19A–19C, 21A–21C, 23A–23C, 25A–25C, 27A–27C, 29A–29C, 31A–31C, 33A–33C, 35A–35C, 37A–37C, 39A–39C, and 41A–41C are lens construction diagrams of the zoom lens systems of first to twenty-first embodiments, respectively, of the invention. Of these diagrams, FIGS. 1A, 3A, 5A, 7A, 9A, 11A, 13A, 15A, 17A, 19A, 21A, 23A, 25A, 27A, 29A, 31A, 33A, 35A, 37A, 39A, and 41A illustrate the lens arrangement in the telephoto-end condition (longest-focal-length condition) [L], FIGS. 1B, 3B, 5B, 7B, 9B, 11B, 13B, 15B, 17B, 19B, 21B, 23B, 25B, 27B, 29B, 31B, 33B, 35B, 37B, 39B, and 41B illustrate the lens arrangement in the middle condition (middle-focal-length condition) [M], and FIGS. 1C, 3C, 5C, 7C, 9C, 11C, 13C, 15C, 17C, 19C, 21C, 23C, 25C, 27C, 29C, 31C, 33C, 35C, 37C, 39C, and 41C illustrate the lens arrangement in the wide-angle-end condition (shortest-focal-length condition) [S]. In these lens arrangement diagrams, ri (i=1, 2, 3, . . . ) represents the i-th surface from the enlargement side, and di (i=1, 2, 3, . . . ) represents the i-th axial distance from the enlargement side.

Of these 21 embodiments, the first to twelfth embodiments are four-unit zoom lens systems of a negative-positive-negative-positive constitution, and the thirteenth to twenty-first embodiments are three-unit zoom lens systems of a negative-positive-positive constitution.

<<Embodiments 1 to 12>>

The first to twelfth embodiments are four-unit zoom lens systems each constituted of, from the enlargement side a first lens unit Gr1 having a negative refractive power, a second lens unit Gr2 having a positive refractive power, a third lens unit Gr3 having a negative refractive power, and a fourth lens unit Gr4 having a positive refractive power. In addition, a dichroic prism PR is disposed on the reduction side of the fourth lens unit Gr4. All of these zoom lens systems perform zooming by varying the distances between the first to fourth lens units Gr1 to Gr4; specifically, during zooming from the wide-angle end [S] to the telephoto end [L], the second lens unit Gr2 is moved along the optical axis in such a way that the distance between the second and third lens units Gr2 and Gr3 increases, and, at the same time, the third lens unit Gr3 is moved along the optical axis in such a way that the distance between the third and fourth lens units Gr3 and Gr4 decreases. The third lens unit Gr3 includes at least one negative lens element, and the fourth lens unit Gr4 includes at least two positive lens elements. The constitution of the first to fourth lens units Gr1 to Gr4 in each embodiment will be described in more detail below.

<The Constitution of the First Lens Unit Gr1>

In the first and fourth embodiments, the first lens unit Gr1 consists of, from the enlargement side, a negative meniscus lens element concave to the reduction side, a negative biconcave lens element, and a positive meniscus lens element convex to the enlargement side. In the second, seventh to tenth, and twelfth embodiments, the first lens unit Gr1 consists of, from the enlargement side, two negative meniscus lens elements both concave to the reduction side, and a positive meniscus lens element convex to the enlargement side. In the third embodiment, the first lens unit Gr1 consists of, from the enlargement side, a negative meniscus lens element concave to the reduction side, a negative biconcave lens element, and a positive biconvex lens element. In the fifth and sixth embodiments, the first lens unit Gr1 consists of, from the enlargement side, a negative meniscus lens element concave to the reduction side, and a positive meniscus lens element convex to the enlargement side. In the eleventh embodiment, the first lens unit Gr1 consists of, from the enlargement side, two negative meniscus lens elements both concave to the reduction side, and a positive biconvex lens element.

<The Constitution of the Second Lens Unit Gr2>

In the first embodiment, the second lens unit Gr2 consists of, from the enlargement side, a positive biconvex lens element, a negative meniscus lens element concave to the reduction side, and a positive biconvex lens element. In the second, and eighth to tenth embodiments, the second lens unit Gr2 consists of, from the enlargement side, a negative meniscus lens element concave to the reduction side, and a doublet lens element formed by joining together a positive biconvex lens element and a negative meniscus lens element concave to the enlargement side. In the third embodiment, the second lens unit Gr2 consists of, from the enlargement side, a positive biconvex lens element, a negative meniscus lens element concave to the reduction side, and a positive meniscus lens element convex to the enlargement side. In the fourth embodiment, the second lens unit Gr2 consists of, from the enlargement side, a positive biconvex lens element, and a doublet lens element formed by joining together a positive biconvex lens element and a negative biconcave lens element. In the fifth and sixth embodiments, the second lens unit Gr2 consists of, from the enlargement side, a positive biconvex lens element, and a doublet lens element formed by joining together a positive biconvex lens element and a negative meniscus lens element concave to the enlargement side. In the seventh embodiment, the second lens unit Gr2 consists of, from the enlargement side, a positive biconvex lens element, and a negative meniscus lens element concave to the enlargement side. In the eleventh and twelfth embodiments, the second lens unit Gr2 consists of, from the enlargement side, a positive meniscus lens element convex to the enlargement side, a negative meniscus lens element concave to the reduction side, and a positive biconvex lens element.

<The Constitution of the Third Lens Unit Gr3>

In the first, second, eleventh, and twelfth embodiments, the third lens unit Gr3 consists of, from the enlargement side, a positive meniscus lens element convex to the enlargement side, and a negative biconcave lens element. In the third, fourth, and seventh to ninth embodiments, the third lens unit Gr3 consists of, from the enlargement side, a doublet lens element formed by joining together a positive biconvex lens element and a negative biconcave lens element, and a negative biconcave lens element. In the fifth and tenth embodiments, the third lens unit Gr3 consists of, from the enlargement side, a positive biconvex lens element, and two negative biconcave lens elements. In the sixth embodiment, the third lens unit Gr3 consists of, from the enlargement side, a positive biconvex lens element, a negative meniscus lens element concave to the reduction side, and a negative biconcave lens element.

<The Constitution of the Fourth Lens Unit Gr4>

In the first, second, eleventh, and twelfth embodiments, the fourth lens unit Gr4 consists of, from the enlargement side, a negative biconcave lens element, a positive meniscus lens element convex to the reduction side, a positive biconvex lens element, and a positive meniscus lens element convex to the enlargement side. In the third to fifth, seventh, and eighth embodiments, the fourth lens unit G4 consists of, from the enlargement side, a doublet lens element formed by joining together a negative biconcave lens element and a positive biconvex lens element, a positive biconvex lens element, and a positive meniscus lens element convex to the enlargement side. In the sixth embodiment, the fourth lens unit Gr4 consists of, from the enlargement side, a positive meniscus lens element convex to the reduction side, a doublet lens element formed by joining together a positive biconvex lens element and a negative meniscus lens element concave to the enlargement side, and a positive biconvex lens element. In the ninth and tenth embodiments, the fourth lens unit Gr4 consists of, from the enlargement side, a negative biconcave lens element, two positive biconvex lens elements, and a positive meniscus lens element convex to the enlargement side.

<Aspherical Surface>

In the eleventh embodiment, the reduction-side surface of the positive biconvex lens element included in the first lens unit Gr1 is an aspherical surface. This aspherical surface provided on a positive lens element is designed to exhibit increasingly strong positive refractive powers from center to edge. In the twelfth embodiment, the reduction-side surface of the positive meniscus lens element convex to the enlargement side included in the first lens unit Gr1 is an aspherical surface. This aspherical surface provided oil a positive meniscus lens element is designed to exhibit negative refractive powers in its central portion and positive refractive powers in its peripheral portion.

<The Features of the Third and Fourth Lens Units Gr3 and Gr4>

As noted previously, on the reduction side of the fourth lens unit Gr4 is disposed a dichroic prism PR that performs color synthesis on the light incoming from the liquid crystal panel. Since all of the first to twelfth embodiments are designed primarily as projection optical systems, they need to have a back focal length long enough to secure a space for a dichroic prism PR, and, in addition, they need to be substantially telecentric toward the reduction side so that color shading will be suppressed satisfactorily.

In each embodiment, the third lens unit Gr3 having a negative refractive power and the fourth lens unit Gr4 having a positive refractive power are arranged in such a way that they realize a reversed-telephoto-type arrangement of refractive powers. This makes it possible to secure a sufficiently long back focal length in a projection optical system. Moreover, in each embodiment, a principal ray incident on the third lens unit Gr3 is first refracted by the third lens unit Gr3 to travel away from the optical axis, and is then refracted by the fourth lens unit Gr4 to travel parallel to the optical axis; that is, the entire zoom lens system is designed to be substantially telecentric. This helps reduce color shading and thus improve color rendering at the top, bottom, right, and left edges of the screen.

In the first and some other embodiments, the fourth lens unit Gr4 is constituted of, from the enlargement side, at least one negative lens element and at least two positive lens elements in order to realize a reversed-telephoto-type arrangement of refractive powers as described above in the fourth lens unit Gr4 as well. This makes it possible to secure a sufficiently long back focal length more easily, and to prevent color shading more effectively.

<The Features of the Third Lens Unit Gr3>

[The Refractive Power of the Third Lens Unit Gr3]

To realize a reversed-telephoto-type arrangement of refractive powers, it is preferable that the third lens unit Gr3 satisfy condition (1) below:

$$0.30 < |\Phi 3| \cdot fS < 0.90 \quad (1)$$

where
- $\phi 3$ represents the refractive power of the third lens unit; and
- fS represents the focal length of the entire zoom lens system in the shortest focal length condition.

Condition (1) defines the preferable range of the refractive power of the third lens unit Gr3 with respect to the entire system. If the lower limit of condition (1) is exceeded, it is impossible to secure a back focal length long enough for a projection optical system. By contrast, if the upper limit of condition (1) is exceeded, it is difficult to satisfactorily correct various kinds of aberration (in particular, spherical aberration).

[Three Types of the Third Lens Unit Gr3]

In the first, second, eleventh, and twelfth embodiments, the third lens unit Gr3 has, at its enlargement side end, a meniscus lens element M having a weakly positive refractive power and convex to the enlargement side. In the third, fourth, and seventh to ninth embodiments, the corresponding lens element, i.e. a meniscus lens element M having a negative or weakly positive refractive power and convex to the enlargement side is realized by the use of a doublet lens element formed by joining together a first lens element M1 having a positive refractive power and convex to the enlargement side and a second lens element M2 having a negative refractive power and concave to the reduction side. In the fifth, sixth, and tenth embodiments, the corresponding lens element is realized by the use of separate first and second lens elements M1 and M2, instead of a doublet lens element, and the gap between those two lens elements is used as an air lens.

More specifically, the first to twelfth embodiments of the invention can be classified into the following three types:

Type A: The third lens unit Gr3 has, at its enlargement side end, a single meniscus lens element M having a negative or weakly positive refractive power and convex to the enlargement side (the first, second, eleventh, and twelfth embodiments);

Type B: The third lens unit Gr3 has, at its enlargement side end, a doublet meniscus lens element having a negative or weakly positive refractive power and convex to the enlargement side, and this doublet meniscus lens element is composed by joining together, from the enlargement side, a first lens element M1 having a positive refractive power and convex to the enlargement side and a second lens element M2 having a negative refractive power and concave to the reduction side (the third, fourth, and seventh to ninth embodiments); and Type C: The third lens unit Gr3 has, from its enlargement side end, a first lens element M1 having a positive refractive power and convex to the enlargement side and a second lens element M2 having a negative refractive power and concave to the reduction side, and the gap between the first and second lens elements M1 and M2 is used as an air lens (the fifth, sixth, and tenth embodiments).

In the type-B embodiments, the doublet lens element composed by joining together the first and second lens elements M1 and M2 has a meniscus shape similar to the meniscus lens element M in the type-A embodiments. In the type-B embodiments, the use of a doublet meniscus lens element that is convex to the enlargement side as a whole contributes to better correction of color-specific distortion and coma aberration than in the type-A embodiments in which a single meniscus lens element M is used. On the other hand, in the type-C embodiments, the use of an air lens contributes to better correction of coma aberration and color-specific image-surface curvature than in the type-A embodiments in which a single meniscus lens element M is used.

[Zooming and Distortion]

An ordinary wide-angle zoom lens system suffers from large negative distortion in the wide-angle condition. In all of the type-A, type-B, and type-C embodiments of the invention, zooming from the telephoto end [L] to the wide-angle end [S] is performed by moving the second and third lens units Gr2 and Gr3 in such a way that the distance between the second and third lens units Gr2 and Gr3 decreases. This means that, as zooming is performed, the positions at which off-axial beams enter the third lens unit Gr3 approach the optical axis (i.e. the heights relative to the optical axis decrease). In addition, the meniscus lens element M of the type-A embodiments and the first and second lens elements M1 and M2 of the type-B and type-C embodiments each have both of their surfaces designed to be convex to the enlargement side. As a result, since the positions at which off-axial beams enter the first and second lens elements M1 and M2 having such surface shapes become closer to the optical axis as the zoom lens system approaches the wide-angle end condition, the negative distortion caused by these surfaces convex to the enlargement side is corrected in such a way that less distortion appears in the wide-angle condition. In this way, the lens element M or lens elements M1 and M2, through the action of their surfaces convex to the enlargement side, serve to reduce the variation of distortion between the telephoto and wide-angle ends.

<The Shape Factor of the Meniscus Lens M>

In the type-A embodiments in which the third lens unit Gr3 satisfies the previously-noted condition (1), it is preferable that the meniscus lens element M satisfy condition (2) below:

$$3 \leq |(r_{MB}+r_{MA})/(r_{MB}-r_{MA})| \quad (2)$$

where
- $r_{MB}$ represents the radius of curvature of the enlargement side surface of the meniscus lens element M; and
- $r_{MA}$ represents the radius of curvature of the reduction side surface of the meniscus lens element M.

Condition (2) defines the range of the shape factor of the meniscus lens element M to be preferably satisfied primarily to achieve satisfactory correction of distortion. The meniscus lens element M, as it receives incoming off-axial beams, refracts them on its enlargement side surface convex to the enlargement side in such a way that the beams are directed toward the optical axis, and, as it emits the beams, refracts them on its reduction side surface in such a way that the beams are directed away from the optical axis. As long as the meniscus lens element M satisfies condition (2), the variation of the angles of the incoming off-axial beams and of the angles of the exiting off-axial beams, both with respect to the optical axis, can be kept sufficiently small. As long as the variation of those angles is kept small enough, the meniscus lens element M achieves well-balanced correction of distortion between the telephoto and wide-angle ends without adversely affecting other types of aberration in zoom lens systems of this zooming type.

In condition (2), the radius of curvature $r_{MA}$ of the enlargement side surface and the radius of curvature $r_{MB}$ of the reduction side surface of the meniscus lens element M have the same sign. Accordingly, if condition (2) is not satisfied, the difference $|r_{MB}, r_{MA}|$ between the radii of curvature of the enlargement and reduction surfaces of the meniscus lens element M is too large, and thus the absolute value of the refractive power of the meniscus lens element M is too large. This means that, if condition (2) is not satisfied, the variation of the angles of the incoming off-axial beams and of the angles of the exiting off-axial beams with respect to the optical axis is so large that it is impossible to achieve well-balanced correction of distortion between the telephoto and wide-angle ends without adversely affecting other types of aberration. Note that, if the radii of curvature $r_{MA}$ and $r_{MB}$ are equal, the value of condition (2) $|(r_{MB}+r_{MA})/(r_{MB}-r_{MA})|$ is infinitely large, and that condition (2) covers also such a case where $|(r_{MB}+r_{MA})/(r_{MB}-r_{MA})|$ is infinitely large.

[The Surface Shapes of the First and Second Lens Elements M1 and M2]

In the type-B and type-C embodiments in which the third lens unit Gr3 satisfies the previously-noted condition (1), it is preferable that the first and second lens elements M1 and M2 satisfy condition (3) below:

$$3 \leq |(r_{M2B}+r_{M1A})/(r_{M2B}-r_{M1A})| \qquad (3)$$

where
$r_{M1A}$ represents the radius of curvature of the enlargement side surface of the first lens element M1; and
$r_{M1B}$ represents the radius of curvature of the reduction side surface of the second lens element M2.

Condition (3) defines the surface shapes, which are equivalent to the shape factors, of the first and second lens elements M1 and M2 to be preferably satisfied primarily to achieve satisfactory correction of distortion. The meniscus lens element M1, as it receives incoming off-axial beams, refracts them on its enlargement side surface convex to the enlargement side in such a way that the beams are directed toward the optical axis, and then the second lens element M2, as it emits the beams, refracts them on its reduction side surface in such a way that the beams are directed away from the optical axis. As long as the first and second lens elements M1 and M2 satisfy condition (3), the variation of the angles of the incoming off-axial beams and of the angles of the exiting off-axial beams, both with respect to the optical axis, can be kept sufficiently small. As long as the variation of those angles is kept small enough, the first and second lens elements M1 and M2 achieve well-balanced correction of distortion between the telephoto and wide-angle ends without adversely affecting other types of aberration in zoom lens systems of this zooming type.

In condition (3), the radius of curvature r$M1A$ of the enlargement side surface of the first lens element M1 and the radius of curvature r$M2B$ of the reduction side surface of the second lens element M2 have the same sign. Accordingly, if condition (3) is not satisfied, the difference $|r_{M2B}-r_{M1A}|$ between the radii of curvature of the enlargement and reduction surfaces of the first and second lens elements M1 and M2, respectively, is too large, and thus the absolute value of the composite refractive power of the first and second lens elements M1 and M2 is too large. This means that, if condition (3) is not satisfied, the variation of the angles of the incoming off-axial beams and of the angles of the exiting off-axial beams with respect to the optical axis is so large that it is impossible to achieve well-balanced correction of distortion between the telephoto and wide-angle ends without adversely affecting other types of aberration. Note that, if the radii of curvature $r_{M1A}$ and $r_{M2B}$ are equal, the value of condition (3) $|(r_{M2B}+r_{M1A})/(r_{M2B}-r_{M1A})|$ is infinitely large, and that condition (3) covers also such a case where $|(r_{M2B}+r_{M1A})/(r_{M2B}-r_{M1A})|$ is infinitely large.

[The Air Lens Formed Between the First and Second Lens Elements M1 and M2]

In the type-C embodiments, in which the gap between the first and second lens elements M1 and M2 is used as an air lens, it is preferable that the two lens elements M1 and M2 satisfy conditions (4) and (5) below:

$$0 < d_{MIM2}/fS < 0.1 \qquad (4)$$

$$-0.006 < (1/r_{M2A}) - (1/r_{M1B}) < 0.002 \qquad (5)$$

where
$d_{MIM2}$ represents the axial aerial distance between the first and second lens elements M1 and M2;
fS represents the focal length of the entire system in the wide-angle-end condition [S];
$r_{M1B}$ represents the radius of curvature of the reduction side surface of the first lens element M1; and
$r_{M2A}$ represents the radius of curvature of the enlargement side surface of the second lens element M2.

Conditions (4) and (5) define the conditions to be satisfied with regard to the air lens formed between the first lens element M1 having a positive refractive power and the second lens element M2 having a negative refractive power. If the upper limit of condition (4) is exceeded, the aerial distance between the first and second lens elements M1 and M2 is too large. If the upper or lower limit of condition (5) is exceeded, the difference between the radii of curvature of the reduction side surface of the first lens element M1 and of the enlargement side surface of the second lens element M2 is too large. In both cases, it is impossible to achieve satisfactory correction of distortion.

[The Abbe Number of the Meniscus Lens Element M]

In the type-A embodiments in which, as in the first and second embodiments, the meniscus lens element M disposed at the enlargement side end of the third lens unit Gr3 is a single meniscus lens element having a positive refractive power, it is preferable that the meniscus lens element M satisfy condition (6) below:

$$18 < v_M < 30 \qquad (6)$$

where
$v_M$ represents the Abbe number of the meniscus lens element M.

Condition (6) defines the range of the Abbe number of the meniscus lens element M having a positive refractive power. If condition (6) is not satisfied, it is impossible to achieve well-balanced correction of lateral chromatic aberration between the wide-angle and telephoto ends.

[The Abbe Numbers of the First and Second Lens Elements M1 and M2]

In the type-B and type-C embodiments, it is preferable that the first and second lens elements M1 and M2 satisfy condition (7) below:

$$-300 < \nu_{MIM2} < 30 \tag{7}$$

where $\nu_{MIM2}$ represents the composite Abbe number of the first and second lens elements M1 and M2, which is defined by formula (7A) below:

$$\{1/(f_{M1}\cdot\nu_{M1})\}+\{1/(f_{M2}\cdot\nu_{M2})\}=\{1/(f_{M1M2}\cdot\nu_{M1M2})\} \tag{7A}$$

where $f_{M1}$ represents the focal length of the first lens element M1;

$f_{M2}$ represents the focal length of the second lens element M2;

$f_{M1M2}$ represents the composite focal length of the first and second lens elements M1 and M2;

$\nu_{M1}$ represents the Abbe number of the first lens element M1; and $\nu_{M2}$ represents the Abbe number of the second lens element M2.

Condition (7) defines the ranges of the Abbe numbers of the first and second lens elements M1 and M2. If condition (7) is not satisfied, just as when condition (6) is not satisfied, it is impossible to achieve well-balanced correction of lateral chromatic aberration between the wide-angle and telephoto ends.

[The Refractive Indices of the First and Second Lens Elements M1 and M2]

In the type-B and type-C embodiments, it is preferable that the first and second lens elements M1 and M2 satisfy condition (8) below:

$$0.85 < n_{M2}/n_{M1} < 0.95 \tag{8}$$

where $n_{M1}$ represents the refractive index of the first lens element M1; and $n_{M2}$ represents the refractive index of the second lens element M2.

Condition (8) defines the ranges of the refractive indices of the first and second lens elements M1 and M2. If the refractive indices $n_{M1}$ and $n_{M2}$ of the first and second lens elements M1 and M2 are equal, then $n_{M2}/n_{M1}=1$, which means that the first and second lens elements M1 and M2, as a whole, act in the same manner as the single meniscus lens element M in the type-A embodiments. Accordingly, if the upper limit of the condition (8) is exceeded, the first and second lens elements M1 and M2, as a whole, behave more like a single meniscus lens element. As a result, the previously described effect of using two lens elements M1 and M2 to compose the single meniscus lens element convex to the enlargement side as a whole becomes less noticeable. By contrast, if the lower limit of condition (8) is exceeded, the variation of color-specific spherical aberration and coma aberration during zooming is too large, and thus it is impossible to obtain satisfactory optical performance. Since, as described previously, the positions at which off-axial beams enter the third lens unit Gr3 vary with zooming, it is possible to obtain well-balanced image planes over the entire zoom range by setting the difference between the refractive indices of the first and second lens elements M1 and M2 to a value that satisfies condition (8).

<The Features of the First Lens Unit Gr1>

In the type-A, type-B, and type-C embodiments in which the previously-noted condition (1) as well as (2) or (3) is satisfied, it is preferable that the first lens unit Gr1 consist of at least two negative lens elements and at least one positive lens element. By constituting the first lens unit Gr1 in that manner, it is possible to reduce under-side distortion caused by the light beams incident on the peripheral portion of the first lens unit Gr1 that has a negative power in the wide-angle condition. This is because, by distributing the negative power of the first lens unit Gr1 between two lens elements, it is possible to reduce the angles of rays with respect to the lens surfaces, and thus to reduce the negative distortion that is mostly caused by the negative lens elements of the first lens unit Gr1. This makes it easier to correct distortion, for example, by means of the positive lens element of the first lens unit Gr1.

[The Aspherical Surface in the First Lens Unit Gr1]

In the type-A, type-B, and type-C embodiments in which the previously-noted condition (1) as well as (2) or (3) is satisfied, it is preferable, as in the eleventh embodiment, that an aspherical surface having increasingly strong positive refractive powers from center to edge be provided on at least one surface having a positive refractive power within the first lens unit Gr1. By providing such an aspherical surface in the first lens unit Gr1, the under-side distortion caused by the negative lens elements can more effectively be corrected toward the over side, in particular in the wide-angle condition [S].

In the type-A, type-B, and type-C embodiments in which the previously-noted condition (1) as well as (2) or (3) is satisfied, it is also possible, as in the twelfth embodiment, to provide an aspherical surface having negative refractive powers at the center and positive refractive powers at the edge on at least one surface having a weakly negative refractive power within the first lens unit Gr1. By providing such an aspherical surface in the first lens unit Gr1, just as when an aspherical surface as described in the previous paragraph is provided, the under-side distortion caused by the negative lens elements can more effectively be corrected toward the over side, in particular in the wide-angle condition [S].

It is preferable that the aspherical surface as described above be provided on a positive lens element within the first lens unit Gr1. When the aspherical surface is provided on a positive lens element, it is preferable that the positive lens element satisfy condition (9) below:

$$1.45 < na < 1.60 \tag{9}$$

where na represents the refractive index of the positive lens element on which the aspherical surface is provided.

Condition (9) defines the refractive index of the positive lens element on which the aspherical surface is provided. The positive lens element provided with the aspherical surface corrects distortion as described above more effectively if it is made of a medium having a refractive index low enough to satisfy condition (9). Note that it is also possible to achieve similar correction of distortion by making the negative lens element in the first lens unit Gr1 of a medium having such a high refractive index as exceeds the upper limit of condition (9) and providing it with an aspherical surface having a quite contrary shape. However, providing an aspherical surface on a medium having a high refractive index is undesirable, because it demands extra cost.

<The Features of the Second Lens Unit Gr2>

In the type-A, type-B, and type-C embodiments in which the previously-noted condition (1) as well as (2) or (3) is satisfied it is preferable, as in the second and the eighth to tenth embodiments, that the second lens unit Gr2 consist of, from the enlargement side, a meniscus lens element convex to the enlargement side and having a negative refractive power, and a doublet lens element having a positive refractive power as a whole. By constituting the second lens unit Gr2 in that manner, it is possible to correct coma aberration by means of the air lens formed between the negative meniscus lens element and the positive doublet lens element mentioned above. This is because, owing to the difference of the curvature between the surfaces on both sides of the gap between the meniscus lens element and the doublet lens element, marginal rays entering the second lens unit Gr2 are refracted by the meniscus lens element in such a way that the rays are directed away from the optical axis, and thus the rays enter the doublet lens element with large incident angles. In this way, the air gap between these lens elements effectively serves to correct coma aberration.

<The Refractive Powers of the First and Second Lens Units Gr1 and Gr2>

In the type-A, type-B, and type-C embodiments in which the previously-noted condition (1) as well as (2) or (3) is satisfied and in which zooming is performed by moving the first and second lens units Gr1 and Gr2, it is desirable that condition (10) below be satisfied:

$$0.50<|\phi 1|/\phi 2<0.75 \tag{10}$$

where
  $\phi 1$ represents the refractive power of the first lens unit Gr1; and
  $\phi 2$ represents the refractive power of the second lens unit Gr2.

Condition (10) defines the relation between the refractive powers of the first and second lens units Gr1 and Gr2 (in particular, the condition to be satisfied with regard to the loci of the lens units that are moved during zooming). As the value of condition (10) is closer to its upper limit, the first lens unit Gr1 needs to be positioned farther to the enlargement side in the telephoto end condition [L] than in the wide-angle end condition [S]. As a result, the length of the entire zoom lens system in the telephoto end condition [L] becomes so large that it is impossible to realize a compact zoom lens system. By contrast, as the value of condition (10) is closer to its lower limit, the first lens unit Gr1 needs to be positioned farther to the reduction side ill the telephoto end condition [L] than in the wide-angle end condition [S]. As a result, it is impossible to secure sufficient brightness of the edge of the image field in the wide-angle end condition [S]. This can be avoided by designing the first and second lens units Gr1 and Gr2 to have larger lens diameters, but doing so makes it impossible to realize a compact zoom lens system.

<The Features of the Fourth Lens Unit Gr4>
[The Refractive Power of the Fourth Lens Unit Gr4]

In the type-A, type-B, and type-C embodiments in which the previously-noted condition (1) as well as (2) or (3) is satisfied, it is preferable that condition (11) below be satisfied:

$$0.65<\phi 4 \cdot fS<1.3 \tag{11}$$

where
  $\phi 4$ represents the refractive power of the fourth lens unit Gr4; and
  fS represents the focal length of the entire system in the wide-angle end condition [S].

Condition (11) defines the range of the refractive power of the fourth lens unit Gr4 with respect to the entire system. If the upper limit of condition (11) is exceeded, too large spherical and coma aberration appears, and thus it is impossible to reduce the f-number sufficiently. As a result, it is difficult to obtain sufficiently bright images through the zoom lens system. By contrast, if the lower limit of condition (11) is exceeded, it is impossible to secure a back focal length long enough for a projection optical system.

[The Position of the Fourth Lens Unit Gr4 During Zooming]

In the type-A, type-B, and type-C embodiments in which the previously-noted condition (1) as well as (2) or (3) is satisfied, it is preferable that the fourth lens unit Gr4 be kept in a fixed position during zooming. This makes it possible to fix the position of a large-size component (e.g. a dichroic prism PR disposed on the reduction side of the fourth lens unit Gr4) that is required in a projection optical system, and thus provides various advantages in the design of the lens barrel. For example, the structure of the lens barrel can be simplified, and therefore cost reduction can be achieved easily.

<<Embodiments 13 to 21>>

The thirteenth to twenty-first embodiments are three-unit zoom lens systems each constituted of, from the enlargement side, a first lens unit Gr1 having a negative refractive power, a second lens unit Gr2 having a positive refractive power, and a third lens unit Gr3 having a positive refractive power. In addition, a dichroic prism PR is disposed on the reduction side of the third lens unit Gr3. All of these zoom lens systems perform zooming by varying the distances between the first to third lens units Gr1 to Gr3; specifically, during zooming from the wide-angle end [S] to the telephoto end [L], the second lens unit Gr2 is moved along the optical axis in such a way that the distance between the second and third lens units Gr2 and Gr3 increases. The third lens unit Gr3 consists of, from the enlargement side, a front lens subunit GrF having a negative refractive power and a rear lens subunit GrR having a positive refractive power. The front lens subunit GrF includes at least one negative lens element, and the rear lens subunit GrR includes at least two positive lens elements. The constitution of the first to third lens units Gr1 to Gr3 in each embodiment will be described in more detail below.

<The Constitution of the First Lens Unit Gr1>

In the thirteenth, fourteenth, and nineteenth embodiments, the first lens unit Gr1 consists of, from the enlargement side, a negative meniscus lens element concave to the reduction side, a negative biconcave lens element, and a positive meniscus lens element convex to the enlargement side. In the fifteenth embodiment, the first lens unit Gr1 consists of, from the enlargement side, a negative meniscus lens element concave to the reduction side, and a positive meniscus lens element convex to the enlargement side. In the sixteenth to eighteenth embodiments, the first lens unit Gr1 consists of, from the enlargement side, a negative meniscus lens element concave to the reduction side, a positive meniscus lens element convex to the enlargement side, and a negative meniscus lens element concave to the reduction side. In the twentieth embodiment, the first lens unit Gr1 consists of, from the enlargement side, a negative meniscus lens element concave to the reduction side, and a positive biconvex lens element. In the twenty-first embodiment, the first lens unit Gr1 consists of, from the enlargement side, two negative meniscus lens elements both concave to the reduction side, and a positive meniscus lens element convex to the enlargement side.

<The Constitution of the Second Lens Unit Gr2>

In the thirteenth and nineteenth embodiments, the second lens unit Gr3 consists of, from the enlargement side, a positive biconvex lens element, and a doublet lens element formed by joining together a negative meniscus lens element concave to the reduction side and a positive biconvex lens element. In the fourteenth embodiment, the second lens unit Gr2 consists of, from the enlargement side, a positive biconvex lens element, and a doublet lens element formed by joining together a positive biconvex lens element and a negative meniscus lens element concave to the enlargement side. In the fifteenth and twenty-first embodiments, the second lens unit Gr2 consists of, from the enlargement side, a positive meniscus lens element convex to the enlargement side, a negative meniscus lens element concave to the reduction side, and a positive biconvex lens element. In the sixteenth to eighteenth, and twentieth embodiments, the second lens unit Gr2 consists of, from the enlargement side, a positive biconvex lens element, a negative meniscus lens element concave to the reduction side, and a positive biconvex lens element.

<The Constitution of the Front Lens Subunit GrF of the Third Lens Unit Gr3>

In the thirteenth embodiment, the front lens subunit GrF of the third lens unit Gr3 consists of, from the enlargement side, a positive meniscus lens element M convex to the enlargement side, and two negative meniscus lens elements both concave to the reduction side. In the fourteenth embodiment, the front lens subunit GrF of the third lens unit Gr3 consists of, from the enlargement side, a positive meniscus lens element convex to the enlargement side, and a negative biconcave lens element. In the fifteenth and sixteenth embodiments, the front lens subunit GrF of the third lens unit Gr3 consists of, from the enlargement side, a negative meniscus lens element M convex to the enlargement side, and a negative biconcave lens element. In the seventeenth and twenty-first embodiments, the front lens subunit GrF of the third lens unit Gr3 consists of, from the enlargement side, a doublet lens element formed by joining together a positive meniscus lens element M1 convex to the enlargement side and a negative meniscus lens element M2 concave to the reduction side, and a negative biconcave lens element. In the eighteenth, nineteenth, and twentieth embodiments, the front lens subunit GrF of the third lens unit Gr3 consists of, from the enlargement side, a positive meniscus lens element M1 convex to the enlargement side, a negative meniscus lens element M2 concave to the reduction side, and a negative biconcave lens element.

<The Constitution of the Rear Lens Subunit GrR of the Third Lens Unit Gr3>

In the thirteenth embodiment, the rear lens subunit GrR of the third lens unit Gr3 consists of, from the enlargement side, two positive meniscus lens elements both convex to the reduction side, and a positive meniscus lens element convex to the enlargement side. In the fourteenth and fifteenth embodiments, the rear lens subunit GrR of the third lens unit Gr3 consists of, from the enlargement side, a doublet lens element formed by joining together a negative meniscus lens element concave to the reduction side and a positive biconvex lens element, and a positive biconvex lens element. In the sixteenth and seventeenth embodiments, the rear lens subunit GrR of the third lens unit Gr3 consists of, from the enlargement side, a doublet lens element formed by joining together a negative meniscus lens element concave to the reduction side and a positive biconvex lens element, and two positive biconvex lens elements. In the eighteenth, nineteenth, and twenty-first embodiments, the rear lens subunit GrR of the third lens unit Gr3 consists of, from the enlargement side, a positive meniscus lens element convex to the reduction side, a positive biconvex lens element, and a positive meniscus lens element convex to the enlargement side. In the twentieth embodiment, the rear lens subunit GrR of the third lens unit Gr3 consists of, from the enlargement side, two positive biconvex lens elements, and a positive meniscus lens element convex to the enlargement side.

<Aspherical Surface>

In the twentieth embodiment, the reduction-side surface of the positive biconvex lens element included in the first lens unit Gr1 and the reduction-side surface of the negative biconcave lens element included in the third lens unit Gr3 are aspherical surfaces. The aspherical surface provided on the reduction-side surface of the positive biconvex lens element of the first lens unit Gr1 is designed to exhibit increasingly strong positive refractive powers from center to edge. In the twenty-first embodiment, the reduction-side surface of the positive meniscus lens element convex to the enlargement side included in the first lens unit Gr1 is an aspherical surface.

This aspherical surface provided on a positive meniscus lens element is designed to exhibit negative refractive powers in its central portion and positive refractive powers in its peripheral portion.

<The Features of the Third Lens Unit Gr3>

As noted previously, on the reduction side of the third lens unit Gr3 is disposed a dichroic prism PR that performs color synthesis on the light incoming from the liquid crystal panel. Since all of the thirteenth to twenty-first embodiments are designed primarily as projection optical systems, they need to have a back focal length long enough to secure a space for a dichroic prism PR, and, in addition, they need to be substantially telecentric toward the reduction side so that color shading will be suppressed satisfactorily.

In each embodiment, the front lens subunit GrF having a negative refractive power and the rear lens subunit GrR having a positive refractive power of the third lens unit Gr3 are arranged in such a way that they realize a reversed-telephoto-type arrangement of refractive powers. This makes it possible to secure a sufficiently long back focal length in a projection optical system. Moreover, in each embodiment, a principal ray incident on the third lens unit Gr3 is first refracted by the front lens subunit GrF to travel away from the optical axis, and is then refracted by the rear lens subunit GrR to travel parallel to the optical axis; that is, the entire zoom lens system is designed to be substantially telecentric. This helps reduce color shading and thus improve color rendering at the top, bottom, right, and left edges of the screen.

[The Refractive Power of the Front Lens Subunit GrF]

In a reversed-telephoto-type arrangement of refractive powers as described above, it is preferable that the front lens subunit GrF of the third lens unit Gr3 satisfy condition (12) below:

$$0.80<|\phi F|\cdot fS<1.30 \tag{12}$$

where $\phi F$ represents the refractive power of the front lens subunit GrF; and fS represents the focal length of the entire system in the wide-angle end condition [S].

Condition (12) defines the range of the refractive power of the front lens subunit GrF with respect to the entire system. If the lower limit of condition (12) is exceeded, it is impossible to secure a back focal length long enough for a projection optical system. By contrast, if the upper limit of condition (12) is exceeded, it is difficult to satisfactorily correct various kinds of aberration (in particular, spherical aberration).

[Three Types of the Front Lens Subunit GrF]

In the thirteenth to sixteenth embodiments, the front lens subunit GrF of the third lens unit Gr3 has, at its enlargement side end, a meniscus lens element M having a negative or weakly positive refractive power and convex to the enlargement side. In the seventeenth and twenty-first embodiments, the corresponding lens element is realized by the use of a doublet lens element formed by joining together a first lens element M1 having a positive refractive power and convex to the enlargement side and a second lens element M2 having a negative refractive power and concave to the reduction side. In the eighteenth to twentieth embodiments, the corresponding lens element is realized by the use of separate first and second lens elements M1 and M2, instead of a doublet lens element, and the gap between those two lens elements is used as an air lens.

More specifically, the thirteenth to twenty-first embodiments of the invention can be classified into the following three types:

Type D: The front lens subunit GrF has,. at its enlargement side end, a single meniscus lens element M having a negative or weakly positive refractive power and convex to the enlargement side (the thirteenth to sixteenth embodiments);

Type E: The front lens subunit GrF has, at its enlargement side end, a doublet meniscus lens element having a negative or weakly positive refractive power and convex to the enlargement side, and this doublet meniscus lens element is composed by joining together, from the enlargement side, a first lens element M1 having a positive refractive power and convex to the enlargement side and a second lens element M2 having a negative refractive power and concave to the reduction side (the seventeenth and twenty-first embodiments); and Type F: The front lens subunit GrF has, from its enlargement side end, a first lens element M1 having a positive refractive power and convex to the enlargement side and a second lens element M2 having a negative refractive power and concave to the reduction side, and the gap between the first and second lens elements M1 and M2 is used as an air lens (the eighteenth to twentieth embodiments).

In the type-E embodiments, the doublet lens element composed by joining together the first and second lens elements M1 and M2 has a meniscus shape similar to the meniscus lens element M in the type-D embodiments. In the type-E embodiments, the use of a doublet meniscus lens element that is convex to the enlargement side as a whole contributes to better correction of color-specific distortion and coma aberration than in the type-D embodiments in which a single meniscus lens element M is used. On the other hand, in the type-F embodiments, the use of an air lens contributes to better correction of coma aberration and color-specific image-surface curvature than in the type-D embodiments in which a single meniscus lens element M is used.

[Zooming and Distortion]

An ordinary wide-angle zoom lens system suffers from large negative distortion in the wide-angle condition. In all of the type-D, type-E, and type-F embodiments of the invention, zooming from the telephoto end [L] to the wide-angle end [S] is performed by moving the second lens unit Gr2 in such a way that the distance between the second and third lens units Gr2 and Gr3 decreases. This means that, as zooming is performed, the positions at which off-axial beams enter the third lens unit Gr3 approach the optical axis (i.e. the heights relative to the optical axis decrease). In addition, the meniscus lens element M of the type-D embodiments and the first and second lens elements M1 and M2 of the type-E and type-F embodiments each have both of their surfaces designed to be convex to the enlargement side. As a result, since the positions at which off-axial beams enter the first and second lens elements M1 and M2 having such surface shapes become closer to the optical axis as the zoom lens system approaches the wide-angle end condition, the negative distortion caused by these surfaces convex to the enlargement side is corrected in such a way that less distortion appears in the wide-angle condition. In this way, the lens element M or lens elements M1 and M2, through the action of their surfaces convex to the enlargement side, serve to reduce the variation of distortion between the telephoto and wide-angle ends.

<The Shape Factor of the Meniscus Lens M>

In the type-D embodiments in which the front lens subunit GrF satisfies the previously-noted condition (12), it is preferable that the meniscus lens element M satisfy condition (2) introduced earlier.

Condition (2) defines the range of the shape factor of the meniscus lens element M to be preferably satisfied primarily to achieve satisfactory correction of distortion. The meniscus lens element M, as it receives incoming off-axial beams, refracts them on its enlargement side surface convex to the enlargement side in such a way that the beams are directed toward the optical axis, and, as it emits the beams, refracts them on its reduction side surface in such a way that the beams are directed away from the optical axis. As long as the meniscus lens element M satisfies condition (2), the variation of the angles of the incoming off-axial beams and of the angles of the exiting off-axial beams, both with respect to the optical axis, can be kept sufficiently small. As long as the variation of those angles is kept small enough, the meniscus lens element M achieves well-balanced correction of distortion between the telephoto and wide-angle ends without adversely affecting other types of aberration in zoom lens systems of this zooming type.

In condition (2), the radius of curvature $r_{MA}$ of the enlargement side surface and the radius of curvature $r_{MB}$ of the reduction side surface of the meniscus lens element M have the same sign. Accordingly, if condition (2) is not satisfied, the difference $|r_{MB}-r_{MA}|$ between the radii of curvature of the enlargement and reduction surfaces of the meniscus lens element M is too large, and thus the absolute value of the refractive power of the meniscus lens element M is too large. This means that, if condition (2) is not satisfied, the variation of the angles of the incoming off-axial beams and of the angles of the exiting off-axial beams with respect to the optical axis is so large that it is impossible to achieve well-balanced correction of distortion between the telephoto and wide-angle ends without adversely affecting other types of aberration. Note that, if the radii of curvature $r_{MA}$ and $r_{MB}$ are equal, the value of condition (2) $|(r_{MB}+r_{MA})/(r_{MB}-r_{MA})|$ is infinitely large, and that condition (2) covers also such a case where $(r_{MB}+r_{MA})/(r_{MB}-r_{MA})|$ is infinitely large.

[The Surface Shapes of the First and Second Lens Elements M1 and M2]

In the type-E and type-F embodiments in which the front lens subunit GrF satisfies the previously-noted condition (12), it is preferable that the first and second lens elements M1 and M2 satisfy condition (3) introduced earlier.

Condition (3) defines the surface shapes, which are equivalent to the shape factors, of the first and second lens elements M1 and M2 to be preferably satisfied primarily to achieve satisfactory correction of distortion. The meniscus lens element M1, as it receives incoming off-axial beams, refracts them on its enlargement side surface convex to the enlargement side in such a way that the beams are directed toward the optical axis, and then the second lens element M2, as it emits the beams. refracts them on its reduction side surface in such a way that the beams are directed away from the optical axis. As long as the first and second lens elements M1 and M2 satisfy condition (3), the variation of the angles of the incoming off-axial beams and of the angles of the exiting off-axial beams, both with respect to the optical axis, can be kept sufficiently small. As long as the variation of those angles is kept small enough, the first and second lens elements M1 and M2 achieve well-balanced correction of distortion between the telephoto and wide-angle ends without adversely affecting other types of aberration in zoom lens systems of this zooming type.

In condition (3), the radius of curvature $r_{M1A}$ of the enlargement side surface of the first lens element M1 and the radius of curvature $r_{M2B}$ of the reduction side surface of the second lens element M2 have the same sign. Accordingly, if condition (3) is not satisfied, the difference $|r_{M2B}-r_{M1A}|$ between the radii of curvature of the enlargement and reduction surfaces of the first and second lens elements M1 and M2, respectively, is too large, and thus the absolute value of the composite refractive power of the first and second lens elements M1 and M2 is too large. This means that, if condition (3) is not satisfied, the variation of the angles of the incoming off-axial beams and of the angles of the exiting off-axial beams with respect to the optical axis is so large that it is impossible to achieve well-balanced correction of distortion between the telephoto and wide-angle ends without adversely affecting other types of aberration. Note that, if the radii of curvature $r_{M1A}$ and $r_{M2B}$ are equal, the value of condition (3) $|(r_{M2B}+r_{M1A})/(r_{M2B}-r_{M1A})|$ is infinitely large, and that condition (3) covers also such a case where $|(r_{M2B}+r_{M1A})/(r_{M2B}-r_{M1A})|$ is infinitely large.

[The Air Lens Formed Between the First and Second Lens Elements M1 and M2]

In the type-F embodiments, in which the gap between the first and second lens elements M1 and M2 is used as an air lens, it is preferable that the two lens elements M1 and M2 satisfy conditions (4) and (5) introduced earlier.

Conditions (4) and (5) define the conditions to be satisfied with regard to the air lens formed between the first lens element M1 having a positive refractive power and the second lens element M2 having a negative refractive power. If the upper limit of condition (4) is exceeded, the aerial distance between the first and second lens elements M1 and M2 is too large. If the upper or lower limit of condition (5) is exceeded, the difference between the radii of curvature of the reduction side surface of the first lens element M1 and of the enlargement side surface of the second lens element M2 is too large. In both cases, it is impossible to achieve satisfactory correction of distortion.

[The Abbe Number of the Meniscus Lens Element M]

In the type-D embodiments in which, as in the thirteenth and fourteenth embodiments, the meniscus lens element M disposed at the enlargement side end of the front lens subunit GrF is a single meniscus lens element having a positive refractive power, it is preferable that the meniscus lens element M satisfy condition (6) introduced earlier.

Condition (6) defines the range of the Abbe number of the meniscus lens element M having a positive refractive power. If condition (6) is not satisfied, it is impossible to achieve well-balanced correction of lateral chromatic aberration between the wide-angle and telephoto ends.

[The Abbe Numbers of the First and Second Lens Elements M1 and M2]

In the type-E and type-F embodiments, it is preferable that the first and second lens elements M1 and M2 satisfy condition (7) introduced earlier.

Condition (7) defines the ranges of the Abbe numbers of the first and second lens elements M1 and M2. If condition (7) is not satisfied, just as when condition (6) is not satisfied, it is impossible to achieve well-balanced correction of lateral chromatic aberration between the wide-angle and telephoto ends.

[The Position of the Third Lens Unit Gr3 During Zooming]

In the type-D, type-E, and type-F embodiments in which the previously-noted condition (12) as well as (2) or (3) is satisfied, it is preferable that the third lens unit Gr3 be kept in a fixed position during zooming. This makes it possible to fix the position of a large-size component (e.g. a dichroic prism PR disposed on the reduction side of the third lens unit Gr3) that is required in a projection optical system, and thus provides various advantages in the design of the lens barrel. For example, the structure of the lens barrel can be simplified, and therefore cost reduction can be achieved easily. ps [The Refractive Power of the Third Lens Unit Gr3]

In the type-D, type-E, and type-F embodiments in which the previously-noted condition (12) as well as (2) or (3) is satisfied, it is preferable that condition (13) below be satisfied:

$$0.40 < \phi 3 \cdot fS < 0.70 \tag{13}$$

where
$\phi 3$ represents the refractive power of the third lens unit Gr3; and
fS represents the focal length of the entire system in the wide-angle end condition [S].

Condition (13) defines the range of the refractive power of the third lens unit Gr3 with respect to the entire system. If the upper limit of condition (13) is exceeded. too large aberration (in particular, spherical and coma aberration) appears, and thus it is impossible to reduce the f-number sufficiently. As a result, it is difficult to obtain sufficiently bright images through the zoom lens system. By contrast, if the lower limit of condition (13) is exceeded, the refractive power of the third lens unit Gr3 is too weak, with the result that, to secure a comparably wide zoom range, the first and second lens units Gr1 and Gr2 need to be moved longer distances. Thus, it is impossible to realize a compact zoom lens system.

<The Refractive Powers of the First and Second Lens Units Gr1 and Gr2>

In the type-D, type-E, and type-F embodiments in which the previously-noted condition (12) as well as (2) or (3) is satisfied and in which zooming is performed by moving the first and second lens units Gr1 and Gr2, it is desirable that condition (10) introduced earlier be satisfied.

Condition (10) defines the relation between the refractive powers of the first and second lens units Gr1 and Gr2 (in particular, the condition to be satisfied with regard to the loci of the lens units that are moved during zooming). As the value of condition (10) is closer to its upper limit, the first lens unit Gr1 needs to be positioned farther to the enlargement side in the telephoto end condition [L] than in the wide-angle end condition [S]. As a result, the length of the entire zoom lens system in the telephoto end condition [L] becomes so large that it is impossible to realize a compact zoom lens system. By contrast, as the value of condition (10) is closer to its lower limit, the first lens unit Gr1 needs to be positioned farther to the reduction side in the telephoto end condition [L] than in the wide-angle end condition [S]. As a result, it is impossible to secure sufficient brightness of the edge of the image field in the wide-angle end condition [S]. This can be avoided by designing the first and second lens units Gr1 and Gr2 to have larger lens diameters, but doing so makes it impossible to realize a compact zoom lens system.

<The Features of the First Lens Unit Gr1>

In the type-D, type-E, and type-F embodiments in which the previously-noted condition (12) as well as (2) or (3) is satisfied, it is preferable that the first lens unit Gr1 consist of at least two negative lens elements and at least one positive lens element. By constituting the first lens unit Gr1 in that manner, it is possible to reduce under-side distortion caused by the light beams incident on the peripheral portion of the first lens unit Gr1 that has a negative power in the wide-angle condition. This is because, by distributing the negative power of the first lens unit Gr1 between two lens elements, it is possible to reduce the angles of rays with respect to the lens surfaces, and thus to reduce the negative distortion that is mostly caused by the negative lens elements of the first lens unit Gr1. This makes it easier to correct distortion, for example, by means of the positive lens element of the first lens unit Gr1.

[The Aspherical Surface in the First Lens Unit Gr1]

In the type-D, type-E, and type-F embodiments in which the previously-noted condition (12) as well as (2) or (3) is satisfied, it is preferable, as in the twentieth embodiment, that an aspherical surface having increasingly strong positive refractive powers from center to edge be provided on at least one surface having a positive refractive power within the first lens unit Gr1. By providing such an aspherical surface in the first lens unit Gr1, the under-side distortion caused by the negative lens elements can more effectively be corrected toward the over side, in particular in the wide-angle condition [S].

In the type-D, type-E, and type-F embodiments in which the previously-noted condition (12) as well as (2) or (3) is satisfied, it is also possible, as in the twenty-first embodiment, to provide an aspherical surface having negative refractive powers at the center and positive refractive powers at the edge on at least one surface having a weakly negative refractive power within the first lens unit Gr1. By providing such an aspherical surface in the first lens unit Gr1, just as when an aspherical surface as described in the previous paragraph is provided, the under-side distortion caused by the negative lens elements can more effectively be corrected toward the over side, in particular in the wide-angle condition [S].

It is preferable that the aspherical surface as described above be provided on a positive lens element within the first lens unit Gr1. When the aspherical surface is provided on a positive lens element, it is preferable that the positive lens element satisfy condition (9) introduced earlier.

Condition (9) defines the refractive index of the positive lens element on which the aspherical surface is provided. The positive lens element provided with the aspherical surface corrects distortion as described above more effectively if it is made of a medium having a refractive index low enough to satisfy condition (9). Note that it is also possible to achieve similar correction of distortion by making the negative lens element in the first lens unit Gr1 of a medium having such a high refractive index as exceeds the upper limit of condition (9) and providing it with an aspherical surface having a quite contrary shape. However, providing an aspherical surface on a medium having a high refractive index is undesirable, because it demands extra cost.

<<Examples of the First to Twenty-first Embodiments>>

Tables 1 to 21 respectively list the construction data of examples of the zoom lens systems of the first to twenty-first embodiments (FIGS. 1A–1C, 3A–3C, 5A–5C, 7A–7C, 9A–9C, 11A–11C, 13A–13C, 15A–15C, 17A–17C, 19A–19C, 21A–21C, 23A–23C, 25A–25C, 27A–27C, 29A–29C, 31A–31C, 33A–33C, 35A–35C, 37A–37C, 39A–39C, and 41A–41C).

In the construction data of each embodiment, ri (i=1, 2, 3, . . . ) represents the radius of curvature of the i-th surface from the enlargement side, di (i=1, 2, 3, . . . ) represents the i-th axial distance from the enlargement side, and Ni (i=1, 2, 3, . . . ) and vi (i=1, 2, 3, . . . ) respectively represent the refractive index (Nd) and the Abbe number (vd), for the d line, of the i-th lens element from the enlargement side. Moreover, for each of such axial distances as vary with zooming (variable axial distances), three values are given that are, from the left, the axial distance in the telephoto end condition (longest-focal-length condition) [L], the axial distance in the middle condition (middle-focal-length condition) [M], and the axial distance in the wide-angle end condition (shortest-focal-length condition) [S]. Also listed for each embodiment are the focal length f and the f-number FNO of the entire system in each of these three focal-length conditions [L], [M], and [S].

In the construction data of each embodiment, a surface marked with an asterisk (*) is an aspherical surface, whose surface shape is defined by formula (AS) below:

$$X = \frac{C \cdot Y^2}{1 + (1 - \epsilon \cdot Y^2 \cdot C^2)^{1/2}} + \sum_i A i Y^i \qquad (AS)$$

where
- X represents the displacement from the reference surface in the optical axis direction;
- Y represents the height in a direction perpendicular to the optical axis;
- C represents the paraxial curvature;
- $\epsilon$ represents the quadric surface parameter; and
- Ai represents the aspherical coefficient of i-th order.

Tables 22 to 24 list the values corresponding to conditions (1) to (11) as observed in the examples of the first to twelfth embodiments; specifically, for each embodiment, Table 22 lists the values of $|\phi 3| \cdot fS$ (condition (1)), $|(r_{MB}+r_{MA})/(r_{MB}-r_{MA})|$ (condition (2)), $|(r_{M2B}+r_{M1A})/(r_{M2B}-r_{M1A})|$ (condition (3)), and $d_{M1M2}/fS$ (condition (4)); Table 23 lists the values of $(1/r_{M2A})-(1/r_{M1B})$ (condition (5)), $v_M$ (condition (6)), $v_{M1M2}$ (condition (7)), and $n_{M2}/n_{M1}$ (condition (8)); and Table 24 lists the values of na (condition (9)), $|\phi 1|/\phi 2$ (condition (10)), and $\phi 4 \cdot fS$ (condition (11)).

Tables 25 and 26 list the values corresponding to conditions (2) to (7), (9), (10), (12), and (13) as observed in the examples of the thirteenth to twenty-first embodiments; specifically, for each embodiment, Table 25 lists the values of $|\phi F| \cdot fS$ (condition (12)), $(r_{MB}+r_{MA})/(r_{MB}-r_{MA})|$ (condition (2)), $(r_{M2B}+r_{M1A})/(r_{M2B}-r_{M1A})|$ (condition (3)), $d_{M1M2}/fS$ (condition (4)), $(1/r_{M2A})-(1/r_{M1B})$ (condition (5)); and Table 26 lists the values of $v_M$ (condition (6)), $v_{M1M2}$ (condition (7)), $\phi 3 \cdot fS$ (condition (13)), $|\phi 1|/\phi 2$ (condition (10)), and na (condition (9)).

Figure 2A:
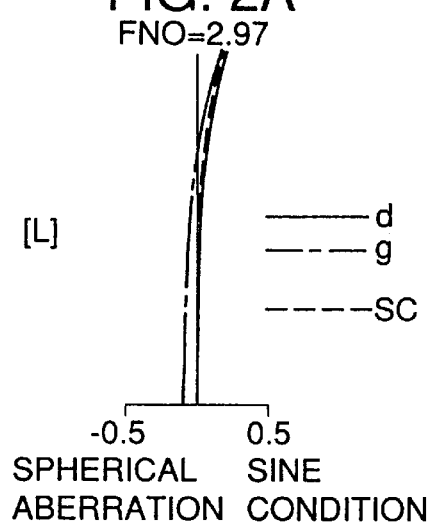
FIGS. 2A to 2I are aberration diagrams of the first embodiment.
Figure 2B:
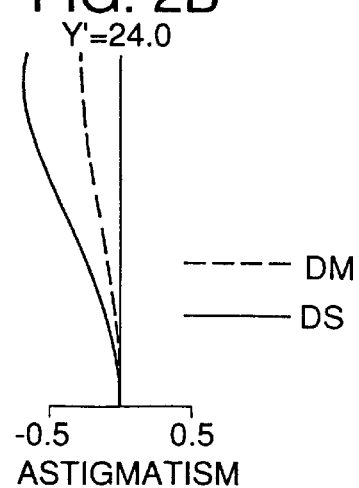
Figure 2C:
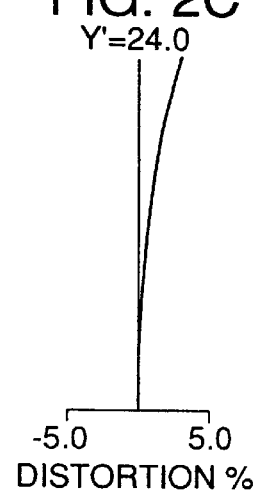
Figure 2D:
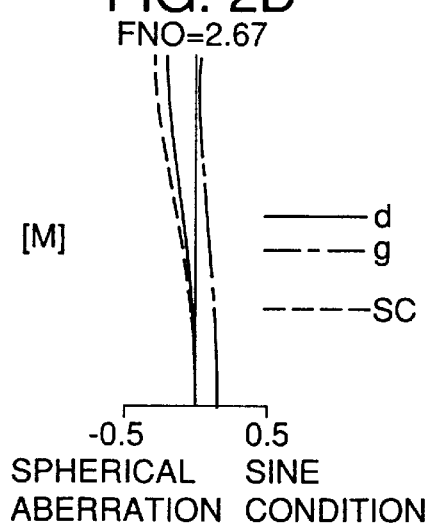
Figure 2E:
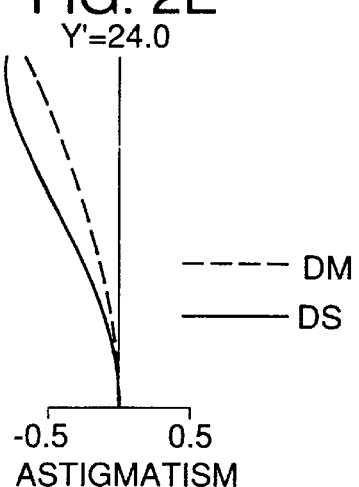
Figure 2F:
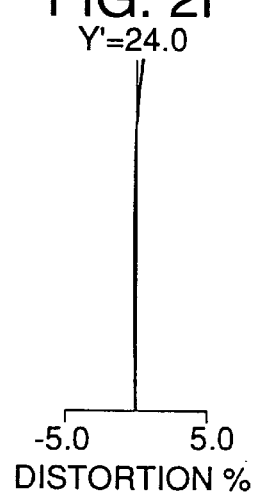
Figure 2G:
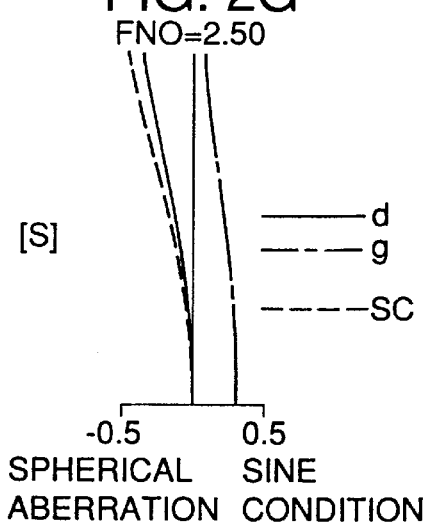
Figure 2H:
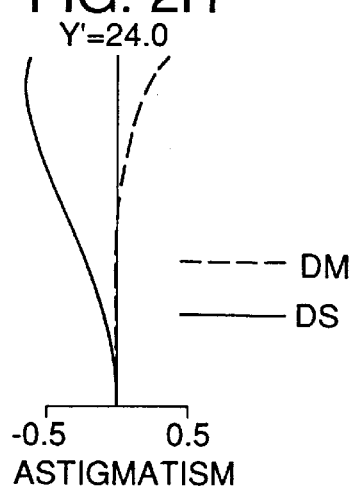
Figure 2I:
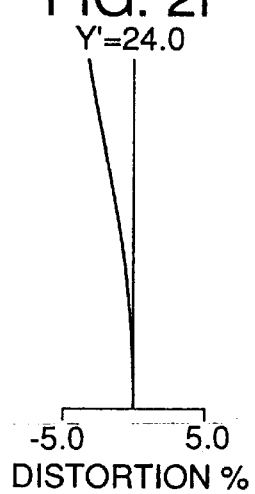
Figure 4A:
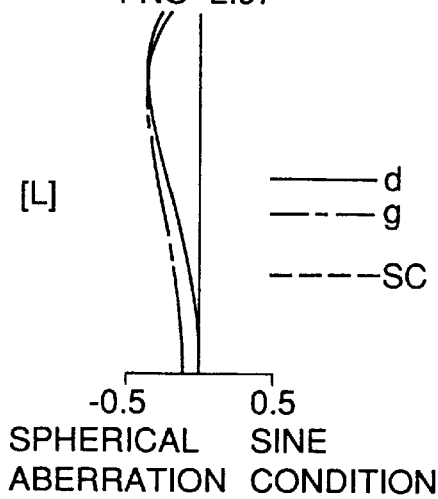
FIGS. 4A to 4I are aberration diagrams of the second embodiment.
Figure 4B:
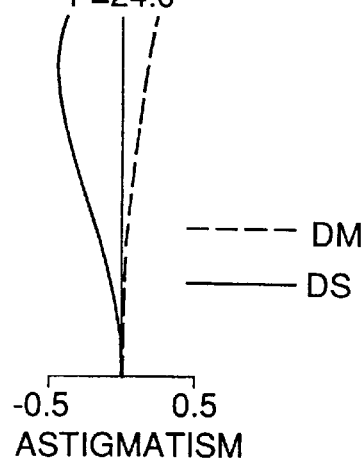
Figure 4C:
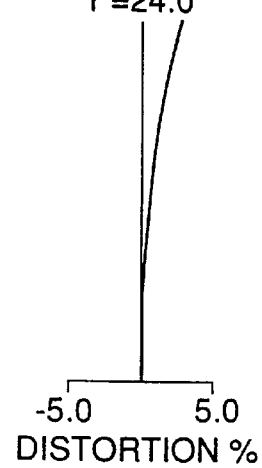
Figure 4D:
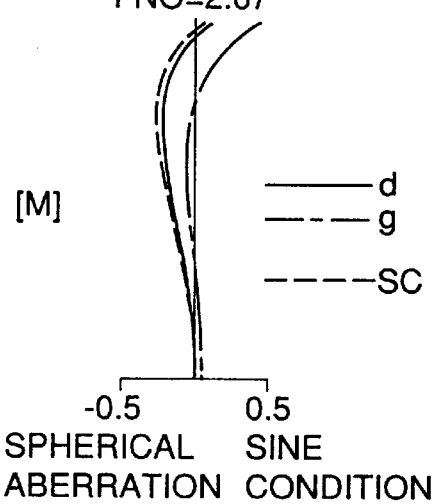
Figure 4E:
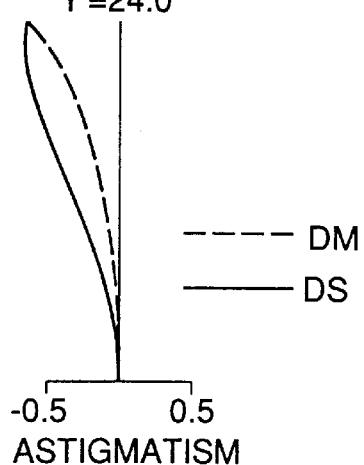
Figure 4F:
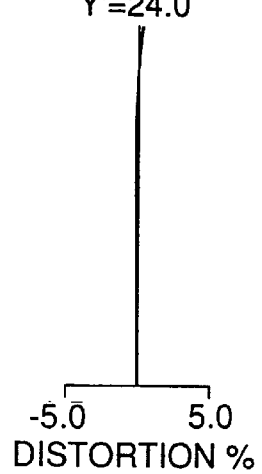
Figure 4G:
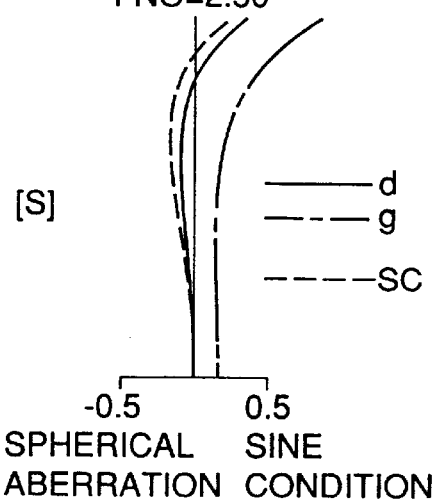
Figure 4H:
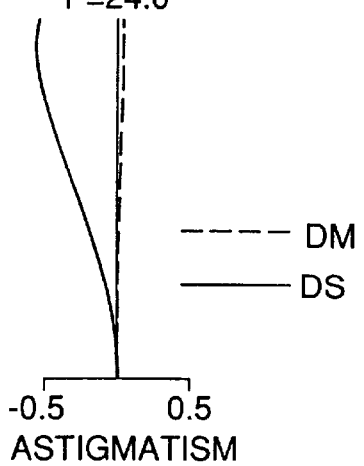
Figure 4I:
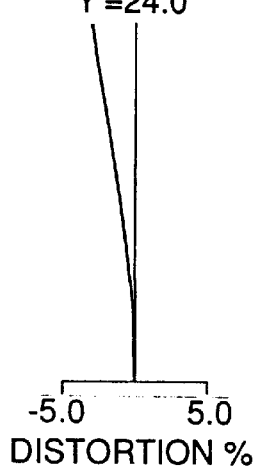
Figure 6A:
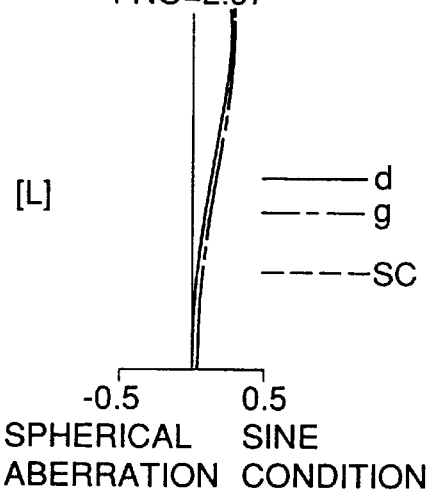
FIGS. 6A to 6I are aberration diagrams of the third embodiment.
Figure 6B:
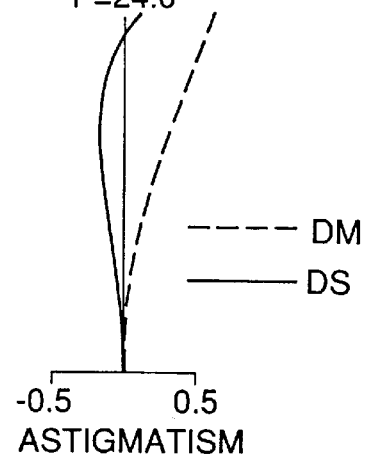
Figure 6C:
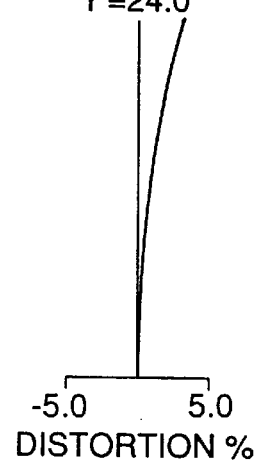
Figure 6D:
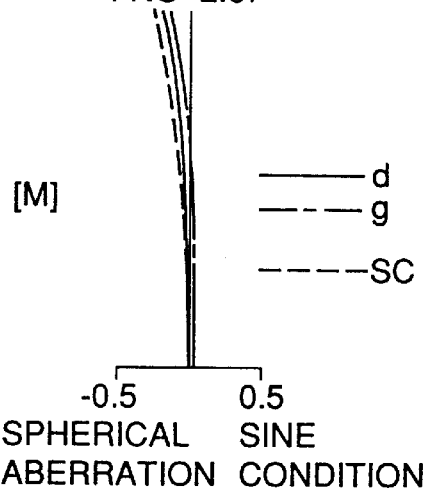
Figure 6E:
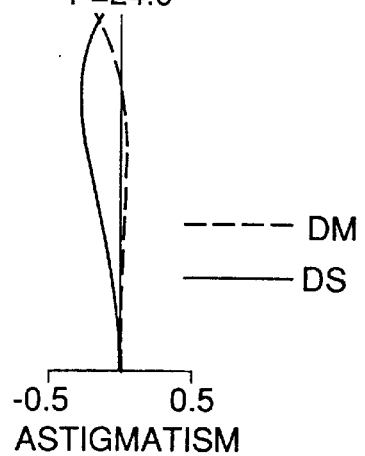
Figure 6F:
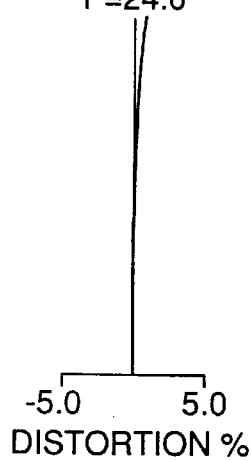
Figure 6G:
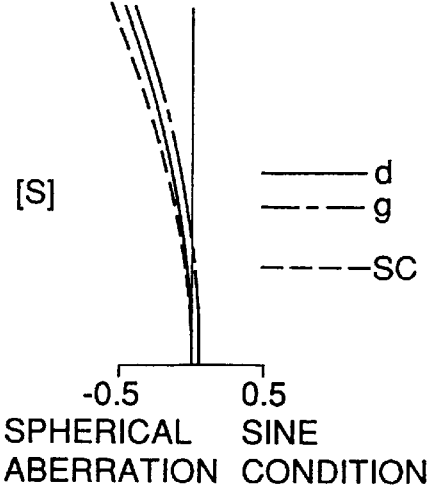
Figure 6H:
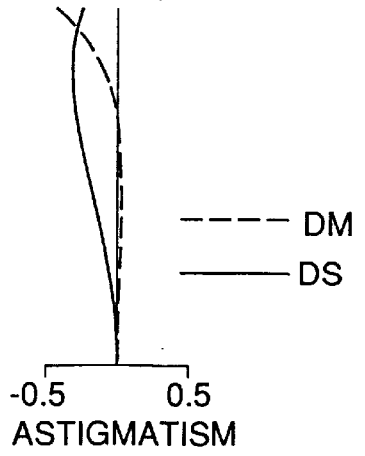
Figure 6I:
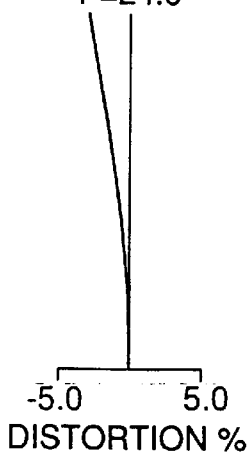
Figure 12A:
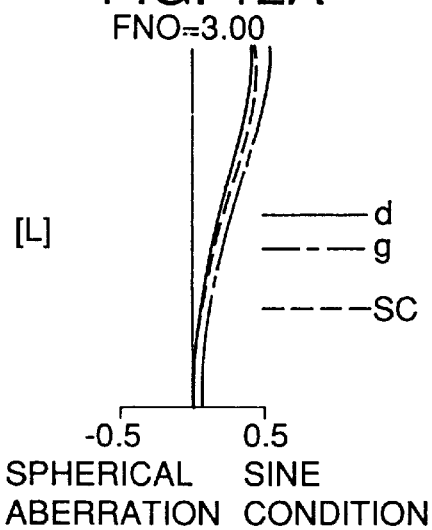
FIGS. 12A to 12I are aberration diagrams of the sixth embodiment.
Figure 12B:
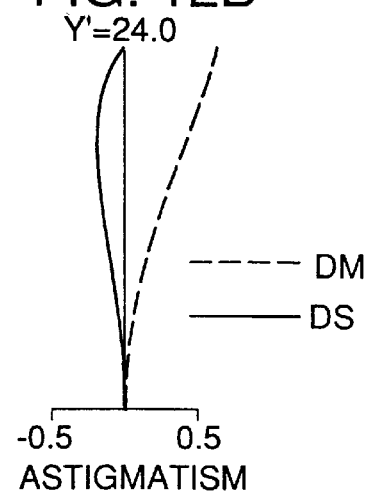
Figure 12C:
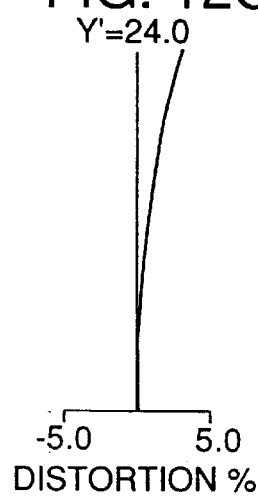
Figure 12D:
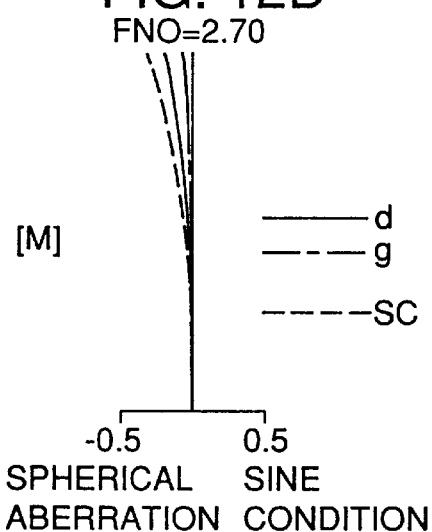
Figure 12E:
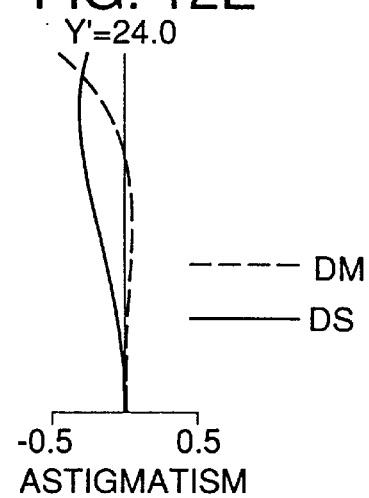
Figure 12F:
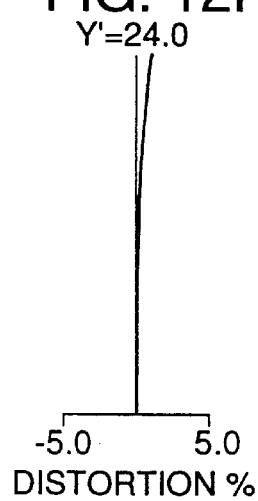
Figure 12G:
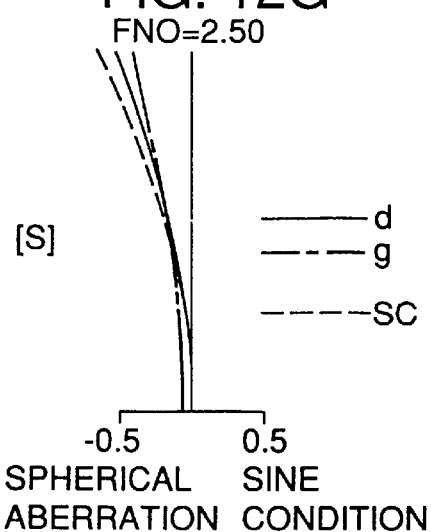
Figure 12H:
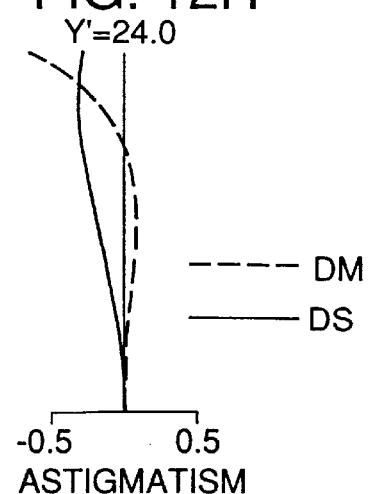
Figure 12I:
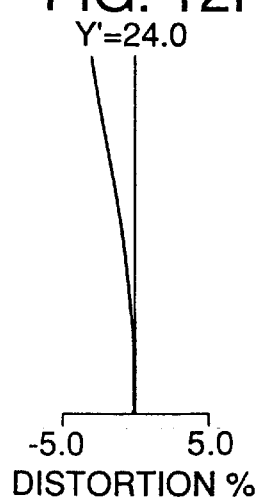
Figure 16A:
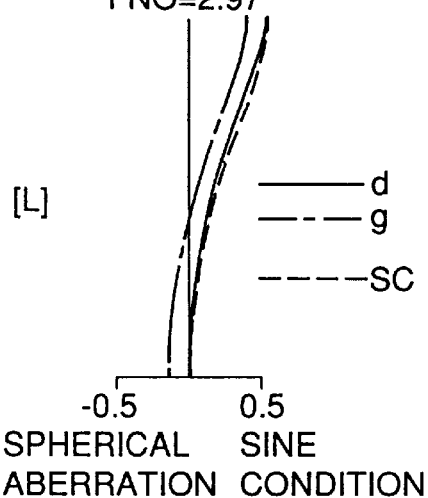
FIGS. 16A to 16I are aberration diagrams of the eighth embodiment.
Figure 16B:
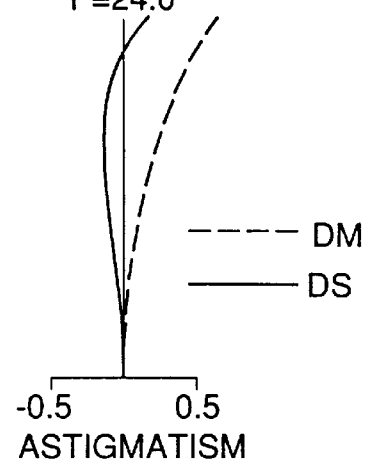
Figure 16C:
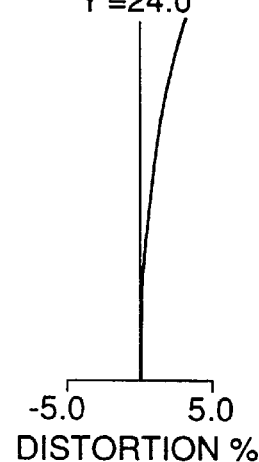
Figure 16D:
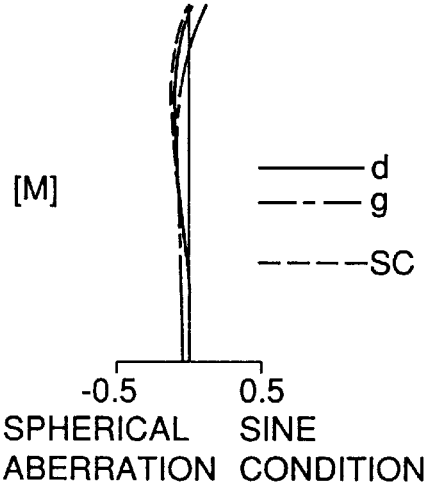
Figure 16E:
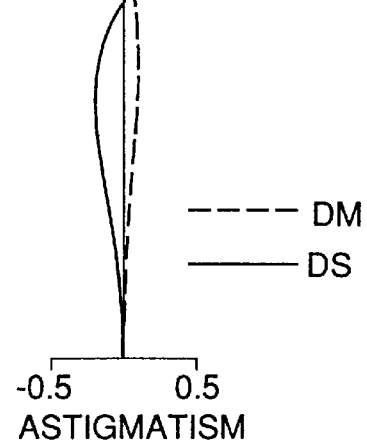
Figure 16F:
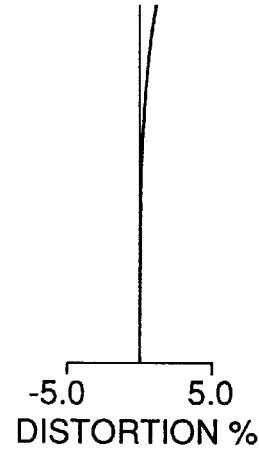
Figure 16G:
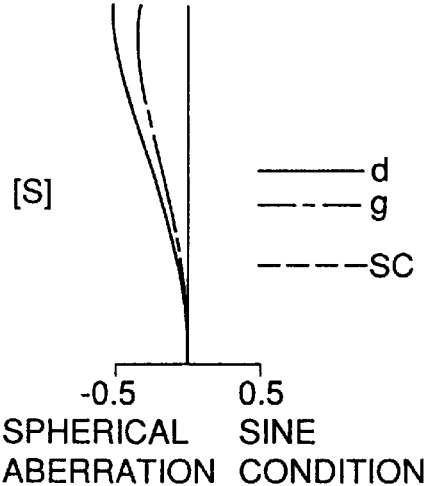
Figure 16H:
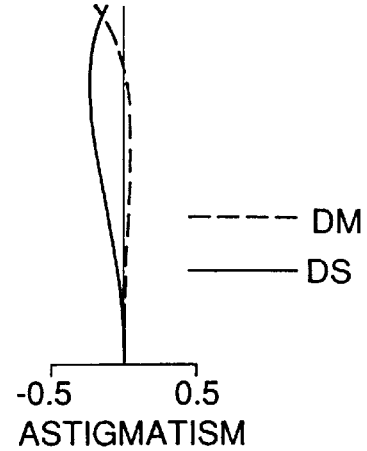
Figure 16I:
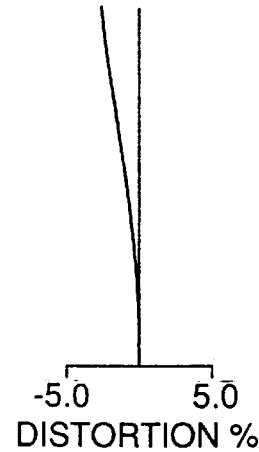
Figure 20A:
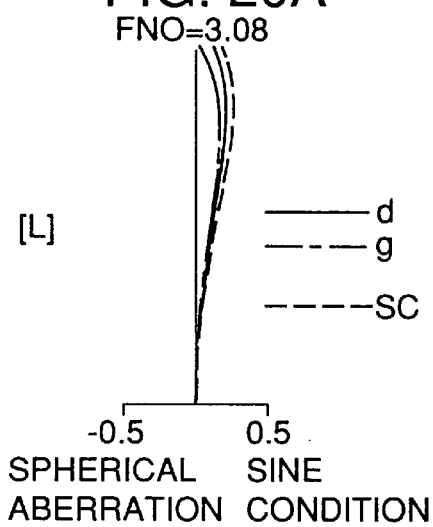
FIGS. 20A to 20I are aberration diagrams of the tenth embodiment.
Figure 20B:
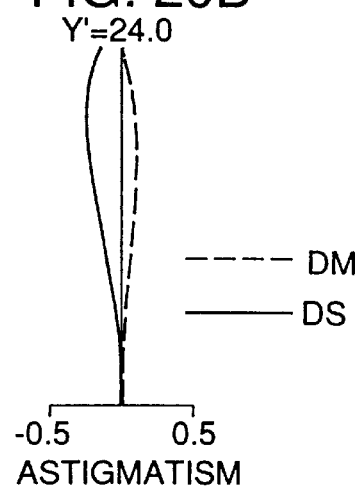
Figure 20C:
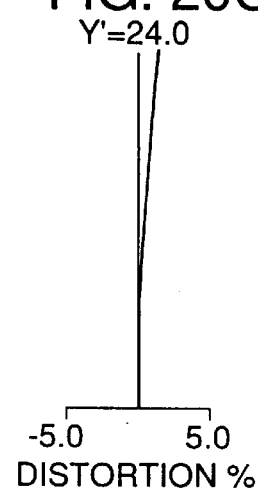
Figure 20D:
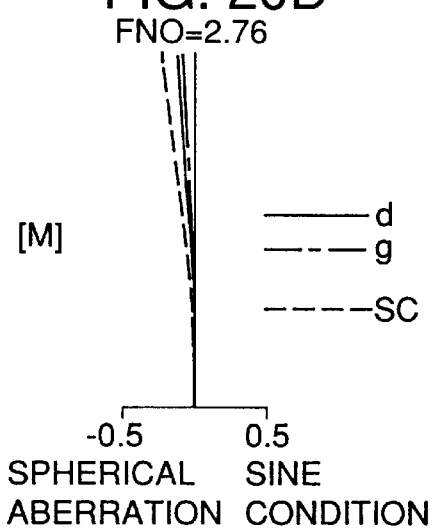
Figure 20E:
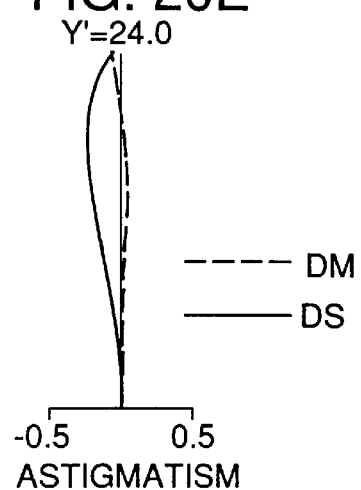
Figure 20F:
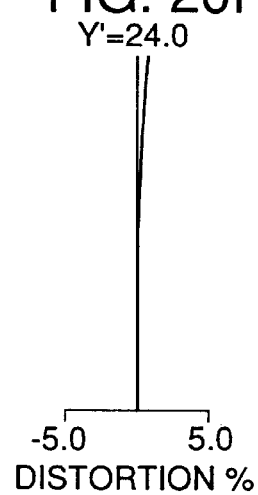
Figure 20G:
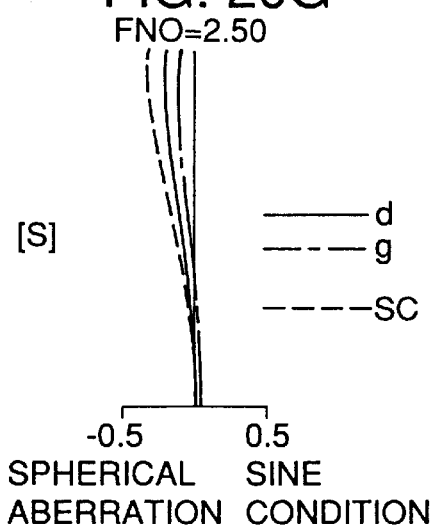
Figure 20H:
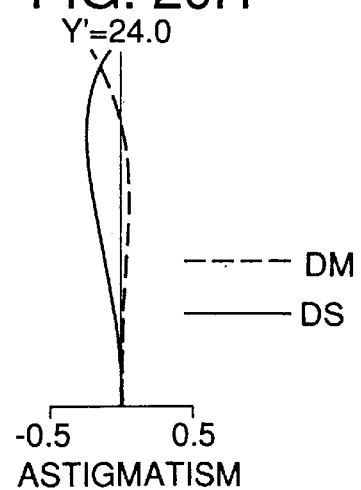
Figure 20I:
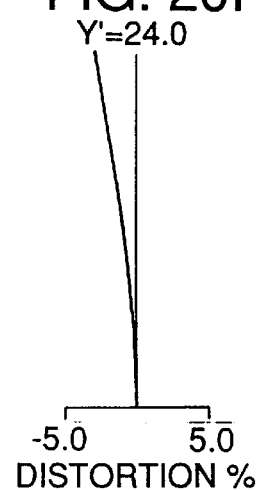
Figure 22A:
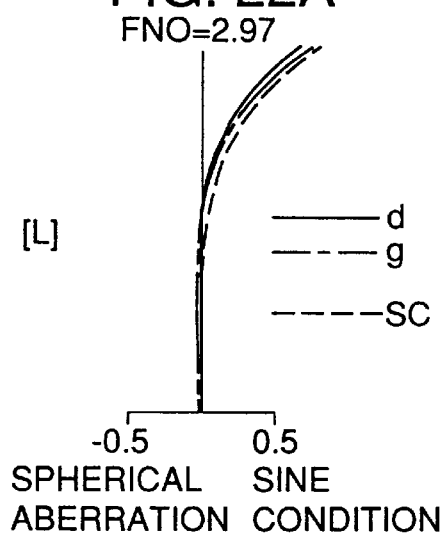
FIGS. 22A to 22I are aberration diagrams of the eleventh embodiment.
Figure 22B:
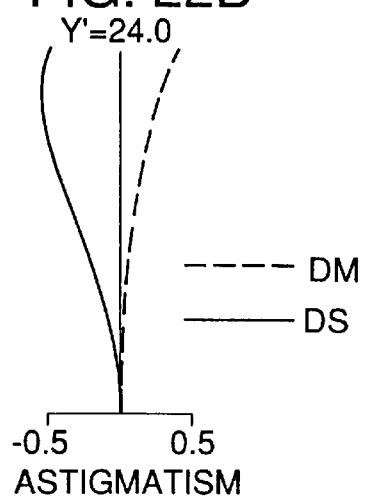
Figure 22C:
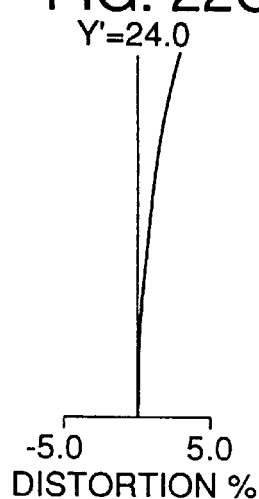
Figure 22D:
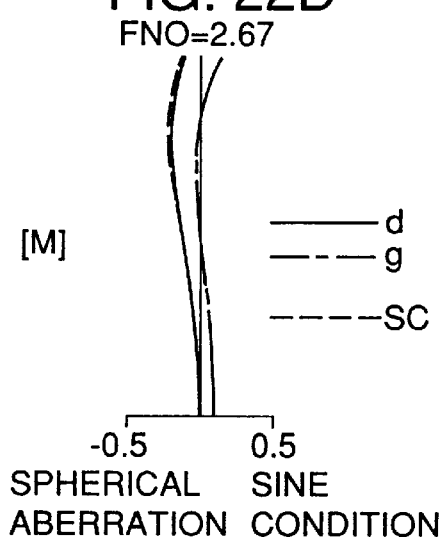
Figure 22E:
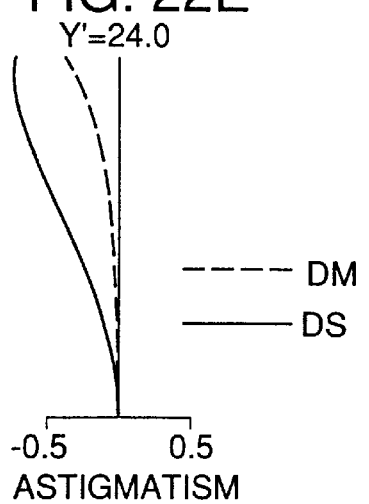
Figure 22F:
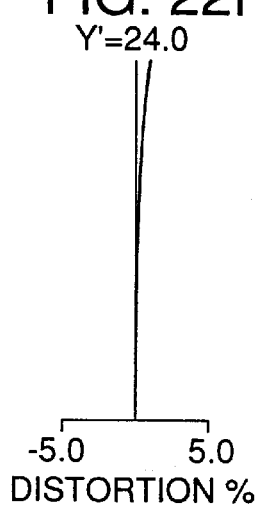
Figure 22G:
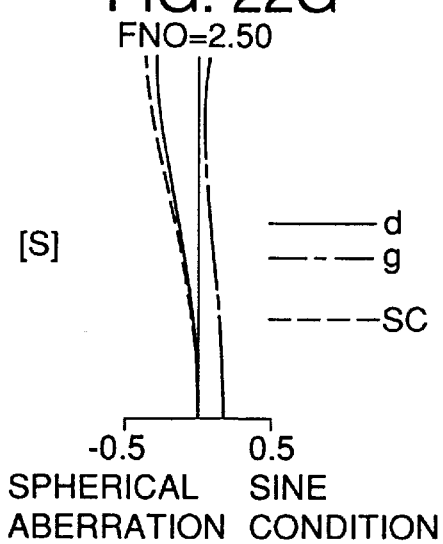
Figure 22H:
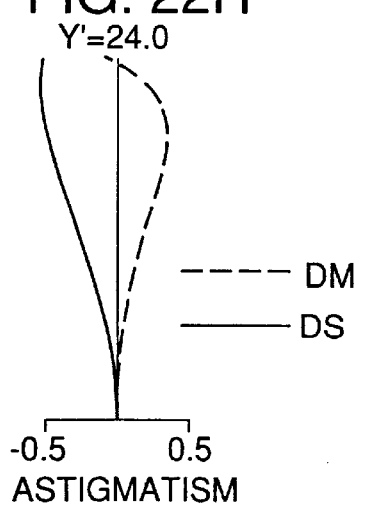
Figure 22I:
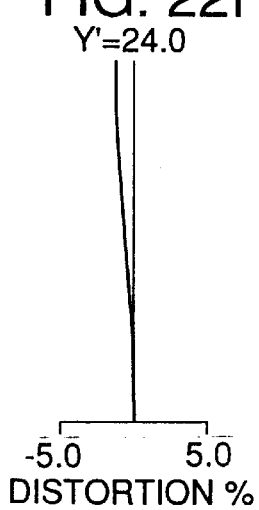
Figure 24A:
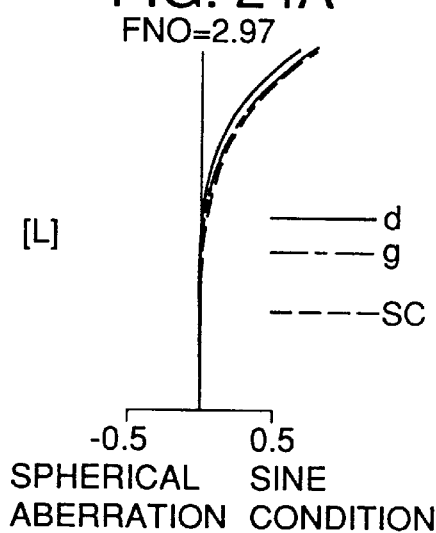
FIGS. 24A to 24I are aberration diagrams of the twelfth embodiment.
Figure 24B:
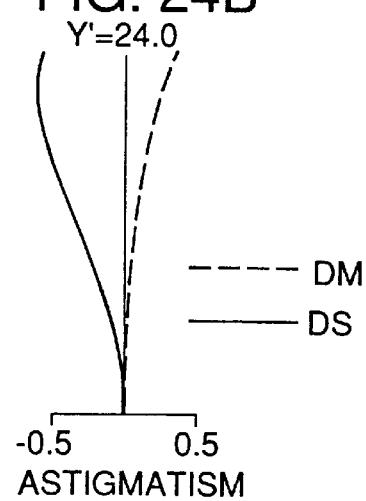
Figure 24C:
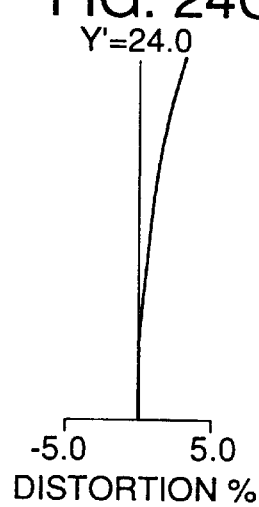
Figure 24D:
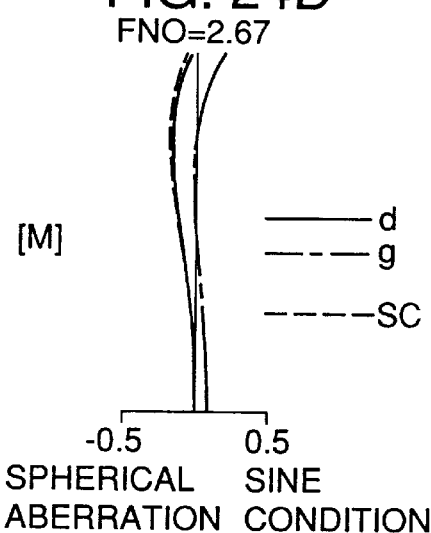
Figure 24E:
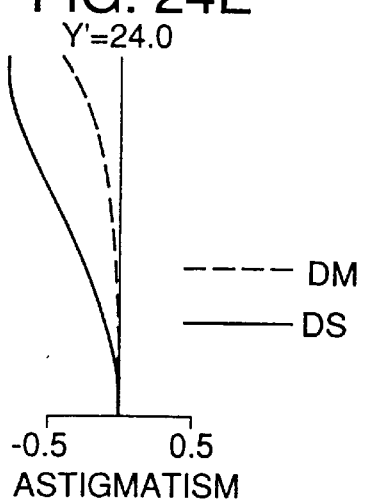
Figure 24F:
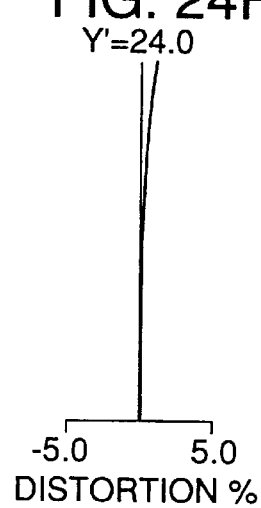
Figure 24G:
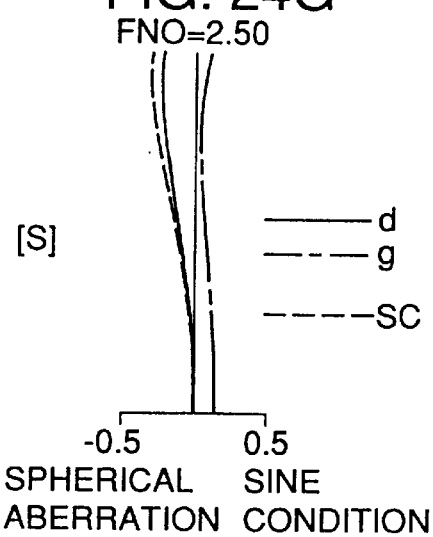
Figure 24H:
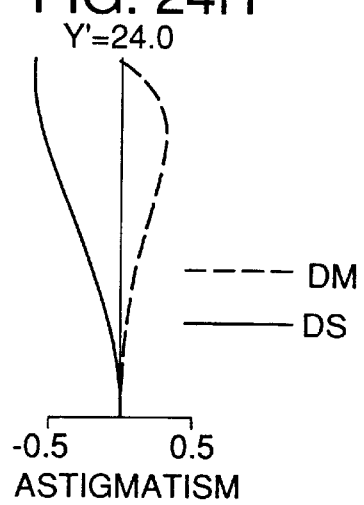
Figure 24I:
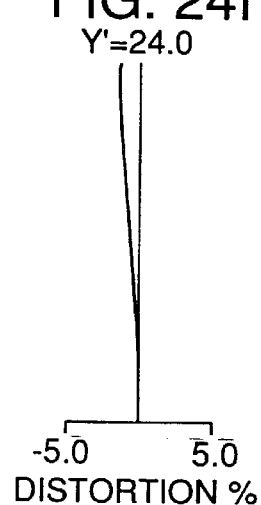
Figure 30A:
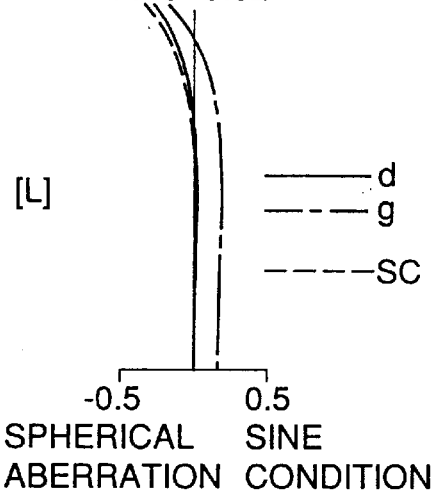
FIGS. 30A to 30I are aberration diagrams of the fifteenth embodiment.
Figure 30B:
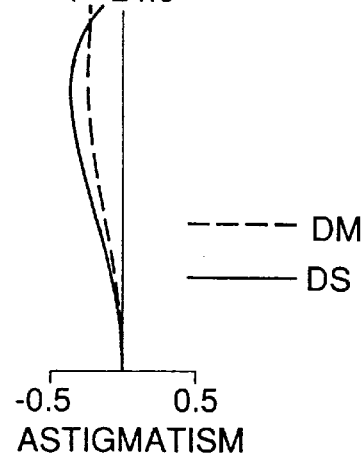
Figure 30C:
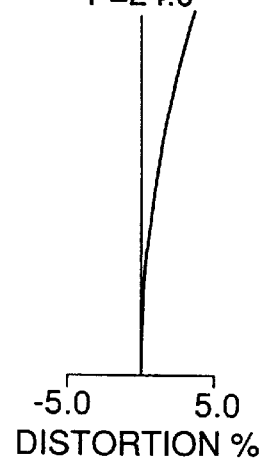
Figure 30D:
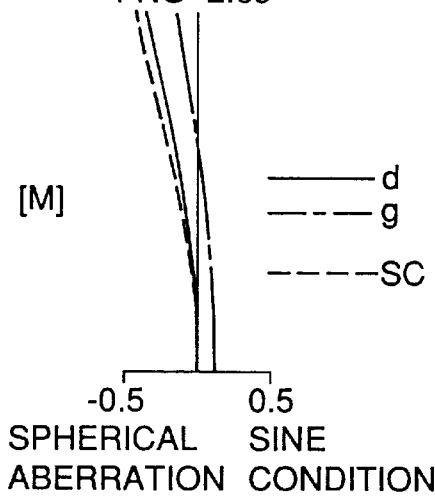
Figure 30E:
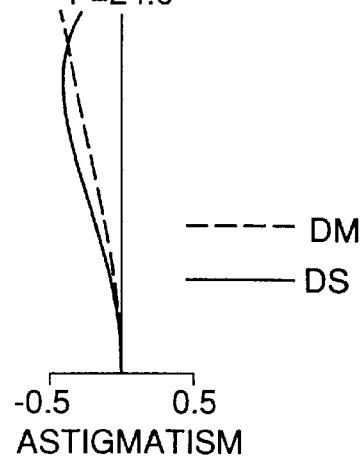
Figure 30F:
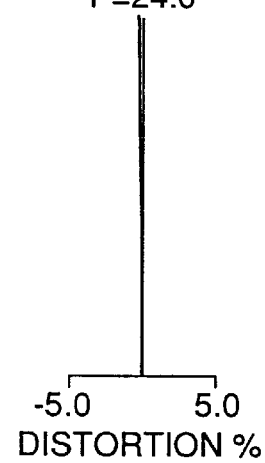
Figure 30G:
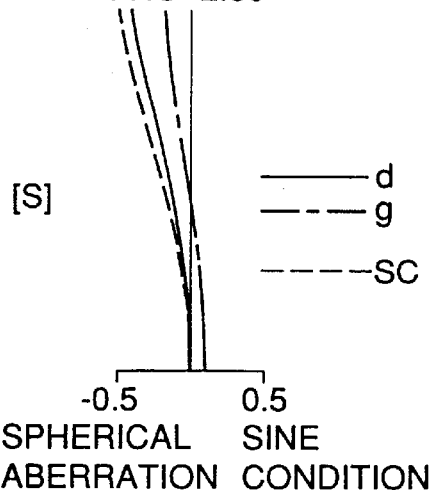
Figure 30H:
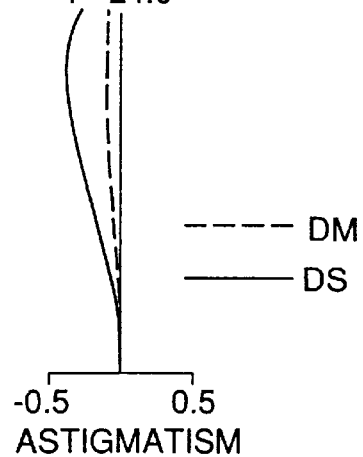
Figure 30I:
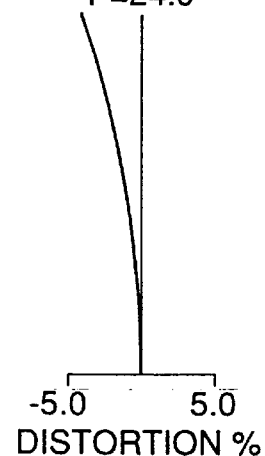
Figure 32A:
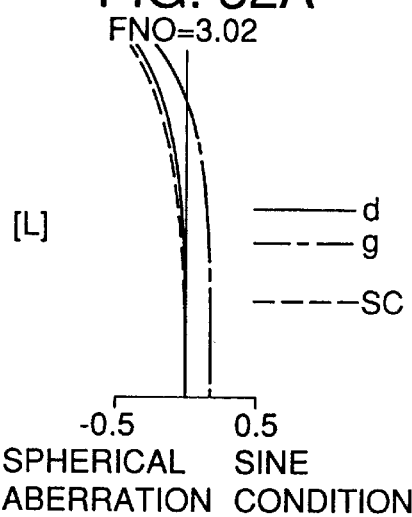
FIGS. 32A to 32I are aberration diagrams of the sixteenth embodiment.
Figure 32B:
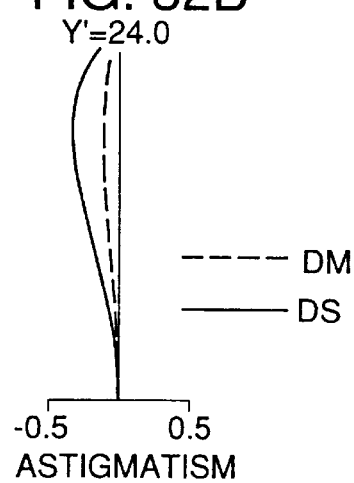
Figure 32C:
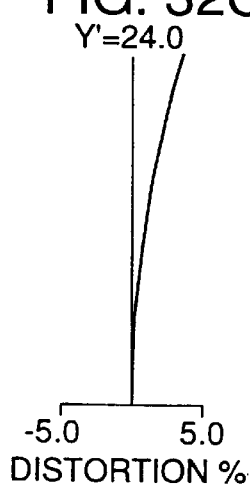
Figure 32D:
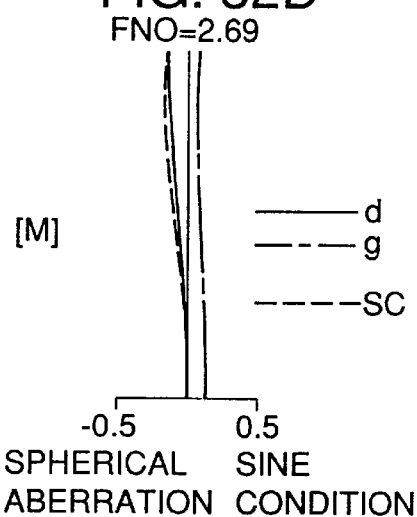
Figure 32E:
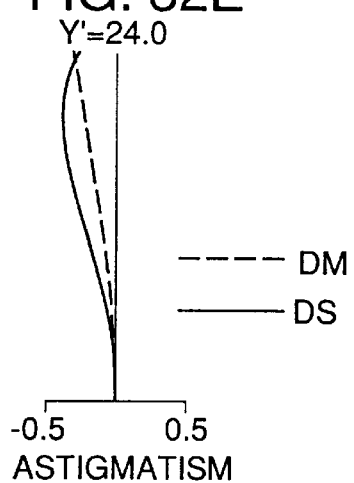
Figure 32F:
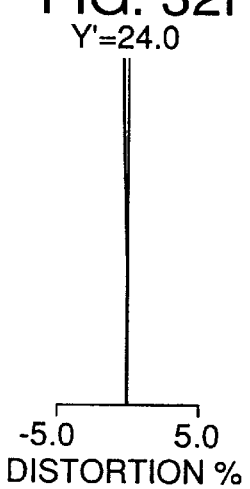
Figure 32G:
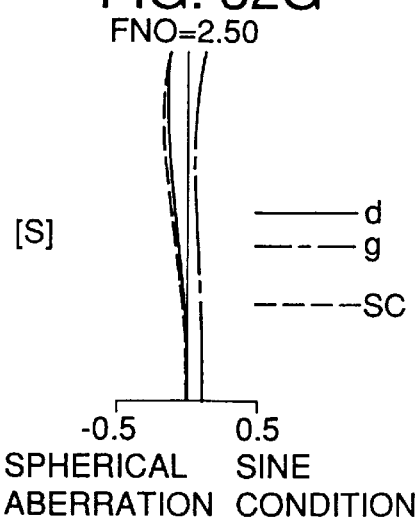
Figure 32H:
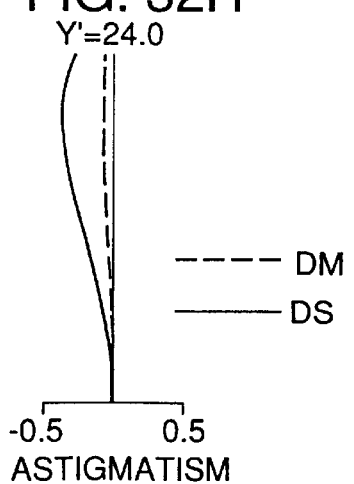
Figure 32I:
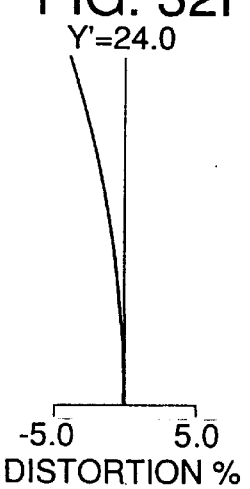
Figure 34A:
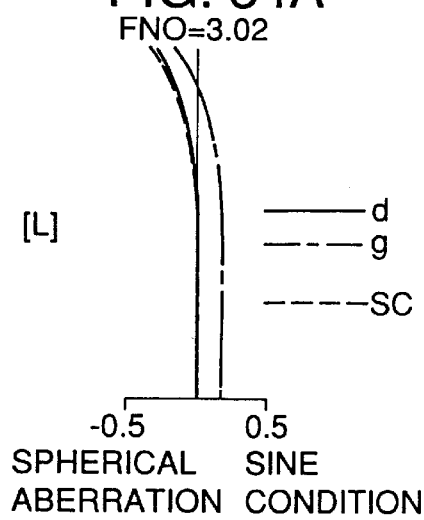
FIGS. 34A to 34I are aberration diagrams of the seventeenth embodiment.
Figure 34B:
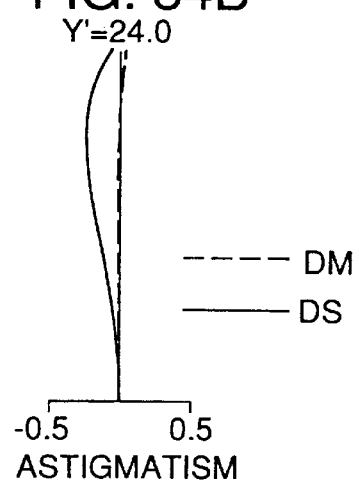
Figure 34C:
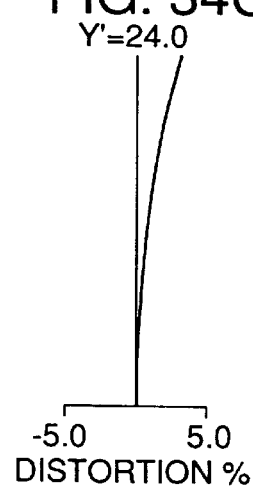
Figure 34D:
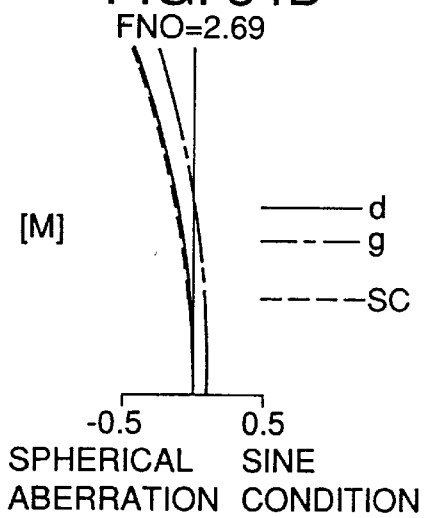
Figure 34E:
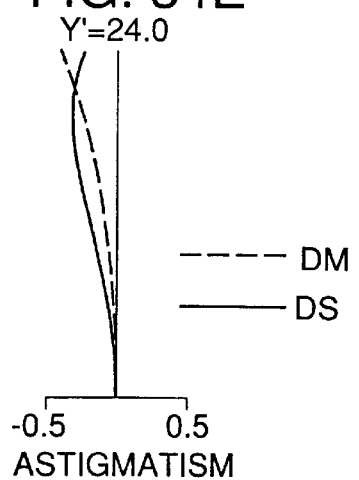
Figure 34F:
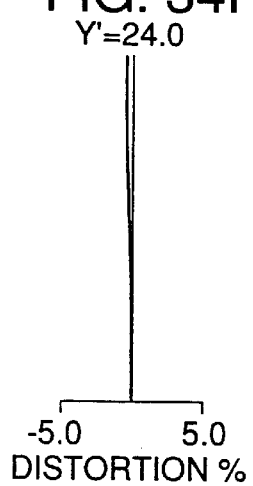
Figure 34G:
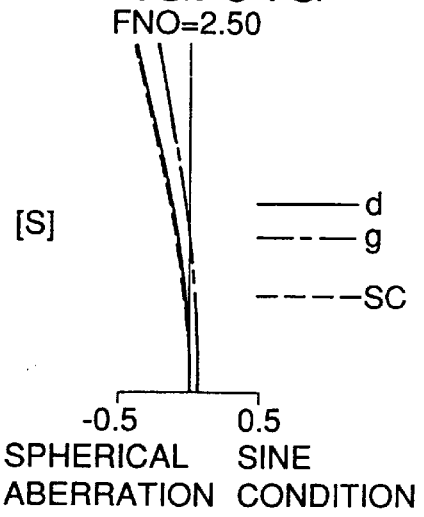
Figure 34H:
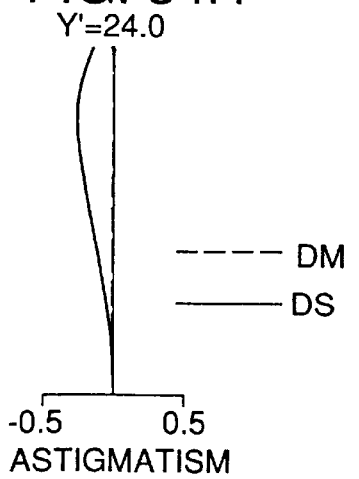
Figure 34I:
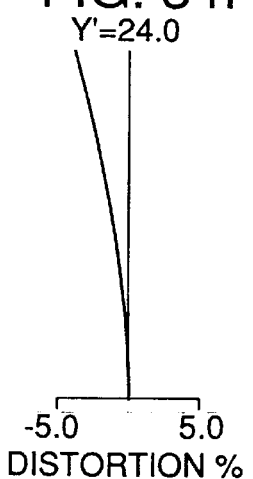
Figure 40A:
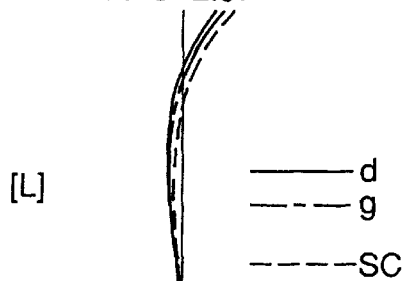
FIGS. 40A to 40I are aberration diagrams of the twentieth embodiment.
Figure 40B:
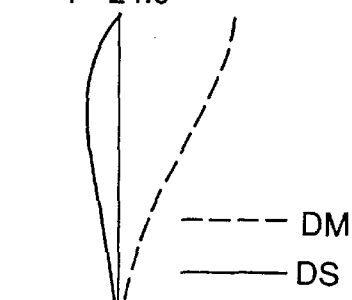
Figure 40C:
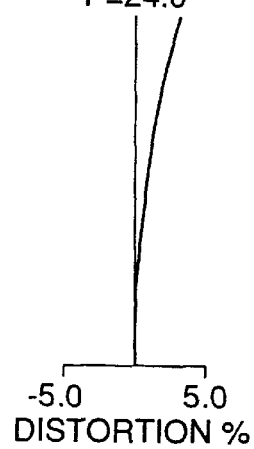
Figure 40D:
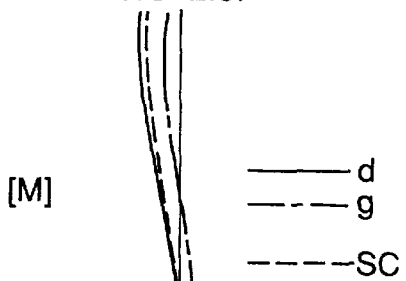
Figure 40E:
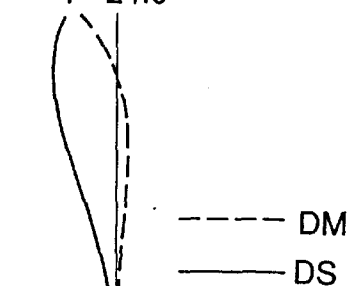
Figure 40F:
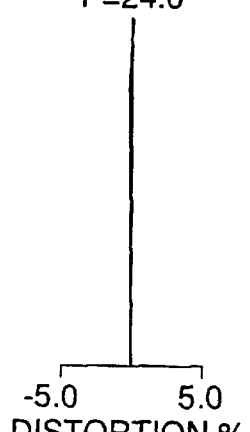
Figure 40G:
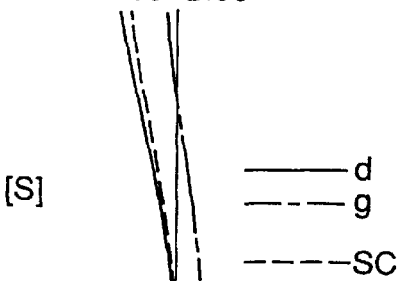
Figure 40H:
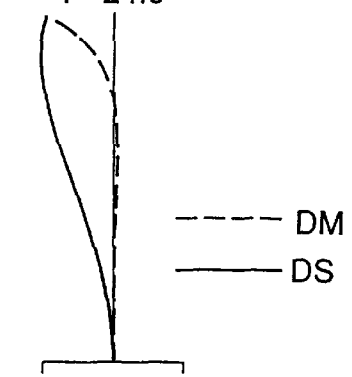
Figure 40I:
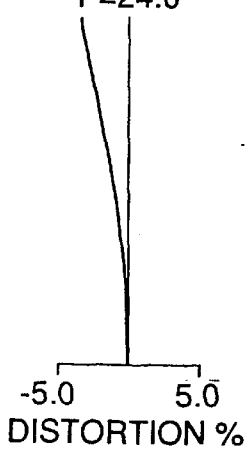

These examples of the first to twenty-first embodiments (each as an optical system including a dichroic prism PR) exhibit aberrations as shown in FIGS. 2A–2I, 4A–4I, 6A–6I, 8A–8I, 10A–10I, 12A–12I, 14A–14I, 16A–16I, 18A–18I, 20A–20I, 22A–22I, 24A–24I, 26A–26I, 28A–28I, 30A–30I, 32A–32I, 34A–34I, 36A–36I, 38A–38I, 40A–40I, and 42A–42I, respectively. Of these aberration diagrams. FIGS. 2A–2C, 4A–4C, 6A–6C, 8A–8C, 10A–10C, 12A–12C, 14A–14C, 16A–16C, 18A–18C, 20A–20C, 22A–22C, 24A–24C, 26A–26C, 28A–28C, 30A–30C, 32A–32C, 34A–34C, 36A–36C, 38A–38C, 40A–40C, and 42A–42C show three relevant types of aberration as observed in the longest-focal-length condition [L], FIGS. 2D–2F, 4D–4F, 6D–6F, 8D–8F, 10D–10F, 12D–12F, 14D–14F, 16D–16F, 18D–18F, 20D–20F, 22D–22F, 24D–24F, 26D–26F, 28D–28F, 30D–30F, 32D–32F, 34D–34F, 36D–36F, 38D–38F, 40D–40F, and 42D–42F show the same types of aberration as observed in the middle-focal-length condition [M], and FIGS. 2G–2I, 4G–4I, 6G–6I, 8G–8I, 10G–10I, 12G–12I, 14G–14I, 16G–16I, 18G–18I, 20G–20I, 22G–22I, 24G–24I. 26G–26I, 28G–28I, 30G–30I, 32G–32I, 34G–34I, 36G–36I, 38G–38I, 40G–40I, and 42G–42I show the same types of aberration as observed in the shortest-focal-length condition [S]. In these aberration diagrams, Y' represents the image height; a solid line (d) indicates the aberration for the d line, and a dash-dot line (g) indicates the aberration for the g line; a broken line (DM) and a solid line (DS) respectively represent the astigmatism for the d line on the meridional and sagittal planes, respectively.

In practical use as a projection optical system for a liquid crystal projector, the zoom lens systems of the embodiments have the image plane on the screen, and the surface of the liquid crystal panel corresponds to the object plane. However, in the above evaluation of the zoom lens systems of the embodiments, they are regarded as reduction systems (for example, taking optical systems) having the object plane on the screen, and their optical performance is evaluated on the surface of the liquid crystal panel.

As described heretofore, according to the present invention, it is possible to realize a zoom lens system that has a sufficiently long back focal length and sufficiently high distortion correction performance for use as a projection optical system. In addition, depending on how the present invention is embodied, it is also possible to reduce underside distortion caused by the light beams incident on the peripheral portion of the first lens unit, or correct coma aberration satisfactorily.

TABLE 1

<<Embodiment 1>>
f = 72.4~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 316.464 | | | |
| | d1 = 2.500 | N1 = 1.62041 | ν1 = 60.29 |
| r2 = 51.034 | | | |
| | d2 = 8.500 | | |
| r3 = −1109.915 | | | |
| | d3 = 2.500 | N2 = 1.62041 | ν2 = 60.29 |
| r4 = 65.867 | | | |
| | d4 = 2.000 | | |
| r5 = 63.217 | | | |
| | d5 = 6.500 | N3 = 1.70055 | ν3 = 30.11 |
| r6 = 617.791 | | | |
| | d6 = 3.000~19.734~40.232 | | |
| {Second Lens Unit Gr2 . . . Positive} | | | |
| r7 = 54.458 | | | |
| | d7 = 5.000 | N4 = 1.62280 | ν4 = 56.88 |
| r8 = −1107.003 | | | |
| | d8 = 3.000 | | |
| r9 = 74.844 | | | |
| | d9 = 3.000 | N5 = 1.80518 | ν5 = 25.43 |
| r10 = 33.417 | | | |
| | d10 = 2.000 | | |
| r11 = 38.958 | | | |
| | d11 = 5.000 | N6 = 1.62280 | ν6 = 56.88 |
| r12 = −412.104 | | | |
| | d12 = 27.918~13.750~2.500 | | |
| {Third Lens Unit Gr3 . . . Negative} | | | |
| r13 = 57.598 | | | |
| | d13 = 6.000 | N7 = 1.75520 | ν7 = 27.51 |
| r14 = 79.864 | | | |
| | d14 = 5.000 | | |
| r15 = −1091.012 | | | |
| | d15 = 3.000 | N8 = 1.65446 | ν8 = 33.86 |
| r16 = 52.634 | | | |
| | d16 = 16.000~23.000~30.000 | | |

TABLE 1-continued

<<Embodiment 1>>
f = 72.4~59.0~48.3
FNO = 2.97~2.67~2.50

| Radius of Curvature | Axial Distance | Refractive Index | Abbe Number |
|---|---|---|---|
| {Fourth Lens Unit Gr4 . . . Positive} | | | |
| r17 = −81.266 | | | |
| | d17 = 2.500 | N9 = 1.65446 | ν9 = 33.86 |
| r18 = 160.749 | | | |
| | d18 = 4.000 | | |
| r19 = −517.221 | | | |
| | d19 = 8.000 | N10 = 1.62041 | ν10 = 60.29 |
| r20 = −48.410 | | | |
| | d20 = 0.100 | | |
| r21 = 129.160 | | | |
| | d21 = 7.000 | N11 = 1.62041 | ν11 = 60.29 |
| r22 = −276.582 | | | |
| | d22 = 0.100 | | |
| r23 = 53.499 | | | |
| | d23 = 7.000 | N12 = 1.62041 | ν12 = 60.29 |
| r24 = 128.208 | | | |
| | d24 = 5.000 | | |
| {Dichroic Prism PR} | | | |
| r25 = ∞ | | | |
| | d25 = 40.000 | N13 = 1.51680 | ν13 = 64.20 |
| r26 = ∞ | | | |

TABLE 2

<<Embodiment 2>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 189.613 | | | |
| | d1 = 2.500 | N1 = 1.62041 | ν1 = 60.29 |
| r2 = 51.922 | | | |
| | d2 = 8.500 | | |
| r3 = 186.604 | | | |
| | d3 = 2.500 | N2 = 1.62041 | ν2 = 60.29 |
| r4 = 44.973 | | | |
| | d4 = 2.000 | | |
| r5 = 43.578 | | | |
| | d5 = 6.500 | N3 = 1.70055 | ν3 = 30.11 |
| r6 = 100.517 | | | |
| | d6 = 3.000~19.075~38.744 | | |
| {Second Lens Unit Gr2 . . . Positive} | | | |
| r7 = 32.614 | | | |
| | d7 = 2.100 | N4 = 1.54072 | ν4 = 47.22 |
| r8 = 29.614 | | | |
| | d8 = 4.000 | | |
| r9 = 54.769 | | | |
| | d9 = 8.000 | N5 = 1.67000 | ν5 = 57.07 |
| r10 = −39.193 | | | |
| | d10 = 2.000 | N6 = 1.80518 | ν6 = 25.43 |
| r11 = −87.819 | | | |
| | d11 = 28.414~13.967~2.500 | | |
| {Third Lens Unit Gr3 . . . Negative} | | | |
| r12 = 46.438 | | | |
| | d12 = 6.000 | N7 = 1.75520 | ν7 = 27.51 |
| r13 = 65.485 | | | |
| | d13 = 5.000 | | |
| r14 = −1037.119 | | | |
| | d14 = 3.000 | N8 = 1.65446 | ν8 = 33.86 |
| r15 = 46.889 | | | |
| | d15 = 16.000~23.000~30.000 | | |

TABLE 2-continued

<<Embodiment 2>>
f = 72.5~59.0~48.3
FNO = 2.97~2.67~2.50

| Radius of Curvature | Axial Distance | Refractive Index | Abbe Number |
|---|---|---|---|
| {Fourth Lens Unit Gr4 . . . Positive} | | | |
| r16 = −99.666 | | | |
| | d16 = 2.500 | N9 = 1.65446 | ν9 = 33.86 |
| r17 = 141.044 | | | |
| | d17 = 4.000 | | |
| r18 = −1537.137 | | | |
| | d18 = 8.000 | N10 = 1.62041 | ν10 = 60.29 |
| r19 = −54.444 | | | |
| | d19 = 0.100 | | |
| r20 = 124.089 | | | |
| | d20 = 7.000 | N11 = 1.62041 | ν11 = 60.29 |
| r21 = −303.463 | | | |
| | d21 = 0.100 | | |
| r22 = 60.690 | | | |
| | d22 = 7.000 | N12 = 1.62041 | ν12 = 60.29 |
| r23 = 184.018 | | | |
| | d23 = 5.000 | | |
| {Dichroic Prism PR} | | | |
| r24 = ∞ | | | |
| | d24 = 40.000 | N13 = 1.51680 | ν13 = 64.20 |
| r25 = ∞ | | | |

TABLE 3

<<Embodiment 3>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 299.533 | | | |
| | d1 = 3.000 | N1 = 1.67000 | ν1 = 57.07 |
| r2 = 43.743 | | | |
| | d2 = 10.000 | | |
| r3 = −324.130 | | | |
| | d3 = 2.500 | N2 = 1.67000 | ν2 = 57.07 |
| r4 = 83.499 | | | |
| | d4 = 0.100 | | |
| r5 = 60.426 | | | |
| | d5 = 7.000 | N3 = 1.65016 | ν3 = 39.34 |
| r6 = −359.476 | | | |
| | d6 = 3.000~17.269~34.315 | | |
| {Second Lens Unit Gr2 . . . Positive} | | | |
| r7 = 78.555 | | | |
| | d7 = 6.000 | N4 = 1.61800 | ν4 = 63.39 |
| r8 = −160.001 | | | |
| | d8 = 1.000 | | |
| r9 = 59.400 | | | |
| | d9 = 3.000 | N5 = 1.84666 | ν5 = 23.82 |
| r10 = 35.032 | | | |
| | d10 = 2.000 | | |
| r11 = 38.680 | | | |
| | d11 = 5.000 | N6 = 1.63854 | ν6 = 55.62 |
| r12 = 253.937 | | | |
| | d12 = 22.882~11.556~2.500 | | |
| {Third Lens Unit Gr3 . . . Negative} | | | |
| r13 = 46.059 | | | |
| | d13 = 6.000 | N7 = 1.75520 | ν7 = 27.51 |
| r14 = −161.049 | | | |
| | d14 = 2.000 | N8 = 1.61293 | ν8 = 36.96 |
| r15 = 40.296 | | | |
| | d15 = 8.000 | | |

TABLE 3-continued

<<Embodiment 3>>
f = 72.5~59.0~48.3
FNO = 2.97~2.67~2.50

| Radius of Curvature | Axial Distance | Refractive Index | Abbe Number |
|---|---|---|---|
| r16 = −100.223 | | | |
| | d16 = 3.000 | N9 = 1.68893 | ν9 = 31.16 |
| r17 = 51.666 | | | |
| | d17 = 9.000~16.000~21.000 | | |
| {Fourth Lens Unit Gr4 . . . Positive} | | | |
| r18 = −162.014 | | | |
| | d18 = 3.000 | N10 = 1.80518 | ν10 = 25.43 |
| r19 = 164.804 | | | |
| | d19 = 12.000 | N11 = 1.62041 | ν11 = 60.29 |
| r20 = −51.160 | | | |
| | d20 = 0.100 | | |
| r21 = 133.999 | | | |
| | d21 = 7.000 | N12 = 1.62041 | ν12 = 60.29 |
| r22 = −203.262 | | | |
| | d22 = 0.100 | | |
| r23 = 70.899 | | | |
| | d23 = 6.000 | N13 = 1.62041 | ν13 = 60.29 |
| r24 = 178.783 | | | |
| | d24 = 5.000 | | |
| {Dichroic Prism PR} | | | |
| r25 = ∞ | | | |
| | d25 = 40.000 | N14 = 1.51680 | ν14 = 64.20 |
| r26 = ∞ | | | |

TABLE 4

<<Embodiment 4>>
f = 72.4~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 139.986 | | | |
| | d1 = 3.000 | N1 = 1.67000 | ν1 = 57.07 |
| r2 = 42.455 | | | |
| | d2 = 10.000 | | |
| r3 = −523.335 | | | |
| | d3 = 2.500 | N2 = 1.67000 | ν2 = 57.07 |
| r4 = 79.258 | | | |
| | d4 = 0.100 | | |
| r5 = 57.536 | | | |
| | d5 = 8.000 | N3 = 1.65446 | ν3 = 33.86 |
| r6 = 743.937 | | | |
| | d6 = 3.000~15.828~31.192 | | |
| {Second Lens Unit Gr2 . . . Positive} | | | |
| r7 = 143.997 | | | |
| | d7 = 6.000 | N4 = 1.62041 | ν4 = 60.29 |
| r8 = −98.339 | | | |
| | d8 = 0.100 | | |
| r9 = 78.103 | | | |
| | d9 = 6.000 | N5 = 1.67000 | ν5 = 57.07 |
| r10 = −86.259 | | | |
| | d10 = 2.000 | N6 = 1.80518 | ν6 = 25.43 |
| r11 = 475.767 | | | |
| | d11 = 24.092~12.158~2.500 | | |
| {Third Lens Unit Gr3 . . . Negative} | | | |
| r12 = 39.050 | | | |
| | d12 = 7.000 | N7 = 1.71736 | ν7 = 29.42 |
| r13 = −93.977 | | | |
| | d13 = 2.000 | N8 = 1.61293 | ν8 = 36.96 |
| r14 = 36.200 | | | |
| | d14 = 7.000 | | |

TABLE 4-continued

<<Embodiment 4>>
f = 72.4~59.0~48.3
FNO = 2.97~2.67~2.50

| Radius of Curvature | Axial Distance | Refractive Index | Abbe Number |
|---|---|---|---|
| r15 = -94.050 | | | |
| | d15 = 3.000 | N9 = 1.70055 | ν9 = 30.11 |
| r16 = 48.540 | | | |
| | d16 = 9.000~16.000~21.000 | | |
| {Fourth Lens Unit Gr4 . . . Positive} | | | |
| r17 = -251.136 | | | |
| | d17 = 3.000 | N10 = 1.80518 | ν10 = 25.43 |
| r18 = 177.780 | | | |
| | d18 = 11.000 | N11 = 1.62041 | ν11 = 60.29 |
| r19 = -52.396 | | | |
| | d19 = 0.100 | | |
| r20 = 124.493 | | | |
| | d20 = 7.000 | N12 = 1.62041 | ν12 = 60.29 |
| r21 = -312.736 | | | |
| | d21 = 0.100 | | |
| r22 = 66.549 | | | |
| | d22 = 6.000 | N13 = 1.62041 | ν13 = 60.29 |
| r23 = 187.422 | | | |
| | d23 = 5.000 | | |
| {Dichroic Prism PR} | | | |
| r24 = ∞ | | | |
| | d24 = 40.000 | N14 = 1.51680 | ν14 = 64.20 |
| r25 = ∞ | | | |

TABLE 5

<<Embodiment 5>>
f = 72.5~59.0~48.3
FNO = 3.00~2.70~2.50

| Radius of Curvature | Axial Distance | Refractive Index | Abbe Number |
|---|---|---|---|
| {First Lens Unit Gr1 . . . Negative} | | | |
| r1 = 353.937 | | | |
| | d1 = 3.000 | N1 = 1.67000 | ν1 = 57.07 |
| r2 = 39.026 | | | |
| | d2 = 9.000 | | |
| r3 = 44.819 | | | |
| | d3 = 6.000 | N2 = 1.74000 | ν2 = 28.26 |
| r4 = 60.142 | | | |
| | d4 = 4.000~17.555~33.685 | | |
| {Second Lens Unit Gr2 . . . Positive} | | | |
| r5 = 141.427 | | | |
| | d5 = 6.000 | N3 = 1.62041 | ν3 = 60.29 |
| r6 = -243.152 | | | |
| | d6 = 1.000 | | |
| r7 = 92.373 | | | |
| | d7 = 6.000 | N4 = 1.62041 | ν4 = 60.29 |
| r8 = -49.728 | | | |
| | d8 = 2.000 | N5 = 1.84666 | ν5 = 23.82 |
| r9 = -100.052 | | | |
| | d9 = 22.187~11.196~2.500 | | |
| {Third Lens Unit Gr3 . . . Negative} | | | |
| r10 = 50.851 | | | |
| | d10 = 5.000 | N6 = 1.77551 | ν6 = 37.90 |
| r11 = -495.255 | | | |
| | d11 = 2.000 | | |
| r12 = -1256.708 | | | |
| | d12 = 2.000 | N7 = 1.51680 | ν7 = 64.20 |
| r13 = 34.318 | | | |
| | d13 = 8.000 | | |
| r14 = -48.476 | | | |
| | d14 = 3.000 | N8 = 1.58144 | ν8 = 40.89 |

TABLE 5-continued

<<Embodiment 5>>
f = 72.5~59.0~48.3
FNO = 3.00~2.70~2.50

| Radius of Curvature | Axial Distance | Refractive Index | Abbe Number |
|---|---|---|---|
| r15 = 67.229 | | | |
| | d15 = 8.000~16.000~20.000 | | |
| {Fourth Lens Unit Gr4 . . . Positive} | | | |
| r16 = -224.530 | | | |
| | d16 = 3.000 | N9 = 1.80518 | ν9 = 25.43 |
| r17 = 93.882 | | | |
| | d17 = 12.000 | N10 = 1.62041 | ν10 = 60.29 |
| r18 = -49.708 | | | |
| | d18 = 0.100 | | |
| r19 = 191.651 | | | |
| | d19 = 6.000 | N11 = 1.62041 | ν11 = 60.29 |
| r20 = -194.438 | | | |
| | d20 = 0.100 | | |
| r21 = 73.204 | | | |
| | d21 = 6.000 | N12 = 1.62041 | ν12 = 60.29 |
| r22 = 329.202 | | | |
| | d22 = 5.000 | | |
| {Dichroic Prism PR} | | | |
| r23 = ∞ | | | |
| | d23 = 40.000 | N13 = 1.51680 | ν13 = 64.20 |
| r24 = ∞ | | | |

TABLE 6

<<Embodiment 6>>
f = 72.5~59.0~48.3
FNO = 3.00~2.70~2.50

| Radius of Curvature | Axial Distance | Refractive Index | Abbe Number |
|---|---|---|---|
| {First Lens Unit Gr1 . . . Negative} | | | |
| r1 = 288.002 | | | |
| | d1 = 3.000 | N1 = 1.67000 | ν1 = 57.07 |
| r2 = 38.467 | | | |
| | d2 = 9.000 | | |
| r3 = 43.775 | | | |
| | d3 = 6.000 | N2 = 1.74000 | ν2 = 28.26 |
| r4 = 57.390 | | | |
| | d4 = 4.000~17.378~33.322 | | |
| {Second Lens Unit Gr2 . . . Positive} | | | |
| r5 = 147.083 | | | |
| | d5 = 6.000 | N3 = 1.62041 | ν3 = 60.29 |
| r6 = -220.402 | | | |
| | d6 = 1.000 | | |
| r7 = 91.196 | | | |
| | d7 = 6.000 | N4 = 1.62041 | ν4 = 60.29 |
| r8 = -48.341 | | | |
| | d8 = 2.000 | N5 = 1.84666 | ν5 = 23.82 |
| r9 = -100.812 | | | |
| | d9 = 22.286~11.254~2.500 | | |
| {Third Lens Unit Gr3 . . . Negative} | | | |
| r10 = 51.843 | | | |
| | d10 = 5.000 | N6 = 1.77551 | ν6 = 37.90 |
| r11 = -747.669 | | | |
| | d11 = 2.000 | | |
| r12 = 2562.985 | | | |
| | d12 = 2.000 | N7 = 1.51680 | ν7 = 64.20 |
| r13 = 35.108 | | | |
| | d13 = 8.000 | | |
| r14 = -53.142 | | | |
| | d14 = 3.000 | N8 = 1.58144 | ν8 = 40.89 |
| r15 = 60.025 | | | |
| | d15 = 8.000~16.000~20.000 | | |

TABLE 6-continued

<<Embodiment 6>>
f = 72.5~59.0~48.3
FNO = 3.00~2.70~2.50

| Radius of Curvature | Axial Distance | Refractive Index | Abbe Number |
|---|---|---|---|
| {Fourth Lens Unit Gr4 . . . Positive} | | | |
| r16 = −114.822 | | | |
| | d16 = 7.000 | N9 = 1.62041 | ν9 = 60.29 |
| r17 = −47.857 | | | |
| | d17 = 0.100 | | |
| r18 = 407.030 | | | |
| | d18 = 12.000 | N10 = 1.62041 | ν10 = 60.29 |
| r19 = −40.074 | | | |
| | d19 = 2.000 | N11 = 1.75520 | ν11 = 27.51 |
| r20 = −105.152 | | | |
| | d20 = 0.100 | | |
| r21 = 82.741 | | | |
| | d21 = 8.000 | N12 = 1.62041 | ν12 = 60.29 |
| r22 = −596.403 | | | |
| | d22 = 5.000 | | |
| {Dichroic Prism PR} | | | |
| r23 = ∞ | | | |
| | d23 = 40.000 | N13 = 1.51680 | ν13 = 64.20 |
| r24 = ∞ | | | |

TABLE 7

<<Embodiment 7>>
f = 72.4~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 99.982 | | | |
| | d1 = 3.000 | N1 = 1.67000 | ν1 = 57.07 |
| r2 = 39.202 | | | |
| | d2 = 10.000 | | |
| r3 = 641.149 | | | |
| | d3 = 2.500 | N2 = 1.67090 | ν2 = 57.07 |
| r4 = 62.726 | | | |
| | d4 = 0.100 | | |
| r5 = 47.393 | | | |
| | d5 = 8.000 | N3 = 1.68150 | ν3 = 36.64 |
| r6 = 228.628 | | | |
| | d6 = 4.000~17.191~32.988 | | |
| {Second Lens Unit Gr2 . . . Positive} | | | |
| r7 = 90.814 | | | |
| | d7 = 6.000 | N4 = 1.61800 | ν4 = 63.39 |
| r8 = −45.723 | | | |
| | d8 = 1.000 | | |
| r9 = −41.104 | | | |
| | d9 = 2.000 | N5 = 1.84666 | ν5 = 23.82 |
| r10 = −66.311 | | | |
| | d10 = 35.491~17.330~2.500 | | |
| {Third Lens Unit Gr3 . . . Negative} | | | |
| r11 = 50.037 | | | |
| | d11 = 9.000 | N6 = 1.71736 | ν6 = 29.42 |
| r12 = −80.090 | | | |
| | d12 = 2.000 | N7 = 1.58144 | ν7 = 40.89 |
| r13 = 54.822 | | | |
| | d13 = 8.000 | | |
| r14 = −90.855 | | | |
| | d14 = 3.000 | N8 = 1.71736 | ν8 = 29.42 |
| r15 = 59.803 | | | |
| | d15 = 9.000~17.000~23.000 | | |

TABLE 7-continued

<<Embodiment 7>>
f = 72.4~59.0~48.3
FNO = 2.97~2.67~2.50

| Radius of Curvature | Axial Distance | Refractive Index | Abbe Number |
|---|---|---|---|
| {Fourth Lens Unit Gr4 . . . Positive} | | | |
| r16 = −251.215 | | | |
| | d16 = 3.000 | N9 = 1.80518 | ν9 = 25.43 |
| r17 = 126.603 | | | |
| | d17 = 14.000 | N10 = 1.62041 | ν10 = 60.29 |
| r18 = −53.298 | | | |
| | d18 = 0.100 | | |
| r19 = 105.096 | | | |
| | d19 = 8.000 | N11 = 1.62041 | ν11 = 60.29 |
| r20 = −357.060 | | | |
| | d20 = 0.100 | | |
| r21 = 62.865 | | | |
| | d21 = 8.000 | N12 = 1.62041 | ν12 = 60.29 |
| r22 = 131.911 | | | |
| | d22 = 5.000 | | |
| {Dichroic Prism PR} | | | |
| r23 = ∞ | | | |
| | d23 = 40.000 | N13 = 1.51680 | ν13 = 64.20 |
| r24 = ∞ | | | |

TABLE 8

<<Embodiment 8>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 61.778 | | | |
| | d1 = 3.000 | N1 = 1.62041 | ν1 = 60.29 |
| r2 = 30.825 | | | |
| | d2 = 12.000 | | |
| r3 = 216.839 | | | |
| | d3 = 2.500 | N2 = 1.62041 | ν2 = 60.29 |
| r4 = 56.974 | | | |
| | d4 = 0.100 | | |
| r5 = 37.959 | | | |
| | d5 = 8.000 | N3 = 1.80518 | ν3 = 25.43 |
| r6 = 57. 233 | | | |
| | d6 = 3.000~14.021~27.381 | | |
| {Second Lens Unit Gr2 . . . Positive} | | | |
| r7 = 57.243 | | | |
| | d7 = 2.000 | N4 = 1.54072 | ν4 = 47.22 |
| r8 = 37.025 | | | |
| | d8 = 2.000 | | |
| r9 = 48.640 | | | |
| | d9 = 8.000 | N5 = 1.67000 | ν5 = 57.07 |
| r10 = −33.005 | | | |
| | d10 = 2.000 | N6 = 1.80518 | ν6 = 25.43 |
| r11 = −68.624 | | | |
| | d11 = 27.020~13.556~2.500 | | |
| {Third Lens Unit Gr3 . . . Negative} | | | |
| r12 = 48.268 | | | |
| | d12 = 8.000 | N7 = 1.77551 | ν7 = 37.90 |
| r13 = −97.939 | | | |
| | d13 = 2.000 | N8 = 1.51680 | ν8 = 64.20 |
| r14 = 36.343 | | | |
| | d14 = 8.000 | | |
| r15 = −79.997 | | | |
| | d15 = 3.000 | N9 = 1.75520 | ν9 = 27.51 |
| r16 = 56.233 | | | |
| | d16 = 9.000~18.000~23.000 | | |

TABLE 8-continued

<<Embodiment 8>>
f = 72.5~59.0~48.3
FNO = 2.97~2.67~2.50

| Radius of Curvature | Axial Distance | Refractive Index | Abbe Number |
|---|---|---|---|
| {Fourth Lens Unit Gr4 . . . Positive} | | | |
| r17 = −697.141 | | | |
| | d17 = 3.000 | N10 = 1.80518 | ν10 = 25.43 |
| r18 = 266.732 | | | |
| | d18 = 12.000 | N11 = 1.62041 | ν11 = 60.29 |
| r19 = −59.3.77 | | | |
| | d19 = 0.100 | | |
| r20 = 259.666 | | | |
| | d20 = 7.000 | N12 = 1.62041 | ν12 = 6.029 |
| r21 = −218.211 | | | |
| | d21 = 0.100 | | |
| r22 = 68.286 | | | |
| | d22 = 9.000 | N13 = 1.62041 | ν13 = 60.29 |
| r23 = 474.590 | | | |
| | d23 = 5.000 | | |
| {Dichroic Prism PR} | | | |
| r24 = ∞ | | | |
| | d24 = 40.000 | N14 = 1.51680 | ν14 = 64.20 |
| r25 = ∞ | | | |

TABLE 9

<<Embodiment 9>>
f = 72.4~59.0~48.3
FNO = 3.14~2.78~2.50

| Radius of Curvature | Axial Distance | Refractive Index | Abbe Number |
|---|---|---|---|
| {First Lens Unit Gr1 . . . Negative} | | | |
| r1 = 76.274 | | | |
| | d1 = 3.000 | N1 = 1.67000 | ν1 = 57.07 |
| r2 = 33.536 | | | |
| | d2 = 12.000 | | |
| r3 = 371.793 | | | |
| | d3 = 2.500 | N2 = 1.62041 | ν2 = 60.29 |
| r4 = 73.146 | | | |
| | d4 = 0.100 | | |
| r5 = 42.192 | | | |
| | d5 = 8.000 | N3 = 1.80518 | ν3 = 25.43 |
| r6 = 65.750 | | | |
| | d6 = 3.000~14.015~27.361 | | |
| {Second Lens Unit Gr2 . . . Positive} | | | |
| r7 = 58.137 | | | |
| | d7 = 2.000 | N4 = 1.63980 | ν4 = 34.55 |
| r8 = 35.437 | | | |
| | d8 = 2.000 | | |
| r9 = 44.006 | | | |
| | d9 = 10.000 | N5 = 1.67000 | ν5 = 57.07 |
| r10 = −37.614 | | | |
| | d10 = 2.000 | N6 = 1.80518 | ν6 = 25.43 |
| r11 = −71.104 | | | |
| | d11 = 28.502~14.195~2.500 | | |
| {Third Lens Unit Gr3 . . . Negative} | | | |
| r12 = 60.641 | | | |
| | d12 = 8.000 | N7 = 1.80518 | ν7 = 25.43 |
| r13 = −60.526 | | | |
| | d13 = 2.000 | N8 = 1.65446 | ν8 = 33.86 |
| r14 = 57.826 | | | |
| | d14 = 8.000 | | |
| r15 = −79.015 | | | |
| | d15 = 3.000 | N9 = 1.75520 | ν9 = 27.51 |
| r16 = 68.547 | | | |
| | d16 = 10.000~18.000~22.000 | | |

TABLE 9-continued

<<Embodiment 9>>
f = 72.4~59.0~48.3
FNO = 3.14~2.78~2.50

| Radius of Curvature | Axial Distance | Refractive Index | Abbe Number |
|---|---|---|---|
| {Fourth Lens Unit Gr4 . . . Positive} | | | |
| r17 = −109.689 | | | |
| | d17 = 3.000 | N10 = 1.80518 | ν10 = 25.43 |
| r18 = 288.713 | | | |
| | d18 = 1.500 | | |
| r19 = 706.125 | | | |
| | d19 = 13.500 | N11 = 1.62041 | ν11 = 60.29 |
| r20 = −47.094 | | | |
| | d20 = 0.100 | | |
| r21 = 144.481 | | | |
| | d21 = 8.500 | N12 = 1.62041 | ν12 = 60.29 |
| r22 = −238.467 | | | |
| | d22 = 0.100 | | |
| r23 = 67.736 | | | |
| | d23 = 9.000 | N13 = 1.62041 | ν13 = 60.29 |
| r24 = 243.622 | | | |
| | d24 = 5.000 | | |
| {Dichroic Prism PR} | | | |
| r25 = ∞ | | | |
| | d25 = 40.000 | N14 = 1.51680 | ν14 = 64.20 |
| r26 = ∞ | | | |

TABLE 10

<<Embodiment 10>>
f = 72.4~59.0~48.3
FNO = 3.08~2.76~2.50

| Radius of Curvature | Axial Distance | Refractive Index | Abbe Number |
|---|---|---|---|
| {First Lens Unit Gr1 . . . Negative} | | | |
| r1 = 67.229 | | | |
| | d1 = 3.800 | N1 = 1.67000 | ν1 = 57.07 |
| r2 = 32.831 | | | |
| | d2 = 11.300 | | |
| r3 = 136.958 | | | |
| | d3 = 3.200 | N2 = 1.62041 | ν2 = 60.29 |
| r4 = 55.928 | | | |
| | d4 = 0.100 | | |
| r5 = 37.783 | | | |
| | d5 = 6.000 | N3 = 1.70055 | ν3 = 30.11 |
| r6 = 54.629 | | | |
| | d6 = 3.000~14.138~27.401 | | |
| {Second Lens Unit Gr2 . . . Positive} | | | |
| r7 = 50.009 | | | |
| | d7 = 2.100 | N4 = 1.54072 | ν4 = 47.20 |
| r8 = 38.289 | | | |
| | d8 = 4.000 | | |
| r9 = 52.228 | | | |
| | d9 = 8.000 | N5 = 1.67000 | ν5 = 57.07 |
| r10 = −44.828 | | | |
| | d10 = 2.000 | N6 = 1.80518 | ν6 = 25.43 |
| r11 = −84.690 | | | |
| | d11 = 29.014~13.668~1.500 | | |
| {Third Lens Unit Gr3 . . . Negative} | | | |
| r12 = 70.349 | | | |
| | d12 = 8.500 | N7 = 1.80518 | ν7 = 25.43 |
| r13 = −70.474 | | | |
| | d13 = 1.000 | | |
| r14 = −59.794 | | | |
| | d14 = 2.400 | N8 = 1.63980 | ν8 = 34.55 |
| r15 = 65.314 | | | |
| | d15 = 6.500 | | |

TABLE 10-continued

<<Embodiment 10>>
f = 72.4~59.0~48.3
FNO = 3.08~2.76~2.50

| Radius of Curvature | Axial Distance | Refractive Index | Abbe Number |
|---|---|---|---|
| r16 = −82.655 | | | |
| | d16 = 2.400 | N9 = 1.80518 | ν9 = 25.43 |
| r17 = 108.628 | | | |
| | d17 = 8.000~17.000~20.000 | | |
| {Fourth Lens Unit Gr4 . . . Positive} | | | |
| r18 = −86.860 | | | |
| | d18 = 3.200 | N10 = 1.80518 | ν10 = 25.43 |
| r19 = 193.127 | | | |
| | d19 = 2.000 | | |
| r20 = 1109.632 | | | |
| | d20 = 11.500 | N11 = 1.62041 | ν11 = 60.29 |
| r21 = −46.724 | | | |
| | d21 = 0.100 | | |
| r22 = 126.117 | | | |
| | d22 = 8.500 | N12 = 1.62041 | ν12 = 60.29 |
| r23 = −176.025 | | | |
| | d23 = 0.100 | | |
| r24 = 75.118 | | | |
| | d24 = 8.500 | N13 = 1.62041 | ν13 = 60.29 |
| r25 = 571.811 | | | |
| | d25 = 5.000 | | |
| {Dichroic Prism PR} | | | |
| r26 = ∞ | | | |
| | d26 = 41.200 | N14 = 1.51680 | ν14 = 64.20 |
| r27 = ∞ | | | |

TABLE 11

<<Embodiment 11>>
f = 72.4~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 490.314 | | | |
| | d1 = 3.000 | N1 = 1.62041 | ν1 = 60.29 |
| r2 = 52.502 | | | |
| | d2 = 8.000 | | |
| r3 = 123.723 | | | |
| | d3 = 2.500 | N2 = 1.62041 | ν2 = 60.29 |
| r4 = 46.378 | | | |
| | d4 = 4.000 | | |
| r5 = 69.600 | | | |
| | d5 = 8.000 | N3 = 1.58340 | ν3 = 30.23 |
| r6* = −8645.285 | | | |
| | d6 = 3.000~20.745~42.387 | | |
| {Second Lens Unit Gr2 . . . Positive} | | | |
| r7 = 55.285 | | | |
| | d7 = 5.000 | N4 = 1.62041 | ν4 = 60.29 |
| r8 = 630.716 | | | |
| | d8 = 3.000 | | |
| r9 = 77.736 | | | |
| | d9 = 3.000 | N5 = 1.80518 | ν5 = 25.43 |
| r10 = 35.712 | | | |
| | d10 = 2.000 | | |
| r11 = 40.820 | | | |
| | d11 = 5.000 | N6 = 1.62041 | ν6 = 60.29 |
| r12 = −200.843 | | | |
| | d12 = 24.411~12.180~2.500 | | |
| {Third Lens Unit Gr3 . . . Negative} | | | |
| r13 = 56.681 | | | |
| | d13 = 6.000 | N7 = 1.80518 | ν7 = 25.43 |

TABLE 11-continued

<<Embodiment 11>>
f = 72.4~59.0~48.3
FNO = 2.97~2.67~2.50

| Radius of Curvature | Axial Distance | Refractive Index | Abbe Number |
|---|---|---|---|
| r14 = 90.760 | | | |
| | d14 = 5.000 | | |
| r15 = −767.483 | | | |
| | d15 = 3.000 | N8 = 1.78560 | ν8 = 42.81 |
| r16 = 49.998 | | | |
| | d16 = 20.000~26.000~32.000 | | |
| {Fourth Lens Unit Gr4 . . . Positive} | | | |
| r17 = −209.960 | | | |
| | d17 = 2.500 | N9 = 1.80518 | ν9 = 25.43 |
| r18 = 130.313 | | | |
| | d18 = 4.000 | | |
| r19 = −5033.979 | | | |
| | d19 = 8.000 | N10 = 1.62041 | ν10 = 60.29 |
| r20 = −55.834 | | | |
| | d20 = 0.100 | | |
| r21 = 116.193 | | | |
| | d21 = 7.000 | N11 = 1.62041 | ν11 = 60.29 |
| r22 = −522.272 | | | |
| | d22 = 0.100 | | |
| r23 = 54.492 | | | |
| | d23 = 7.000 | N12 = 1.62041 | ν12 = 60.29 |
| r24 = 120.748 | | | |
| | d24 = 5.000 | | |
| {Dichroic Prism PR} | | | |
| r25 = ∞ | | | |
| | d25 = 40.000 | N13 = 1.51680 | ν13 = 64.20 |
| r26 = ∞ | | | |

[Aspherical Coefficients]

r6: ϵ = 1.0000
    A4 = −0.11771 × $10^{-5}$
    A6 = −0.15279 × $10^{-10}$
    A8 = −0.57687 × $10^{-12}$

TABLE 12

<<Embodiment 12>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 497.208 | | | |
| | d1 = 3.000 | N1 = 1.62041 | ν1 = 60.29 |
| r2 = 52.330 | | | |
| | d2 = 8.000 | | |
| r3 = 100.495 | | | |
| | d3 = 2.500 | N2 = 1.62041 | ν2 = 60.29 |
| r4 = 45.614 | | | |
| | d4 = 4.000 | | |
| r5 = 67.940 | | | |
| | d5 = 8.000 | N3 = 1.58340 | ν3 = 30.23 |
| r6* = 648.311 | | | |
| | d6 = 3.000~20.559~41.978 | | |
| {Second Lens Unit Gr2 . . . Positive} | | | |
| r7 = 56.862 | | | |
| | d7 = 5.000 | N4 = 1.62041 | ν4 = 60.29 |
| r8 = 471.054 | | | |
| | d8 = 3.000 | | |
| r9 = 75.752 | | | |
| | d9 = 3.000 | N5 = 1.80518 | ν5 = 25.43 |
| r10 = 36.084 | | | |
| | d10 = 2.000 | | |

TABLE 12-continued

<<Embodiment 12>>
f = 72.5~59.0~48.3
FNO = 2.97~2.67~2.50

| Radius of Curvature | Axial Distance | Refractive Index | Abbe Number |
|---|---|---|---|
| r11 = 41.292 | | | |
| | d11 = 5.000 | N6 = 1.62041 | ν6 = 60.29 |
| r12 = −180.515 | | | |
| | d12 = 24.817~12.364~2.500 | | |
| {Third Lens Unit Gr3 . . . Negative} | | | |
| r13 = 56.375 | | | |
| | d13 = 6.000 | N7 = 1.80518 | ν7 = 25.43 |
| r14 = 89.956 | | | |
| | d14 = 5.000 | | |
| r15 = −875.090 | | | |
| | d15 = 3.000 | N8 = 1.78560 | ν8 = 42.81 |
| r16 = 50.545 | | | |
| | d16 = 20.000~26.000~32.000 | | |
| {Fourth Lens Unit Gr4 . . . Positive} | | | |
| r17 = −211.092 | | | |
| | d17 = 2.500 | N9 = 1.80518 | ν9 = 25.43 |
| r18 = 130.130 | | | |
| | d18 = 4.000 | | |
| r19 = −2977.875 | | | |
| | d19 = 8.000 | N10 = 1.62041 | ν10 = 60.29 |
| r20 = −55.499 | | | |
| | d20 = 0.100 | | |
| r21 = 116.254 | | | |
| | d21 = 7.000 | N11 = 1.62041 | ν11 = 60.29 |
| r22 = −521.010 | | | |
| | d22 = 0.100 | | |
| r23 = 54.182 | | | |
| | d23 = 7.000 | N12 = 1.62041 | ν12 = 60.29 |
| r24 = 119.123 | | | |
| | d24 = 5.000 | | |
| {Dichroic Prism PR} | | | |
| r25 = ∞ | | | |
| | d25 = 40.000 | N13 = 1.51680 | ν13 = 64.20 |
| r26 = ∞ | | | |

[Aspherical Coefficients]

r6: ε = 1.0000
  A4 = −0.11631 × 10$^{-5}$
  A6 = −0.24968 × 10$^{-10}$
  A8 = −0.55642 × 10$^{-12}$

TABLE 13

<<Embodiment 13>>
f = 82.5~65.0~55.0
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 862.232 | | | |
| | d1 = 4.000 | N1 = 1.62041 | ν1 = 60.29 |
| r2 = 44.140 | | | |
| | d2 = 10.000 | | |
| r3 = −162.503 | | | |
| | d3 = 3.000 | N2 = 1.62041 | ν2 = 60.29 |
| r4 = 195.625 | | | |
| | d4 = 0.500 | | |
| r5 = 88.362 | | | |
| | d5 = 5.000 | N3 = 1.84666 | ν3 = 23.82 |
| r6 = 418.176 | | | |
| | d6 = 3.000~15.766~26.707 | | |

TABLE 13-continued

<<Embodiment 13>>
f = 82.5~65.0~55.0
FNO = 2.97~2.67~2.50

| Radius of Curvature | Axial Distance | Refractive Index | Abbe Number |
|---|---|---|---|
| {Second Lens Unit Gr2 . . . Positive} | | | |
| r7 = 107.383 | | | |
| | d7 = 5.000 | N4 = 1.61800 | ν4 = 63.39 |
| r8 = −111.942 | | | |
| | d8 = 0.500 | | |
| r9 = 70.519 | | | |
| | d9 = 3.000 | N5 = 1.84666 | ν5 = 23.82 |
| r10 = 37.867 | | | |
| | d10 = 7.000 | N6 = 1.61800 | ν6 = 63.39 |
| r11 = −420.978 | | | |
| | d11 = 23.041~9.969~2.500 | | |
| {Third Lens Unit Gr3 . . . Positive} | | | |
| (Front Lens Sub-unit . . . Negative) | | | |
| r12 = 35.819 | | | |
| | d12 = 6.000 | N7 = 1.80518 | ν7 = 25.43 |
| r13 = 59.423 | | | |
| | d13 = 3.000 | | |
| r14 = 188.974 | | | |
| | d14 = 3.000 | N8 = 1.74000 | ν8 = 31.72 |
| r15 = 36.572 | | | |
| | d15 = 8.000 | | |
| r16 = 536.386 | | | |
| | d16 = 4.000 | N9 = 1.84666 | ν9 = 23.82 |
| r17 = 53.063 | | | |
| | d17 = 20.500 | | |
| (Rear Lens Sub-unit . . . Positive) | | | |
| r18 = −1063.366 | | | |
| | d18 = 6.000 | N10 = 1.62041 | ν10 = 60.29 |
| r19 = −78.508 | | | |
| | d19 = 0.100 | | |
| r20 = −724.743 | | | |
| | d20 = 7.500 | N11 = 1.62041 | ν11 = 60.29 |
| r21 = −97.491 | | | |
| | d21 = 0.100 | | |
| r22 = 61.183 | | | |
| | d22 = 8.000 | N12 = 1.51680 | ν12 = 64.20 |
| r23 = 263.940 | | | |
| | d23 = 5.000 | | |
| {Dichroic Prism PR} | | | |
| r24 = ∞ | | | |
| | d24 = 40.000 | N13 = 1.51680 | ν13 = 64.20 |
| r25 = ∞ | | | |

TABLE 14

<<Embodiment 14>>
f = 82.5~65.0~55.0
FNO = 2.95~2.66~2.50

| Radius of Curvature | Axial Distance | Refractive Index | Abbe Number |
|---|---|---|---|
| {First Lens Unit Gr1 . . . Negative} | | | |
| r1 = 1276.194 | | | |
| | d1 = 4.000 | N1 = 1.51680 | ν1 = 64.20 |
| r2 = 48.518 | | | |
| | d2 = 9.000 | | |
| r3 = −1827.252 | | | |
| | d3 = 4.000 | N2 = 1.51680 | ν2 = 64.20 |
| r4 = 252.429 | | | |
| | d4 = 1.000 | | |
| r5 = 59.903 | | | |
| | d5 = 6.500 | N3 = 1.80518 | ν3 = 25.43 |

TABLE 14-continued

<<Embodiment 14>>
f = 82.5~65.0~55.0
FNO = 2.95~2.66~2.50

| Radius of Curvature | Axial Distance | Refractive Index | Abbe Number |
|---|---|---|---|
| r6 = 83.140 | | | |
| | d6 = 2.000~20.893~37.086 | | |
| {Second Lens Unit Gr2 . . . Positive} | | | |
| r7 = 142.301 | | | |
| | d7 = 6.000 | N4 = 1.69680 | ν4 = 56.47 |
| r8 = −125.949 | | | |
| | d8 = 0.500 | | |
| r9 = 143.769 | | | |
| | d9 = 9.000 | N5 = 1.69680 | ν5 = 56.47 |
| r10 = −47.833 | | | |
| | d10 = 3.000 | N6 = 1.75520 | ν6 = 27.51 |
| r11 = −643.803 | | | |
| | d11 = 23.612~10.177~2.500 | | |
| {Third Lens Unit Gr3 . . . Positive} | | | |
| (Front Lens Sub-unit . . . Negative) | | | |
| r12 = 33.100 | | | |
| | d12 = 8.000 | N7 = 1.84666 | ν7 = 23.82 |
| r13 = 33.554 | | | |
| | d13 = 8.000 | | |
| r14 = −146.016 | | | |
| | d14 = 4.000 | N8 = 1.68150 | ν8 = 36.64 |
| r15 = 43.148 | | | |
| | d15 = 15.000 | | |
| (Rear Lens Sub-unit . . . Positive) | | | |
| r16 = 493.140 | | | |
| | d16 = 4.000 | N9 = 1.80518 | ν9 = 25.43 |
| r17 = 85.960 | | | |
| | d17 = 15.000 | N10 = 1.69680 | ν10 = 56.47 |
| r18 = −71.017 | | | |
| | d18 = 0.500 | | |
| r19 = 93.480 | | | |
| | d19 = 12.000 | N11 = 1.69680 | ν11 = 56.47 |
| r20 = −271.857 | | | |
| | d20 = 5.000 | | |
| {Dichroic Prism PR} | | | |
| r21 = ∞ | | | |
| | d21 = 40.000 | N12 = 1.51680 | ν12 = 64.20 |
| r22 = ∞ | | | |

TABLE 15

<<Embodiment 15>>
f = 82.5~65.0~55.0
FNO = 3.02~2.69~2.50

| Radius of Curvature | Axial Distance | Refractive Index | Abbe Number |
|---|---|---|---|
| {First Lens Unit Gr1 . . . Negative} | | | |
| r1 = 676.585 | | | |
| | d1 = 4.000 | N1 = 1.61800 | ν1 = 63.39 |
| r2 = 45.769 | | | |
| | d2 = 11.163 | | |
| r3 = 44.004 | | | |
| | d3 = 4.000 | N2 = 1.84666 | ν2 = 23.82 |
| r4 = 50.240 | | | |
| | d4 = 2.000~17.471~30.732 | | |
| {Second Lens Unit Gr2 . . . Positive} | | | |
| r5 = 62.527 | | | |
| | d5 = 5.000 | N3 = 1.61800 | ν3 = 63.39 |
| r6 = 754.256 | | | |
| | d6 = 0.500 | | |

TABLE 15-continued

<<Embodiment 15>>
f = 82.5~65.0~55.0
FNO = 3.02~2.69~2.50

| Radius of Curvature | Axial Distance | Refractive Index | Abbe Number |
|---|---|---|---|
| r7 = 82.261 | | | |
| | d7 = 3.000 | N4 = 1.80518 | ν4 = 25.43 |
| r8 = 41.588 | | | |
| | d8 = 2.000 | | |
| r9 = 54.541 | | | |
| | d9 = 7.000 | N5 = 1.61800 | ν5 = 63.39 |
| r10 = −137.617 | | | |
| | d10 = 27.781~11.375~2.000 | | |
| {Third Lens Unit Gr3 . . . Positive} | | | |
| (Front Lens Sub-unit . . . Negative) | | | |
| r11 = 33.190 | | | |
| | d11 = 8.000 | N6 = 1.84666 | ν6 = 23.82 |
| r12 = 32.840 | | | |
| | d12 = 14.000 | | |
| r13 = −103.203 | | | |
| | d13 = 4.000 | N7 = 1.68150 | ν7 = 36.64 |
| r14 = 45.848 | | | |
| | d14 = 10.000 | | |
| (Rear Lens Sub-unit . . . Positive) | | | |
| r15 = 5254.861 | | | |
| | d15 = 4.000 | N8 = 1.80518 | ν8 = 25.43 |
| r16 = 93.889 | | | |
| | d16 = 12.000 | N9 = 1.69680 | ν9 = 56.47 |
| r17 = −63.501 | | | |
| | d17 = 0.500 | | |
| r18 = 68.713 | | | |
| | d18 = 16.000 | N10 = 1.61800 | ν10 = 63.39 |
| r19 = −170.704 | | | |
| | d19 = 5.000 | | |
| {Dichroic Prism PR} | | | |
| r20 = ∞ | | | |
| | d20 = 40.000 | N11 = 1.51680 | ν11 = 64.20 |
| r21 = ∞ | | | |

TABLE 16

<<Embodiment 16>>
f = 82.5~65.0~55.0
FNO = 3.02~2.69~2.50

| Radius of Curvature | Axial Distance | Refractive Index | Abbe Number |
|---|---|---|---|
| {First Lens Unit Gr1 . . . Negative} | | | |
| r1 = 154.353 | | | |
| | d1 = 4.000 | N1 = 1.61800 | ν1 = 63.39 |
| r2 = 40.773 | | | |
| | d2 = 10.392 | | |
| r3 = 42.203 | | | |
| | d3 = 7.000 | N2 = 1.70055 | ν2 = 30.11 |
| r4 = 58.991 | | | |
| | d4 = 7.517 | | |
| r5 = 839.835 | | | |
| | d5 = 3.000 | N3 = 1.61800 | ν3 = 63.39 |
| r6 = 141.920 | | | |
| | d6 = 3.000~18.869~32.472 | | |
| {Second Lens Unit Gr2 . . . Positive} | | | |
| r7 = 68.935 | | | |
| | d7 = 5.000 | N4 = 1.61800 | ν4 = 63.39 |
| r8 = −1402.564 | | | |
| | d8 = 0.500 | | |
| r9 = 82.107 | | | |
| | d9 = 3.000 | N5 = 1.80518 | ν5 = 25.43 |

TABLE 16-continued

<<Embodiment 16>>
f = 82.5~65.0~55.0
FNO = 3.02~2.69~2.50

| Radius of Curvature | Axial Distance | Refractive Index | Abbe Number |
|---|---|---|---|
| r10 = 40.768 | | | |
| | d10 = 2.000 | | |
| r11 = 50.572 | | | |
| | d11 = 7.000 | N6 = 1.61800 | v6 = 63.39 |
| r12 = −172.006 | | | |
| | d12 = 27.634~11.640~2.500 | | |
| {Third Lens Unit Gr3 . . . Positive} | | | |
| (Front Lens Sub-unit . . . Negative) | | | |
| r13 = 31.907 | | | |
| | d13 = 8.000 | N7 = 1.84666 | v7 = 23.82 |
| r14 = 30.613 | | | |
| | d14 = 14.000 | | |
| r15 = −94.551 | | | |
| | d15 = 4.000 | N8 = 1.68150 | v8 = 36.64 |
| r16 = 47.744 | | | |
| | d16 = 10.000 | | |
| (Rear Lens Sub-unit . . . Positive) | | | |
| r17 = 1274.275 | | | |
| | d17 = 4.000 | N9 = 1.80518 | v9 = 25.43 |
| r18 = 107.683 | | | |
| | d18 = 12.000 | N10 = 1.69680 | v10 = 56.47 |
| r19 = −75.076 | | | |
| | d19 = 0.500 | | |
| r20 = 82.235 | | | |
| | d20 = 12.000 | N11 = 1.61800 | v11 = 63.39 |
| r21 = −175.539 | | | |
| | d21 = 1.000 | | |
| r22 = 624.333 | | | |
| | d22 = 7.000 | N12 = 1.61800 | v12 = 63.39 |
| r23 = −285.428 | | | |
| | d23 = 5.000 | | |
| {Dichroic Prism PR} | | | |
| r24 = ∞ | | | |
| | d24 = 40.000 | N13 = 1.51680 | v13 = 64.20 |
| r25 = ∞ | | | |

TABLE 17

<<Embodiment 17>>
f = 82.5~65.0~55.0
FNO = 3.02~2.69~2.50

| Radius of Curvature | Axial Distance | Refractive Index | Abbe Number |
|---|---|---|---|
| {First Lens Unit Gr1 . . . Negative} | | | |
| r1 = 163.467 | | | |
| | d1 = 4.000 | N1 = 1.61800 | v1 = 63.39 |
| r2 = 41.485 | | | |
| | d2 = 12.992 | | |
| r3 = 47.235 | | | |
| | d3 = 7.000 | N2 = 1.75520 | v2 = 27.51 |
| r4 = 63.469 | | | |
| | d4 = 5.500 | | |
| r5 = 758.369 | | | |
| | d5 = 3.000 | N3 = 1.61800 | v3 = 63.39 |
| r6 = 150.096 | | | |
| | d6 = 3.000~19.614~33.855 | | |
| {Second Lens Unit Gr2 . . . Positive} | | | |
| r7 = 70.851 | | | |
| | d7 = 5.000 | N4 = 1.61800 | v4 = 63.39 |
| r8 = −298.018 | | | |
| | d8 = 0.500 | | |

TABLE 17-continued

<<Embodiment 17>>
f = 82.5~65.0~55.0
FNO = 3.02~2.69~2.50

| Radius of Curvature | Axial Distance | Refractive Index | Abbe Number |
|---|---|---|---|
| r9 = 86.403 | | | |
| | d9 = 3.000 | N5 = 1.84666 | v5 = 23.82 |
| r10 = 42.033 | | | |
| | d10 = 2.000 | | |
| r11 = 48.512 | | | |
| | d11 = 7.000 | N6 = 1.61800 | v6 = 63.39 |
| r12 = −197.716 | | | |
| | d12 = 23.600~0.173~2.500 | | |
| {Third Lens Unit Gr3 . . . Positive} | | | |
| (Front Lens Sub-unit . . . Negative) | | | |
| r13 = 35.555 | | | |
| | d13 = 8.000 | N7 = 1.80741 | v7 = 31.59 |
| r14 = 126.223 | | | |
| | d14 = 3.000 | N8 = 1.80420 | v8 = 46.50 |
| r15 = 30.845 | | | |
| | d15 = 12.000 | | |
| r16 = −77.498 | | | |
| | d16 = 4.000 | N9 = 1.72100 | v9 = 33.40 |
| r17 = 59.063 | | | |
| | d17 = 10.000 | | |
| (Rear Lens Sub-unit . . . Positive) | | | |
| r18 = 1235.208 | | | |
| | d18 = 4.000 | N10 = 1.80518 | v10 = 25.43 |
| r19 = 93.250 | | | |
| | d19 = 12.000 | N11 = 1.69680 | v11 = 56.47 |
| r20 = −72.649 | | | |
| | d20 = 0.500 | | |
| r24 = 87.408 | | | |
| | d21 = 12.000 | N12 = 1.61800 | v12 = 63.39 |
| r22 = −319.520 | | | |
| | d22 = 1.000 | | |
| r23 = 134.980 | | | |
| | d23 = 7.000 | N13 = 1.61800 | v13 = 63.39 |
| r24 = −2269.684 | | | |
| | d24 = 5.000 | | |
| {Dichroic Prism PR} | | | |
| r25 = ∞ | | | |
| | d25 = 40.000 | N14 = 1.51680 | v14 = 64.20 |
| r26 = ∞ | | | |

TABLE 18

<<Embodiment 18>>
f = 82.5~65.0~55.0
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 230.274 | | | |
| | d1 = 4.000 | N1 = 1.62041 | v1 = 60.29 |
| r2 = 43.747 | | | |
| | d2 = 12.992 | | |
| r3 = 54.128 | | | |
| | d3 = 7.000 | N2 = 1.84666 | v2 = 23.82 |
| r4 = 70.294 | | | |
| | d4 = 5.500 | | |
| r5 = 878.850 | | | |
| | d5 = 3.000 | N3 = 1.62041 | v3 = 60.29 |
| r6 = 199.785 | | | |
| | d6 = 3.000~20.043~34.652 | | |

TABLE 18-continued

<<Embodiment 18>>
f = 82.5~65.0~55.0
FNO = 2.97~2.67~2.50

| Radius of Curvature | Axial Distance | Refractive Index | Abbe Number |
|---|---|---|---|
| {Second Lens Unit Gr2 . . . Positive} | | | |
| r7 = 72.660 | | | |
| | d7 = 5.000 | N4 = 1.61800 | ν4 = 63.39 |
| r8 = −220.035 | | | |
| | d8 = 0.500 | | |
| r9 = 87.713 | | | |
| | d9 = 3.000 | N5 = 1.84666 | ν5 = 23.82 |
| r10 = 43.317 | | | |
| | d10 = 2.000 | | |
| r11 = 48.919 | | | |
| | d11 = 7.000 | N6 = 1.61800 | ν6 = 63.39 |
| r12 = −277.691 | | | |
| | d12 = 23.069~9.980~2.500 | | |
| {Third Lens Unit Gr3 . . . Positive} | | | |
| (Front Lens Sub-unit . . . Negative) | | | |
| r13 = 37.693 | | | |
| | d13 = 6.000 | N7 = 1.84666 | ν7 = 23.82 |
| r14 = 107.578 | | | |
| | d14 = 2.000 | | |
| r15 = 103.889 | | | |
| | d15 = 3.000 | N8 = 1.80741 | ν8 = 31.59 |
| r16 = 31.574 | | | |
| | d16 = 12.000 | | |
| r17 = −68.013 | | | |
| | d17 = 4.000 | N9 = 1.84666 | ν9 = 23.82 |
| r18 = 73.566 | | | |
| | d18 = 14.000 | | |
| (Rear Lens Sub-unit . . . Positive) | | | |
| r19 = −488.890 | | | |
| | d19 = 9.000 | N10 = 1.62041 | ν10 = 60.29 |
| r20 = −57.701 | | | |
| | d20 = 0.100 | | |
| r21 = 134.275 | | | |
| | d21 = 9.000 | N11 = 1.62041 | ν11 = 60.29 |
| r22 = −208.852 | | | |
| | d22 = 0.100 | | |
| r23 = 70.235 | | | |
| | d23 = 9.000 | N12 = 1.51680 | ν12 = 64.20 |
| r24 = 525.351 | | | |
| | d24 = 5.000 | | |
| {Dichroic Prism PR} | | | |
| r25 = ∞ | | | |
| | d25 = 40.000 | N13 = 1.51680 | ν13 = 64.20 |
| r26 = ∞ | | | |

TABLE 19

<<Embodiment 19>>
f = 82.5~65.0~55.0
FNO = 3.01~2.69~2.50

| Radius of Curvature | Axial Distance | Refractive Index | Abbe Number |
|---|---|---|---|
| {First Lens Unit Gr1 . . . Negative} | | | |
| r1 = 1155.375 | | | |
| | d1 = 3.000 | N1 = 1.62041 | ν1 = 60.29 |
| r2 = 45.295 | | | |
| | d2 = 10.000 | | |
| r3 = −489.891 | | | |
| | d3 = 2.700 | N2 = 1.62041 | ν2 = 60.29 |
| r4 = 148.763 | | | |
| | d4 = 0.100 | | |

TABLE 19-continued

<<Embodiment 19>>
f = 82.5~65.0~55.0
FNO = 3.01~2.69~2.50

| Radius of Curvature | Axial Distance | Refractive Index | Abbe Number |
|---|---|---|---|
| r5 = 77.002 | | | |
| | d5 = 5.000 | N3 = 1.75520 | ν3 = 27.51 |
| r6 = 509.009 | | | |
| | d6 = 1.500~18.911~33.836 | | |
| {Second Lens Unit Gr2 . . . Positive} | | | |
| r7 = 59.810 | | | |
| | d7 = 5.000 | N4 = 1.61800 | ν4 = 63.39 |
| r8 = −16136.841 | | | |
| | d8 = 0.100 | | |
| r9 = 76.557 | | | |
| | d9 = 2.200 | N5 = 1.84666 | ν5 = 23.82 |
| r10 = 40.218 | | | |
| | d10 = 2.000 | | |
| r11 = 48.575 | | | |
| | d11 = 5.800 | N6 = 1.61800 | ν6 = 63.39 |
| r12 = −171.636 | | | |
| | d12 = 20.664~8.469~1.500 | | |
| {Third Lens Unit Gr3 . . . Positive} | | | |
| (Front Lens Sub-unit . . . Negative) | | | |
| r13 = 36.489 | | | |
| | d13 = 6.000 | N7 = 1.75520 | ν7 = 27.51 |
| r14 = 153.417 | | | |
| | d14 = 3.000 | | |
| r15 = 243.127 | | | |
| | d15 = 2.200 | N8 = 1.74000 | ν8 = 31.72 |
| r16 = 30.516 | | | |
| | d16 = 11.500 | | |
| r17 = −90.478 | | | |
| | d17 = 2.200 | N9 = 1.84666 | ν9 = 23.82 |
| r18 = 77.337 | | | |
| | d18 = 18.000 | | |
| (Rear Lens Sub-unit . . . Positive) | | | |
| r19 = −289.606 | | | |
| | d19 = 7.300 | N10 = 1.62041 | ν10 = 60.29 |
| r20 = −57.779 | | | |
| | d20 = 0.100 | | |
| r21 = 243.162 | | | |
| | d21 = 5.700 | N11 = 1.62041 | ν11 = 60.29 |
| r22 = −183.238 | | | |
| | d22 = 0.100 | | |
| r23 = 71.282 | | | |
| | d23 = 7.500 | N12 = 1.62041 | ν12 = 60.29 |
| r24 = 361.925 | | | |
| | d24 = 5.000 | | |
| {Dichroic Prism PR} | | | |
| r25 = ∞ | | | |
| | d25 = 40.000 | N13 = 1.51680 | ν13 = 64.20 |
| r26 = ∞ | | | |

TABLE 20

<<Embodiment 20>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 1556.687 | | | |
| | d1 = 3.000 | N1 = 1.69680 | ν1 = 56.47 |
| r2 = 43.952 | | | |
| | d2 = 12.000 | | |

TABLE 20-continued

<<Embodiment 20>>
f = 72.5~59.0~48.3
FNO = 2.97~2.67~2.50

| Radius of Curvature | Axial Distance | Refractive Index | Abbe Number |
|---|---|---|---|
| r3 = 245.668 | | | |
| | d3 = 9.100 | N2 = 1.58340 | ν2 = 30.23 |
| r4* = −263.429 | | | |
| | d4 = 3.000~19.718~39.667 | | |
| {Second Lens Unit Gr2 . . . Positive} | | | |
| r5 = 73.385 | | | |
| | d5 = 5.000 | N3 = 1.61800 | ν3 = 63.39 |
| r6 = −1167.352 | | | |
| | d6 = 3.000 | | |
| r7 = 65.715 | | | |
| | d7 = 3.000 | N4 = 1.84666 | ν4 = 23.82 |
| r8 = 45.705 | | | |
| | d8 = 2.000 | | |
| r9 = 58.016 | | | |
| | d9 = 5.000 | N5 = 1.61800 | ν5 = 63.39 |
| r10 = −249.272 | | | |
| | d10 = 20.255~10.367~2.500 | | |
| {Third Lens Unit Gr3 . . . Positive} | | | |
| (Front Lens Sub-unit . . . Negative) | | | |
| r11 = 36.070 | | | |
| | d11 = 6.000 | N6 = 1.71736 | ν6 = 29.42 |
| r12 = 145.958 | | | |
| | d12 = 2.000 | | |
| r13 = 602.177 | | | |
| | d13 = 3.000 | N7 = 1.75450 | ν7 = 32.83 |
| r14 = 30.657 | | | |
| | d14 = 14.000 | | |
| r15 = −407.953 | | | |
| | d15 = 4.000 | N8 = 1.84666 | ν8 = 23.82 |
| r16* = 55.298 | | | |
| | d16 = 10.000 | | |
| (Rear Lens Sub-unit . . . Positive) | | | |
| r17 = 210.544 | | | |
| | d17 = 7.500 | N9 = 1.51680 | ν9 = 64.20 |
| r18 = −72.462 | | | |
| | d18 = 0.100 | | |
| r19 = 232.260 | | | |
| | d19 = 7.000 | N10 = 1.51680 | ν10 = 64.20 |
| r20 = −96.967 | | | |
| | d20 = 0.100 | | |
| r21 = 66.285 | | | |
| | d21 = 8.500 | N11 = 1.51680 | ν11 = 64.20 |
| r22 = 1665.917 | | | |
| | d22 = 5.000 | | |
| {Dichroic Prism PR} | | | |
| r23 = ∞ | | | |
| | d23 = 40.000 | N12 = 1.51680 | ν12 = 64.20 |
| r24 = ∞ | | | |

[Aspherical Coefficients]

r4: ε = 1.0000
  A4 = −0.11319 × $10^{-5}$
  A6 =  0.12489 × $10^{-9}$
  A8 = −0.47125 × $10^{-12}$
r16: ε = 1.0000
  A4 = −0.96751 × $10^{-6}$
  A6 = −0.72732 × $10^{-9}$
  A8 = −0.63656 × $10^{-12}$

TABLE 21

<<Embodiment 21>>
f = 72.5~59.0~48.3
FNO = 2.97~2.67~2.50

| Radius of Curvature | Axial Distance | Refractive Index | Abbe Number |
|---|---|---|---|
| {First Lens Unit Gr1 . . . Negative} | | | |
| r1 = 394.515 | | | |
| | d1 = 3.000 | N1 = 1.62041 | ν1 = 60.29 |
| r2 = 42.736 | | | |
| | d2 = 12.000 | | |
| r3 = 1340.770 | | | |
| | d3 = 2.500 | N2 = 1.62041 | ν2 = 60.29 |
| r4 = 148.339 | | | |
| | d4 = 0.100 | | |
| r5 = 88.727 | | | |
| | d5 = 6.500 | N3 = 1.58340 | ν3 = 30.23 |
| r6* = 2897.123 | | | |
| | d6 = 3.000~19.168~38.462 | | |
| {Second Lens Unit Gr2 . . . Positive} | | | |
| r7 = 79.565 | | | |
| | d7 = 5.000 | N4 = 1.61800 | ν4 = 63.39 |
| r8 = 987.596 | | | |
| | d8 = 3.000 | | |
| r9 = 68.314 | | | |
| | d9 = 3.000 | N5 = 1.84666 | ν5 = 23.82 |
| r10 = 38.820 | | | |
| | d10 = 2.000 | | |
| r11 = 44.052 | | | |
| | d11 = 6.000 | N6 = 1.61800 | ν6 = 63.39 |
| r12 = −130.793 | | | |
| | d12 = 20.859~10.634~2.500 | | |
| {Third Lens Unit Gr3 . . . Positive} | | | |
| (Front Lens Sub-unit . . . Negative) | | | |
| r13 = 40.530 | | | |
| | d13 = 8.000 | N7 = 1.80518 | ν7 = 25.43 |
| r14 = 153.636 | | | |
| | d14 = 3.000 | N8 = 1.65446 | ν8 = 33.86 |
| r15 = 30.126 | | | |
| | d15 = 12.000 | | |
| r16 = −120.615 | | | |
| | d16 = 4.000 | N9 = 1.84666 | ν9 = 23.82 |
| r17 = 63.866 | | | |
| | d17 = 14.000 | | |
| (Rear Lens Sub-unit . . . Positive) | | | |
| r18 = −175.064 | | | |
| | d18 = 5.600 | N10 = 1.62041 | ν10 = 60.29 |
| 19 = −56.865 | | | |
| | d19 = 0.100 | | |
| r20 = 119.748 | | | |
| | d20 = 8.200 | N11 = 1.51680 | ν11 = 64.20 |
| r21 = −158.512 | | | |
| | d21 = 0.100 | | |
| r22 = 63.645 | | | |
| | d22 = 9.000 | N12 = 1.51680 | ν12 = 64.20 |
| r23 = 793.405 | | | |
| | d23 = 5.000 | | |
| {Dichroic Prism PR} | | | |
| r24 = ∞ | | | |
| | d24 = 40.000 | N13 = 1.51680 | ν13 = 64.20 |
| r25 = ∞ | | | |

[Aspherical Coefficients]

r6: ε = 1.0000
  A4 = −0.57067 × $10^{-6}$
  A6 = −0.13108 × $10^{-9}$
  A8 =  0.26152 × $10^{-10}$

TABLE 22

|  |  | Cond. (1) | Cond. (2) | Cond. (3) | Cond. (4) |
|---|---|---|---|---|---|
| Type A | Emb. 1 | 0.388 | 6.174 | — | — |
|  | Emb. 2 | 0.381 | 5.876 | — | — |
| Type B | Emb. 3 | 0.725 | — | 14.984 | — |
|  | Emb. 4 | 0.725 | — | 26.404 | — |
| Type C | Emb. 5 | 0.749 | — | 5.151 | 0.041 |
|  | Emb. 6 | 0.749 | — | 5.196 | 0.041 |
| Type B | Emb. 7 | 0.516 | — | 21.914 | — |
|  | Emb. 8 | 0.676 | — | 7.095 | — |
|  | Emb. 9 | 0.628 | — | 42.084 | — |
| Type C | Emb. 10 | 0.565 | — | 26.944 | 0.021 |
| Type A | Emb. 11 | 0.463 | 4.326 | — | — |
|  | Emb. 12 | 0.449 | 4.358 | — | — |

TABLE 23

|  |  | Cond. (5) | Cond. (6) | Cond. (7) | Cond. (8) |
|---|---|---|---|---|---|
| Type A | Emb. 1 | — | 27.51 | — | — |
|  | Emb. 2 | — | 27.51 | — | — |
| Type B | Emb. 3 | — | — | 13.30 | 0.919 |
|  | Emb. 4 | — | — | 18.31 | 0.939 |
| Type C | Emb. 5 | 0.0012 | — | 13.87 | 0.854 |
|  | Emb. 6 | 0.0017 | — | 14.48 | 0.854 |
| Type B | Emb. 7 | — | — | 19.15 | 0.921 |
|  | Emb. 8 | — | — | 18.16 | 0.854 |
|  | Emb. 9 | — | — | 14.54 | 0.917 |
| Type C | Emb. 10 | −0.0025 | — | 12.60 | 0.908 |
| Type A | Emb. 11 | — | 25.43 | — | — |
|  | Emb. 12 | — | 25.43 | — | — |

TABLE 24

|  |  | Cond. (9) | Cond. (10) | Cond. (11) |
|---|---|---|---|---|
| Type A | Emb. 1 | — | 0.613 | 0.810 |
|  | Emb. 2 | — | 0.613 | 0.796 |
| Type B | Emb. 3 | — | 0.625 | 0.976 |
|  | Emb. 4 | — | 0.625 | 1.026 |
| Type C | Emb. 5 | — | 0.606 | 1.009 |
|  | Emb. 6 | — | 0.606 | 1.013 |
| Type B | Emb. 7 | — | 0.664 | 1.014 |
|  | Emb. 8 | — | 0.650 | 1.044 |
|  | Emb. 9 | — | 0.682 | 0.967 |
| Type C | Emb. 10 | — | 0.684 | 0.744 |
| Type A | Emb. 11 | 1.58340 | 0.613 | 0.783 |
|  | Emb. 12 | 1.58340 | 0.613 | 0.783 |

TABLE 25

|  |  | Cond. (12) | Cond. (2) | Cond. (3) | Cond. (4) | Cond. (5) |
|---|---|---|---|---|---|---|
| Type D | Emb. 13 | 0.953 | 4.035 | — | — | — |
|  | Emb. 14 | 0.801 | 146.815 | — | — | — |
|  | Emb. 15 | 0.865 | 188.657 | — | — | — |
|  | Emb. 16 | 0.906 | 48.315 | — | — | — |
| Type E | Emb. 17 | 1.016 | — | 14.098 | — | — |
| Type F | Emb. 18 | 1.137 | — | 11.320 | 0.036 | 0.0003 |
|  | Emb. 19 | 1.099 | — | 11.218 | 0.055 | −0.0024 |
|  | Emb. 20 | 1.044 | — | 12.327 | 0.041 | −0.0052 |
| Type E | Emb. 21 | 0.874 | — | 6.791 | — | — |

TABLE 26

|  |  | Cond. (6) | Cond. (7) | Cond. (13) | Cond. (10) | Cond. (9) |
|---|---|---|---|---|---|---|
| Type D | Emb. 13 | 25.43 | — | 0.502 | 0.676 | — |
|  | Emb. 14 | 23.82 | — | 0.563 | 0.567 | — |

TABLE 26-continued

|  |  | Cond. (6) | Cond. (7) | Cond. (13) | Cond. (10) | Cond. (9) |
|---|---|---|---|---|---|---|
|  | Emb. 15 | — | — | 0.581 | 0.633 | — |
|  | Emb. 16 | — | — | 0.590 | 0.633 | — |
| Type E | Emb. 17 | — | 1.83 | 0.542 | 0.613 | — |
| Type F | Emb. 18 | — | 1.73 | 0.551 | 0.613 | — |
|  | Emb. 19 | — | 24.91 | 0.531 | 0.598 | — |
|  | Emb. 20 | — | 24.48 | 0.472 | 0.613 | 1.58340 |
| Type E | Emb. 21 | — | −1.12 | 0.475 | 0.613 | 1.58340 |

What is claimed is:

1. A zoom lens system comprising, from the enlargement side:

a first lens unit having a negative optical power;

a second lens unit having a positive optical power;

a third lens unit having a negative optical power, said third lens unit comprising, at its enlargement side end, a meniscus lens element having a convex surface on the enlargement side; and a fourth lens unit having a positive optical power, said fourth lens unit including at least two positive lens elements, wherein said second lens unit moves along the optical axis so that a distance between said second lens unit and third lens unit increases during zooming from a shortest focal length condition to a longest focal length condition, wherein said third lens unit moves along the optical axis so that a distance between said third lens unit and fourth lens unit decreases during zooming from a shortest focal length condition to a longest focal length condition, and wherein the following conditions are fulfilled:

$$0.30 < |\Phi 3| \cdot fS < 0.90$$

$$3 \leq |(r_{MB} + r_{MA})/(r_{MB} - r_{MA})|$$

where $\Phi 3$ represents an optical power of the third lens unit;
$fS$ represents a focal length of the entire zoom lens system in the shortest focal length condition;
$r_{MB}$ represents a radius of curvature of the enlargement side surface of the meniscus lens element; and
$r_{MA}$ represents a radius of curvature of the reduction side surface of the meniscus lens element.

2. A zoom lens system as claimed in claim 1, wherein said meniscus lens element has a negative optical power.

3. A zoom lens system as claimed in claim 1, wherein said meniscus lens element has a positive optical power.

4. A zoom lens system as claimed in claim 1, wherein said first lens unit comprises at least two negative lens elements and at least one positive lens element.

5. A zoom lens system as claimed in claim 1, wherein said second lens unit comprises, from the enlargement side, a negative meniscus lens element having a convex surface on the enlargement side and a positive doublet lens element.

6. A zoom lens system comprising, from the enlargement side:

a first lens unit having a negative optical power;

a second lens unit having a positive optical power;

a third lens unit having a negative optical power, said third lens unit comprising, at its enlargement side end, a meniscus lens element having a convex surface on the enlargement side, said meniscus lens element being a doublet lens element formed by joining together a first positive lens having a convex surface on the enlargement side and a second negative lens having a concave surface on the reduction side; and a fourth lens unit having a positive optical power, said fourth lens unit including at least two positive lens elements, wherein said second lens unit moves along the optical axis so that a distance between said second lens unit and third lens unit increases during zooming from a shortest focal length condition to a longest focal length condition, wherein said third lens unit moves along the optical axis so that a distance between said third lens unit and fourth lens unit decreases during zooming from a shortest focal length condition to a longest focal length condition, and wherein the following conditions are fulfilled:

$$0.30 < |\Phi 3| \cdot fS < 0.90$$

$$3 \leq |(r_{M2B} + r_{M1A})/(r_{M2B} - r_{M1A})|$$

where
$\Phi 3$ represents an optical power of the third lens unit;
fS represents a focal length of the entire zoom lens system in the shortest focal length condition;
$r_{M2B}$ represents a radius of curvature of the enlargement side surface of the first positive lens element; and
$r_{M1A}$ represents a radius of curvature of the reduction side surface of the second negative lens element.

7. A zoom lens system as claimed in claim 6, wherein said meniscus lens element has a negative optical power.

8. A zoom lens system as claimed in claim 6, wherein said meniscus lens element has a positive optical power.

9. A zoom lens system as claimed in claim 6, wherein said first lens unit comprises at least two negative lens elements and at least one positive lens element.

10. A zoom lens system as claimed in claim 6, wherein said second lens unit comprises, from the enlargement side, a negative meniscus lens element having a convex surface on the enlargement side and a positive doublet lens element.

11. A zoom lens system comprising, from the enlargement side:

a first lens unit having a negative optical power;
a second lens unit having a positive optical power;
a third lens unit having a negative optical power, said third lens unit comprising, from the enlargement side, a first positive lens having a convex surface on the enlargement side and a second negative lens having a concave surface on the reduction side; and
a fourth lens unit having a positive optical power, said fourth lens unit including at least two positive lens elements, wherein said second lens unit moves along the optical axis so that a distance between said second lens unit and third lens unit increases during zooming from a shortest focal length condition to a longest focal length condition, wherein said third lens unit moves along the optical axis so that a distance between said third lens unit and fourth lens unit decreases during zooming from a shortest focal length condition to a longest focal length condition, and wherein the following conditions are fulfilled:

$$0.30 < |\Phi 3| \cdot fS < 0.90$$

$$3 \leq |(r_{M2B} + r_{M1A})/(r_{M2B} - r_{M1A})|$$

where
$\Phi 3$ represents an optical power of the third lens unit;
fS represents a focal length of the entire zoom lens system in the shortest focal length condition;
$r_{M2B}$ represents a radius of curvature of the enlargement side surface of the first positive lens element; and
$r_{M1A}$ represents a radius of curvature of the reduction side surface of the second negative lens element.

12. A zoom lens system as claimed in claim 11, wherein said first positive and second negative lens elements have a negative composite optical power.

13. A zoom lens system as claimed in claim 11, wherein said first positive and second negative lens elements have a positive composite optical power.

14. A zoom lens system as claimed in claim 11, wherein said first lens unit comprises at least two negative lens elements and at least one positive lens element.

15. A zoom lens system as claimed in claim 11, wherein said second lens unit comprises, from the enlargement side, a negative meniscus lens element having a convex surface on the enlargement side and a positive doublet lens element.

16. A zoom lens system comprising, from the enlargement side:

a first lens unit having a negative optical power;
a second lens unit having a positive optical power; and
a third lens unit having a positive optical power, said third lens unit consisting of, from the enlargement side, a front lens sub-unit having a negative optical power and a rear lens sub-unit having a positive optical power, said front lens sub-unit comprising, at its enlargement side end, a meniscus lens element having a convex surface on the enlargement side, said rear lens sub-unit including two positive lens elements, wherein said second lens unit moves along the optical axis so that a distance between said second lens unit and third lens unit increases during zooming from a shortest focal length condition to a longest focal length condition, and wherein the following conditions are fulfilled:

$$0.30 < |\Phi F| \cdot fS < 0.90$$

$$3 \leq |(r_{MB} + r_{MA})/(r_{MB} - r_{MA})|$$

where
$\Phi F$ represents an optical power of the front lens sub-unit;
fS represents a focal length of the entire zoom lens system in the shortest focal length condition;
$r_{MB}$ represents a radius of curvature of the enlargement side surface of the meniscus lens element; and
$r_{MA}$ represents a radius of curvature of the reduction side surface of the meniscus lens element.

17. A zoom lens system as claimed in claim 16, wherein said meniscus lens element has a negative optical power.

18. A zoom lens system as claimed in claim 16, wherein said meniscus lens element has a positive optical power.

19. A zoom lens system as claimed in claim 16, wherein said first lens unit comprises at least two negative lens elements and at least one positive lens element.

20. A zoom lens system comprising, from the enlargement side:
a first lens unit having a negative optical power;
a second lens unit having a positive optical power; and
a third lens unit having a positive optical power, said third lens unit consisting of, from the enlargement side, a front lens sub-unit having a negative optical power and a rear lens sub-unit having a positive optical power, said front lens sub-unit comprising, at its enlargement side end, a meniscus lens element having a convex surface on the enlargement side, said meniscus lens element being a doublet lens element formed by joining together a first positive lens having a convex surface on the enlargement side and a second negative lens having a concave surface on the reduction side, said rear lens sub-unit including two positive lens elements,
wherein said second lens unit moves along the optical axis so that a distance between said second lens unit and third lens unit increases during zooming from a shortest focal length condition to a longest focal length condition, and
wherein the following conditions are fulfilled:

$$0.30 < |\Phi F| \cdot fS < 0.90$$

$$3 \leq |(r_{M2B} + r_{M1A})/(r_{M2B} - r_{M1A})|$$

where
$\Phi F$ represents an optical power of the front lens sub-unit;
fS represents a focal length of the entire zoom lens system in the shortest focal length condition;
$r_{M2B}$ represents a radius of curvature of the enlargement side surface of the meniscus lens element; and
$r_{M1A}$ represents a radius of curvature of the reduction side surface of the meniscus lens element.

21. A zoom lens system as claimed in claim 20, wherein said meniscus lens element has a negative optical power.

22. A zoom lens system as claimed in claim 20, wherein said meniscus lens element has a positive optical power.

23. A zoom lens system as claimed in claim 20, wherein said first lens unit comprises at least two negative lens elements and at least one positive lens element.

24. A zoom lens system comprising, from the enlargement side:
a first lens unit having a negative optical power;
a second lens unit having a positive optical power; and
a third lens unit having a positive optical power, said third lens unit comprising, from the enlargement side, a front lens sub-unit having a negative optical power and a rear lens sub-unit having a positive optical power, said front lens sub-unit comprising a first positive lens having a convex surface on the enlargement side and a second negative lens having a concave surface on the reduction side, said rear lens sub-unit including two positive lens elements, said front lens sub-unit including at least three lens elements,
wherein said second lens unit moves along the optical axis so that a distance between said second lens unit and third lens unit increases during zooming from a shortest focal length condition to a longest focal length condition, and
wherein the following conditions are fulfilled:

$$0.30 < |\Phi F| \cdot fS < 0.90$$

$$3 \leq |(r_{M2B} + r_{M1A})/(r_{M2B} - r_{M1A})|$$

where
$\Phi F$ represents an optical power of the front lens sub-unit;
fS represents a focal length of the entire zoom lens system in the shortest focal length condition;
$r_{M2B}$ represents a radius of curvature of the enlargement side surface of the first positive lens element; and
$r_{M1A}$ represents a radius of curvature of the reduction side surface of the second negative lens element.

25. A zoom lens system as claimed in claim 24, wherein said first positive and second negative lens elements have a negative composite optical power.

26. A zoom lens system as claimed in claim 24, wherein said first positive and second negative lens elements have a positive optical power.

27. A zoom lens system comprising, from the enlargement side:
a first lens unit having a negative optical power;
a second lens unit having a positive optical power; and
a third lens unit having a positive optical power, said third lens unit comprising, from the enlargement side, a front lens sub-unit having a negative optical power and a rear lens sub-unit having a positive optical power, said front lens sub-unit comprising a first positive lens having a convex surface on the enlargement side and a second negative lens having a concave surface on the reduction side, said rear lens sub-unit including two positive lens elements,
wherein said second lens unit moves along the optical axis so that a distance between said second lens unit and third lens unit increases during zooming from a shortest focal length condition to a longest focal length condition, and
wherein the following conditions are fulfilled:

$$0.30 < |\Phi F| \cdot fS < 0.90$$

$$3 \leq |(r_{M2B} + r_{M1A})/(r_{M2B} - r_{M1A})|$$

where
$\Phi F$ represents an optical power of the front lens sub-unit;
fS represents a focal length of the entire zoom lens system in the shortest focal length condition;
$r_{M2B}$ represents a radius of curvature of the enlargement side surface of the first positive lens element; and
$r_{M1A}$ represents a radius of curvature of the reduction side surface of the second negative lens element,
wherein said first lens unit comprises at least two negative lens elements and at least one positive lens element.

* * * * *